United States Patent
Lee

(10) Patent No.: US 12,256,655 B2
(45) Date of Patent: Mar. 25, 2025

(54) HYDRAULIC STEERING DEVICE FOR AGRICULTURAL WORK VEHICLE

(71) Applicant: LS MTRON LTD., Anyang-si (KR)

(72) Inventor: Sang Heon Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 655 days.

(21) Appl. No.: 17/628,837

(22) PCT Filed: Jul. 21, 2020

(86) PCT No.: PCT/KR2020/009578
§ 371 (c)(1),
(2) Date: Jan. 20, 2022

(87) PCT Pub. No.: WO2021/015528
PCT Pub. Date: Jan. 28, 2021

(65) Prior Publication Data
US 2022/0264785 A1 Aug. 25, 2022

(30) Foreign Application Priority Data

| Jul. 22, 2019 | (KR) | 10-2019-0088265 |
| Jul. 16, 2020 | (KR) | 10-2020-0088117 |
| Jul. 16, 2020 | (KR) | 10-2020-0088127 |

(51) Int. Cl.
*B62D 5/065* (2006.01)
*A01B 69/04* (2006.01)
*B62D 5/093* (2006.01)

(52) U.S. Cl.
CPC .......... *A01B 69/008* (2013.01); *B62D 5/065* (2013.01); *B62D 5/093* (2013.01)

(58) Field of Classification Search
CPC ...... A01B 69/007; A01B 69/008; B62D 1/22; B62D 5/07; B62D 5/062; B62D 5/065; B62D 5/30; B62D 5/093
(Continued)

(56) References Cited

U.S. PATENT DOCUMENTS 6,067,782 A * 5/2000 Diekhans ............ B62D 5/30
56/10.2 A

FOREIGN PATENT DOCUMENTS

| EP | 2221234 A2 | 8/2010 |
| JP | 2000300010 A | 10/2000 |

(Continued)

OTHER PUBLICATIONS

International Search Report for related International Application No. PCT/KR2020/009578; report dated Jan. 28, 2021; (6 pages).
(Continued)

*Primary Examiner* — James A English
*Assistant Examiner* — Felicia L. Brittman-Alabi
(74) *Attorney, Agent, or Firm* — K&L Gates LLP

(57) ABSTRACT

The present disclosure relates to a hydraulic steering device for an agricultural work vehicle comprising a steering pump for supplying working fluid; an automatic steering unit which is connected to the steering pump, and which changes, according to automatic steering performed by a control part, the traveling direction of the agricultural work vehicle by using the working fluid supplied from the steering pump; a manual steering unit which is connected to each of the steering pump and the automatic steering unit, and which changes, according to manual steering performed by the operation of a steering wheel, the traveling direction of the agricultural work vehicle, and a manual switching unit connected to each of the steering pump and the manual steering unit.

17 Claims, 39 Drawing Sheets

(58) Field of Classification Search
USPC .......................................................... 180/441
See application file for complete search history.

(56) References Cited

FOREIGN PATENT DOCUMENTS

| | | | |
|---|---|---|---|
| JP | 2003118615 A | * | 4/2003 |
| JP | 2006131110 A | | 5/2006 |
| KR | 19980060566 A | | 10/1998 |

OTHER PUBLICATIONS

Written Opinion for related International Application No. PCT/KR2020/009578; report dated Jan. 28, 2021; (4 pages).
Supplementary Search Report for related European Application No. 20844791; action dated Jul. 26, 2023; (7 pages).
Office Action for related Chinese Application No. 202080053566.4; action dated Jul. 31, 2023; (8 pages).

* cited by examiner

HYDRAULIC STEERING DEVICE FOR AGRICULTURAL WORK VEHICLE

CROSS-REFERENCE TO RELATED APPLICATIONS

The present application is a National Stage of International Application No. PCT/KR2020/009578 filed on Jul. 21, 2020, which claims the benefit of Korean Patent Application No. 10-2019-0088265, filed on Jul. 22, 2019; Korean Patent Application No. 10-2020-0088127, filed on Jul. 16, 2020; and Korean Patent Application No. 10-2020-0088117, filed on Jul. 16, 2020 with the Korean Intellectual Property Office, the entire contents of each hereby incorporated by reference.

FIELD

The present disclosure relates to an agricultural vehicle used to grow crops necessary for human life by using land.

BACKGROUND

Agricultural vehicles are used to grow crops necessary for human life by using land. Examples of the agricultural vehicles include a combine harvester, a tractor, a rice transplanter, and the like. The combine harvester performs tasks of reaping and threshing crops such as rice, barley, wheat, and soybeans. The tractor uses traction to perform a task necessary to grow crops. The rice transplanter performs a task of transplanting rice seedlings, which are raised in a rice seedbed or a seedling tray, to a paddy field.

Such an agricultural vehicle includes a steering device for changing a traveling direction as necessary during a work process. The steering device changes a direction of wheels provided in the agricultural vehicle to change the traveling direction thereof.

FIG. 1 is a schematic block diagram of a steering device for an agricultural vehicle according to a related art.

Referring to FIG. 1, a steering device (10) of an agricultural vehicle according to a related art includes a steering pump (11) and a steering adjuster (12).

The steering pump (11) supplies a working fluid to the steering adjuster (12). The steering pump (11) may use a driving force generated by an engine (not illustrated) of the agricultural vehicle to transfer the working fluid. The working fluid is stored in a storage tank (not illustrated) of the agricultural vehicle.

The steering adjuster (12) is connected to the steering pump (11) and a steering cylinder (13). The steering cylinder (13) changes a direction of wheels provided in the agricultural vehicle. The steering adjuster (12) supplies the working fluid supplied from the steering pump (11) to any one cylinder of a first cylinder (131) and a second cylinder (132) of the steering cylinder (13). In this case, the steering adjuster (12) discharges the working fluid from the other cylinder. Accordingly, the steering adjuster (12) may adjust a moving direction of a cylinder rod (not illustrated) of the cylinders (131, 132) to change the direction of the wheels, thus changing a traveling direction of the agricultural vehicle.

The steering adjuster (12) includes a manual steering unit (121) and an automatic steering unit (122).

The manual steering unit (121) is connected to the steering pump (11). When a driver manipulates a steering wheel provided in the agricultural vehicle, the manual steering unit (121) supplies the working fluid supplied from the steering pump (11) to the first cylinder (131) or the second cylinder (132) according to a direction of rotation of the steering wheel. That is, the manual steering unit (121) changes the traveling direction of the agricultural vehicle according to manual steering by the driver.

The automatic steering unit (122) is connected to the steering pump (11). The automatic steering unit (122) supplies the working fluid supplied from the steering pump (11) to the first cylinder (131) or the second cylinder (132) according to control by a controller (14). The controller (14) controls the automatic steering unit (122) so that the agricultural vehicle travels along a predetermined traveling path. That is, the automatic steering unit (122) changes the traveling direction of the agricultural vehicle according to automatic steering by the controller 14.

With regards to the steering device (10) of the agricultural vehicle according to the related art, in a case in which, while the traveling direction of the agricultural vehicle is changed according to the automatic steering, a change occurs in a working condition such as when an unexpected obstacle appears in a predetermined traveling path, even when the driver manipulates the steering wheel, the automatic steering is not changed to the manual steering, and the steering device (10) reaches a state in which the manual steering and the automatic steering simultaneously change the traveling direction of the agricultural vehicle. Accordingly, the steering device (10) of the agricultural vehicle according to the related art has a problem in that its ability to handle a change in a working condition is degraded.

SUMMARY

The present disclosure is directed to providing a hydraulic steering device for an agricultural vehicle that has an improved ability to handle a change in a working condition.

In order to achieve the above objective, the present disclosure may include the following configurations.

A hydraulic steering device for an agricultural vehicle according to the present disclosure may include a steering pump configured to supply a working fluid, an automatic steering unit connected to the steering pump and configured to, as automatic steering is performed by a controller, use the working fluid supplied from the steering pump to change a traveling direction of the agricultural vehicle, a manual steering unit connected to each of the steering pump and the automatic steering unit and configured to, as manual steering is performed by manipulation of a steering wheel, change the traveling direction of the agricultural vehicle, and a manual changing unit connected to each of the steering pump and the manual steering unit. The manual steering unit may be connected to the steering pump through the manual changing unit. The manual changing unit may block passage of the working fluid supplied from the steering pump when the automatic steering is performed in a state in which the manual steering is not performed and may cause the working fluid supplied from the steering pump to pass when the automatic steering is not performed in the state in which the manual steering is not performed or when the manual steering is performed. The manual steering unit may change, through the manual changing unit, the traveling direction of the agricultural vehicle using the working fluid supplied from the steering pump when the manual steering is performed.

According to the present disclosure, the following advantageous effects can be achieved.

The present disclosure is implemented to change a traveling direction according to manual steering when the manual steering is performed while automatic steering is performed. Therefore, an ability to handle a change in a working condition can be improved, and thus, the risk of accidents can also be lowered.

DETAILED DESCRIPTION

Hereinafter, exemplary embodiments of a hydraulic steering device for an agricultural vehicle according to the present disclosure will be described in detail with reference to the accompanying drawings.

In FIGS. 3 to 21, FIG. 28, and FIGS. 32 to 39, a flowing direction of a working fluid is indicated by an arrow. A solid arrow marked on a solid hydraulic line indicates a flowing direction of a working fluid supplied from a steering pump or a flowing direction of a working fluid supplied to a steering cylinder. A dotted arrow marked on the solid hydraulic line indicates a flowing direction of a working fluid discharged from the steering cylinder. A two-dot chain arrow marked on the solid hydraulic line indicates a flowing direction of a working fluid discharged to an external device. A dotted arrow marked on a dotted hydraulic line indicates a flowing direction of a working fluid for moving a valve.

Figure 1:
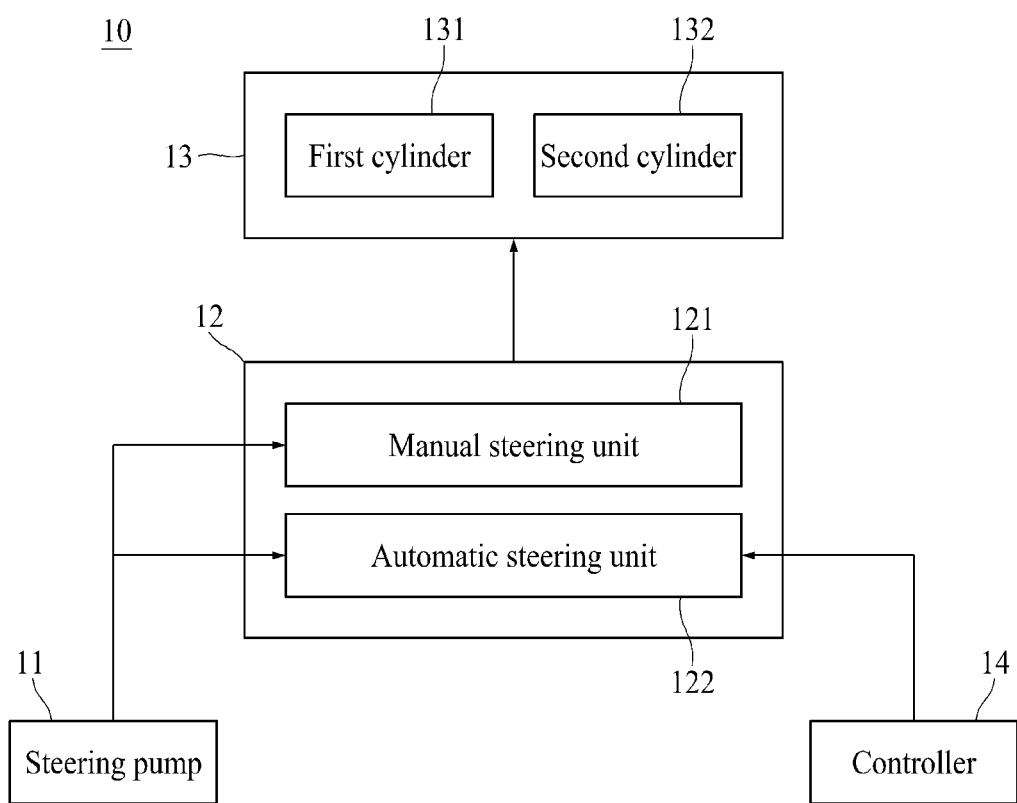
FIG. 1 is a schematic block diagram of a steering device for an agricultural vehicle according to the related art.
Figure 2:
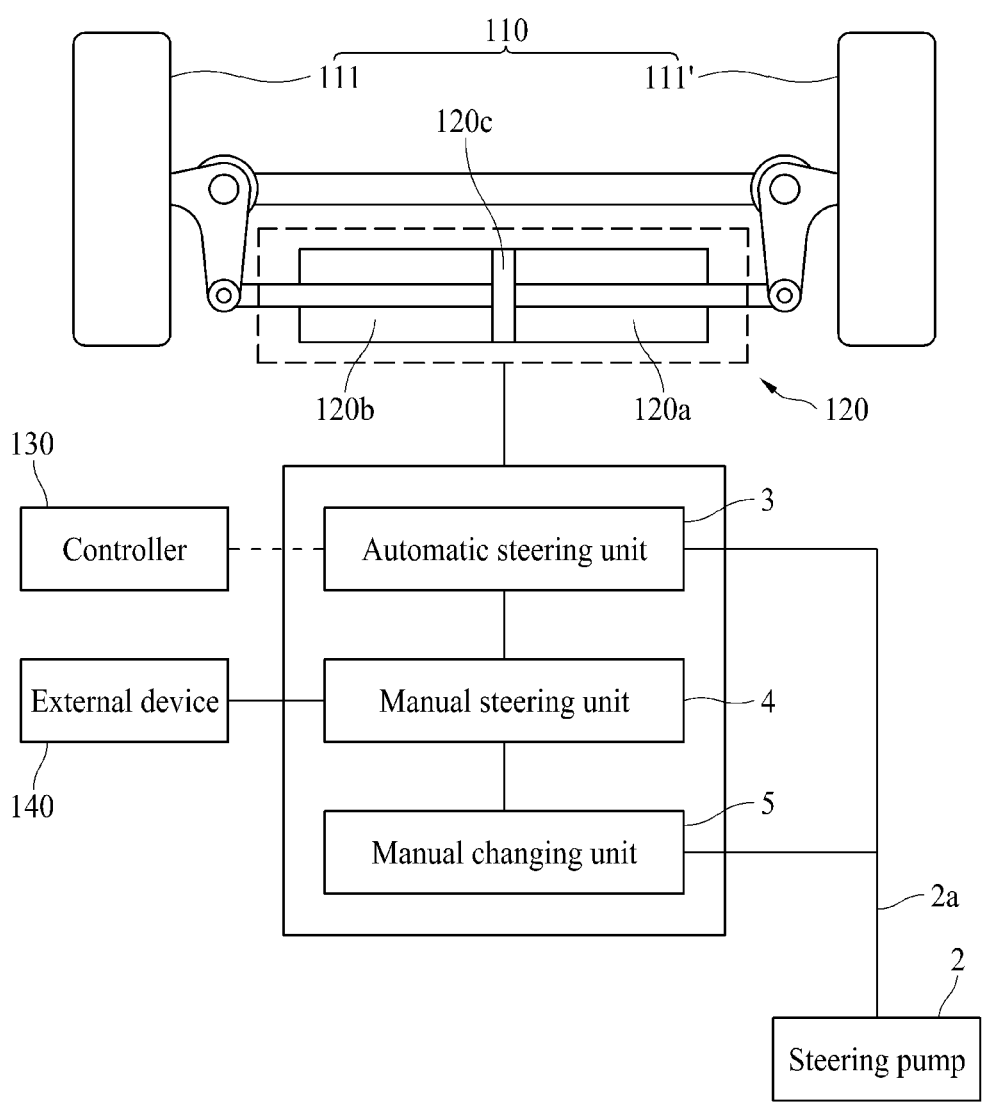
FIG. 2 is a schematic block diagram of an agricultural vehicle which includes a steering device for an agricultural vehicle according to the present disclosure.

Referring to FIG. 2, a hydraulic steering device 1 for an agricultural vehicle according to the present disclosure is included in an agricultural vehicle 100 such as a tractor, a combine harvester, and a rice transplanter.

The agricultural vehicle 100 includes a traveling part 110 for traveling and a steering cylinder 120 for changing a traveling direction. The steering cylinder 120 may change a direction of wheels 111 and 111' of the traveling part 110 to change a traveling direction of the agricultural vehicle 100 (hereinafter referred to as "the traveling direction"). The steering cylinder 120 operates in a hydraulic manner using a working fluid.

The hydraulic steering device 1 for an agricultural vehicle according to the present disclosure adjusts supply and discharge of a working fluid to and from the steering cylinder 120, thus being responsible for changing the traveling direction. The hydraulic steering device 1 for an agricultural vehicle according to the present disclosure may change the traveling direction through manual steering by manipulation of a steering wheel (not illustrated) and automatic steering by a predetermined traveling path. The manual steering may be performed by a driver of the agricultural vehicle 100. The automatic steering may be performed by a controller 130 of the agricultural vehicle 100. A traveling path according to a working condition and the like may be stored in the controller 130.

Figure 3:
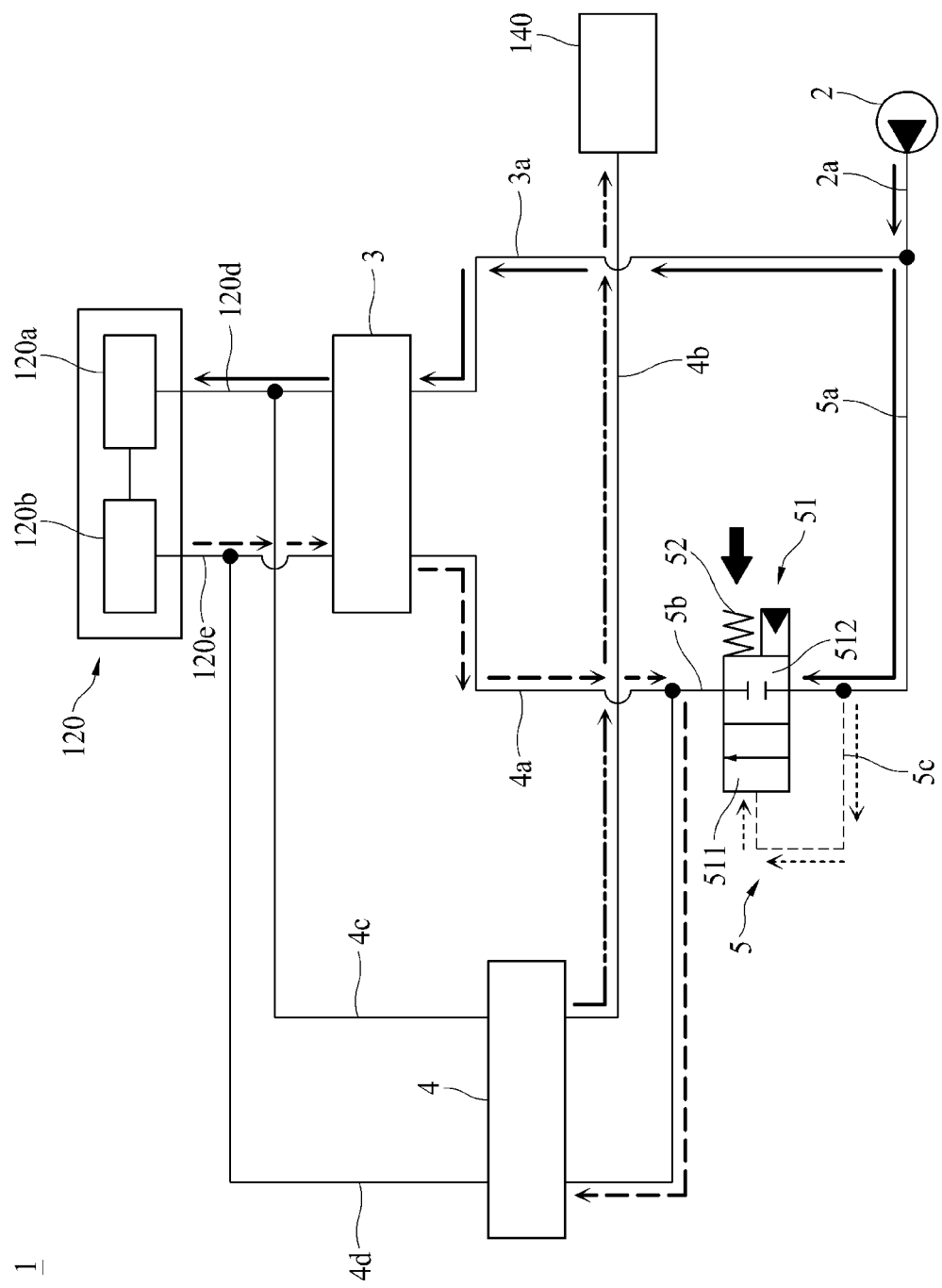
FIGS. 3 to 30 are schematic hydraulic circuit diagrams illustrating a flowing direction of a working fluid in a hydraulic steering device for an agricultural vehicle according to the present disclosure.
Figure 4:
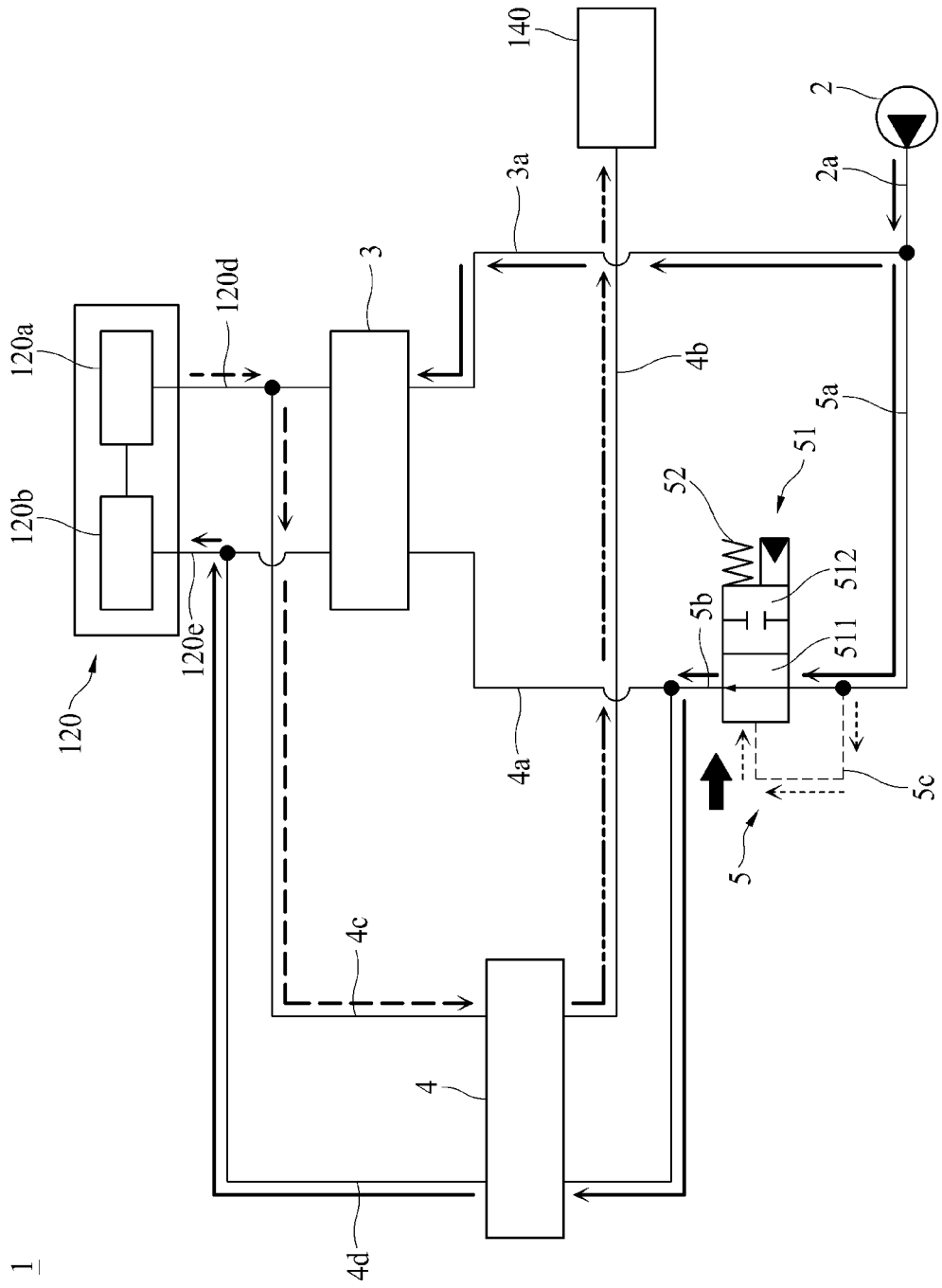

Referring to FIGS. 2 to 4, in order to change the traveling direction through the manual steering and the automatic steering, the hydraulic steering device 1 for an agricultural vehicle according to the present disclosure includes a steering pump 2 configured to supply a working fluid, an automatic steering unit 3 configured to change the traveling direction according to the automatic steering, a manual steering unit 4 configured to change the traveling direction according to the manual steering, and a manual changing unit 5 configured to allow the manual steering to be performed first among the automatic steering and the manual steering.

The automatic steering unit 3 is connected to the steering pump 2. As illustrated in FIG. 3, as the automatic steering is performed, the automatic steering unit 3 changes the traveling direction using the working fluid supplied from the steering pump 2.

The manual steering unit 4 is connected to each of the steering pump 2 and the automatic steering unit 3. The manual steering unit 4 may be connected to the steering pump 2 through the manual changing unit 5. Therefore, as illustrated in FIG. 4, as the manual steering is performed, the manual steering unit 4 changes the traveling direction using the working fluid supplied from the steering pump 2 through the manual changing unit 5. Since the manual steering unit 4 is connected to the automatic steering unit 3, as illustrated in FIG. 3, as the automatic steering is performed, the working fluid discharged from the steering cylinder 120 may be discharged to an external device 140 via the automatic steering unit 3 and the manual steering unit 4. The external device 140 may be included in the agricultural vehicle 100 and operate using the working fluid. For example, the external device 140 may be a transmission. The external device 140 may be a storage tank configured to store the working fluid.

The manual changing unit 5 is connected to each of the steering pump 2 and the manual steering unit 4. When the automatic steering is performed in a state in which the manual steering is not performed, the manual changing unit 5 blocks passage of the working fluid supplied from the steering pump 2. Accordingly, the working fluid supplied by the steering pump 2 is supplied to the automatic steering unit 3 without being supplied to the manual steering unit 4 through the manual changing unit 5. When the manual steering is performed, the manual changing unit 5 causes the working fluid supplied from the steering pump 2 to pass. When the automatic steering is not performed in the state in which the manual steering is not performed, the manual changing unit 5 causes the working fluid supplied from the steering pump 2 to pass. Accordingly, the working fluid supplied by the steering pump 2 is supplied to the manual steering unit 4 through the manual changing unit 5. In this case, the working fluid is not able to be supplied to the steering cylinder 120 through the automatic steering unit 3.

Therefore, the hydraulic steering device 1 for an agricultural vehicle according to the present disclosure is implemented so that, when the manual steering is performed while the automatic steering is performed, the traveling direction is changed according to the manual steering using the manual changing unit 5. That is, the hydraulic steering device 1 for an agricultural vehicle according to the present disclosure is implemented so that the manual steering is performed first among the automatic steering and the manual steering. Therefore, the hydraulic steering device 1 for an agricultural vehicle according to the present disclosure is implemented so that, when a change in a working condition occurs such as when an unexpected obstacle appears in a predetermined traveling path according to the automatic steering, the automatic steering is changed to the manual steering just by the driver turning the steering wheel. Accordingly, the hydraulic steering device 1 for an agricultural vehicle according to the present disclosure is able to improve its ability to handle a change in a working condition and thus lower the risk of accidents.

Hereinafter, the steering pump 2, the automatic steering unit 3, the manual steering unit 4, and the manual changing unit 5 will be described in detail with reference to the accompanying drawings.

Referring to FIG. 2, the steering pump 2 supplies a working fluid. The steering pump 2 may be connected to the automatic steering unit 3. The steering pump 2 may be connected to the manual changing unit 5 and may be connected to the manual steering unit 4 through the manual changing unit 5. The steering pump 2 may be connected to each of the automatic steering unit 3 and the manual changing unit 5 through a pump supply line 2a. The steering pump 2 may operate using a driving force generated by an engine (not illustrated) of the agricultural vehicle 100. The steering pump 2 may be connected to a storage tank (not illustrated) in which a working fluid is stored. The working fluid may be oil.

Referring to FIGS. 2 to 7, the automatic steering unit 3 changes the traveling direction as the automatic steering is performed.

The automatic steering unit 3 may be connected to each of the steering pump 2 and the manual steering unit 4. In this case, the automatic steering unit 3 may be connected to the steering pump 2 through an automatic supply line 3a. The automatic supply line 3a may be connected to the pump supply line 2a and may be connected to the steering pump 2 through the pump supply line 2a. The automatic steering unit 3 may be connected to the manual steering unit 4 through a manual supply line 4a. When the automatic steering is performed in a state in which the manual steering is not performed, the automatic steering unit 3 may supply the working fluid supplied through the automatic supply line 3a to the steering cylinder 120 according to the automatic steering.

Here, the steering cylinder 120 may include a first hydraulic chamber 120a, a second hydraulic chamber 120b, and a steering rod 120c. As any one of the first hydraulic chamber 120a and the second hydraulic chamber 120b is filled with a working fluid and a working fluid is discharged from the other one, the direction of the wheels 111 and 111' may be changed as the steering rod 120c moves. Accordingly, the traveling direction may be changed. The first hydraulic chamber 120a and the second hydraulic chamber 120b may be implemented through a single hydraulic cylinder. Although not illustrated, the first hydraulic chamber 120a and the second hydraulic chamber 120b may also be implemented through different hydraulic cylinders. In this case, a first hydraulic cylinder having the first hydraulic chamber 120a and a second hydraulic cylinder having the second hydraulic chamber 120b may be disposed in opposite directions. The first hydraulic cylinder may move a first steering rod according to whether the first hydraulic chamber 120a is filled with a working fluid or whether a working fluid is discharged from the first hydraulic chamber 120a, thereby changing the direction of the wheel 111. The second hydraulic cylinder may move a second steering rod according to whether the second hydraulic chamber 120b is filled with a working fluid or whether a working fluid is discharged from the second hydraulic chamber 120b, thereby changing the direction of the wheel 111'.

According to control by the controller 130 (see FIG. 2), the automatic steering unit 3 may supply a working fluid to any one of the first hydraulic chamber 120a and the second hydraulic chamber 120b and, simultaneously, discharge a working fluid from the other one of the first hydraulic chamber 120a and the second hydraulic chamber 120b. The working fluid discharged from the steering cylinder 120 may be supplied to the manual steering unit 4 through the manual supply line 4a and may be discharged to the external device 140 via the manual steering unit 4. The automatic steering unit 3 may be connected to the first hydraulic chamber 120a through a first steering line 120d. The automatic steering unit 3 may be connected to the second hydraulic chamber 120b through a second steering line 120e.

Figure 5:
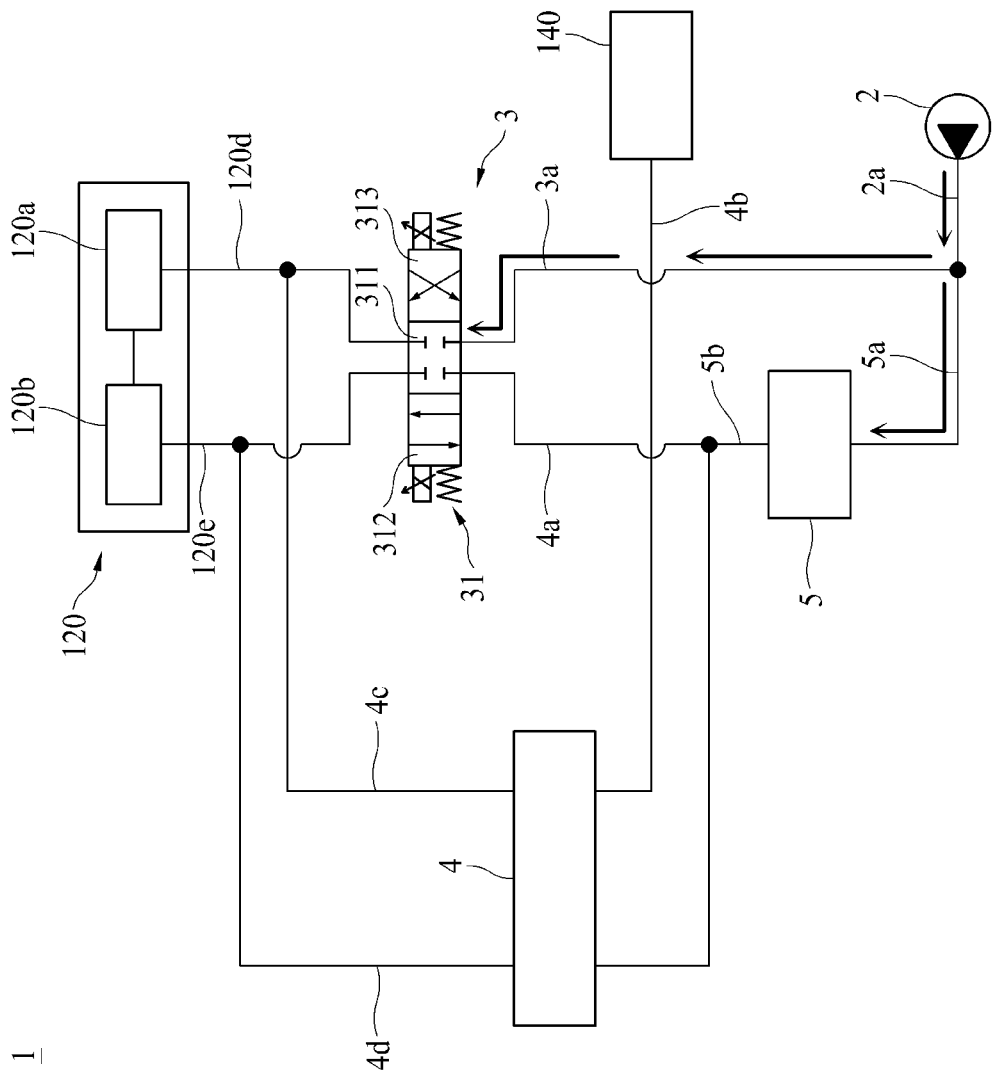
Figure 6:
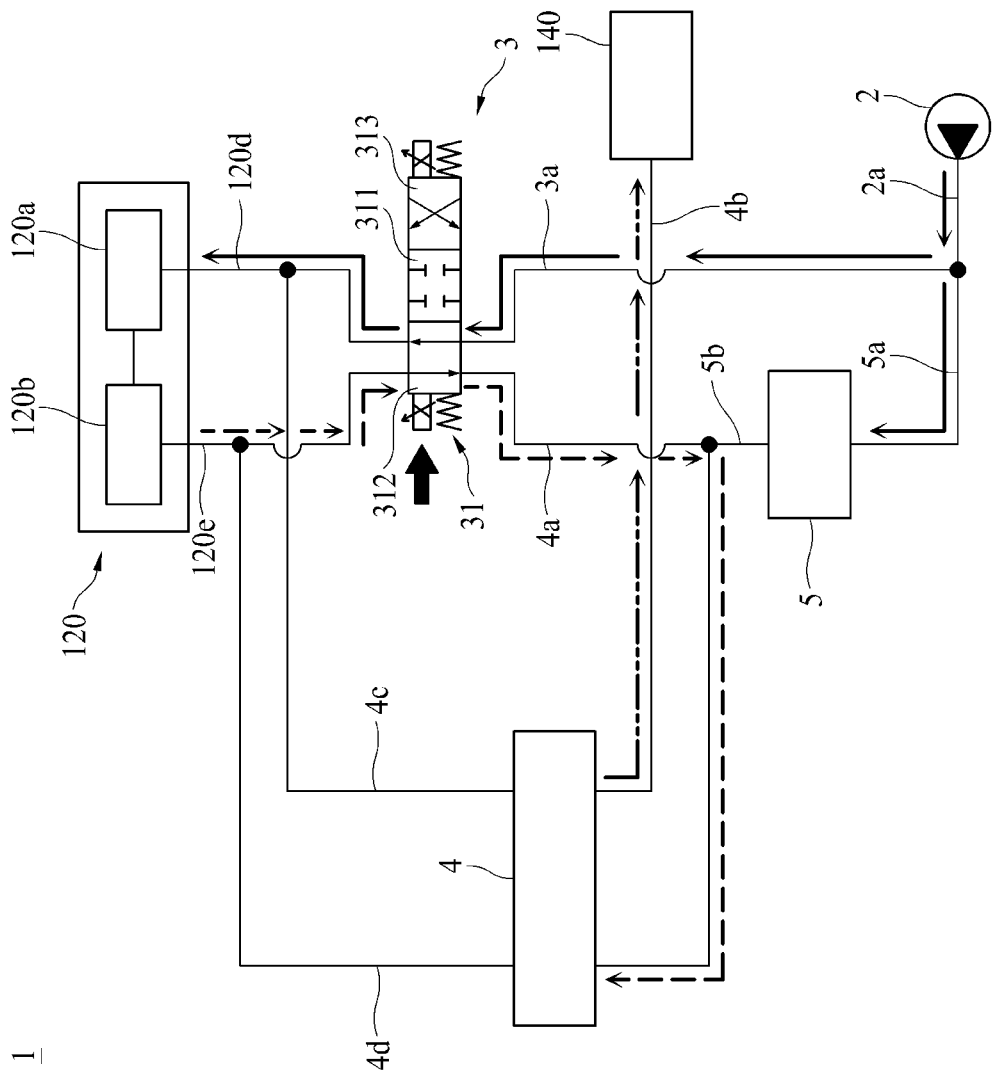
Figure 7:
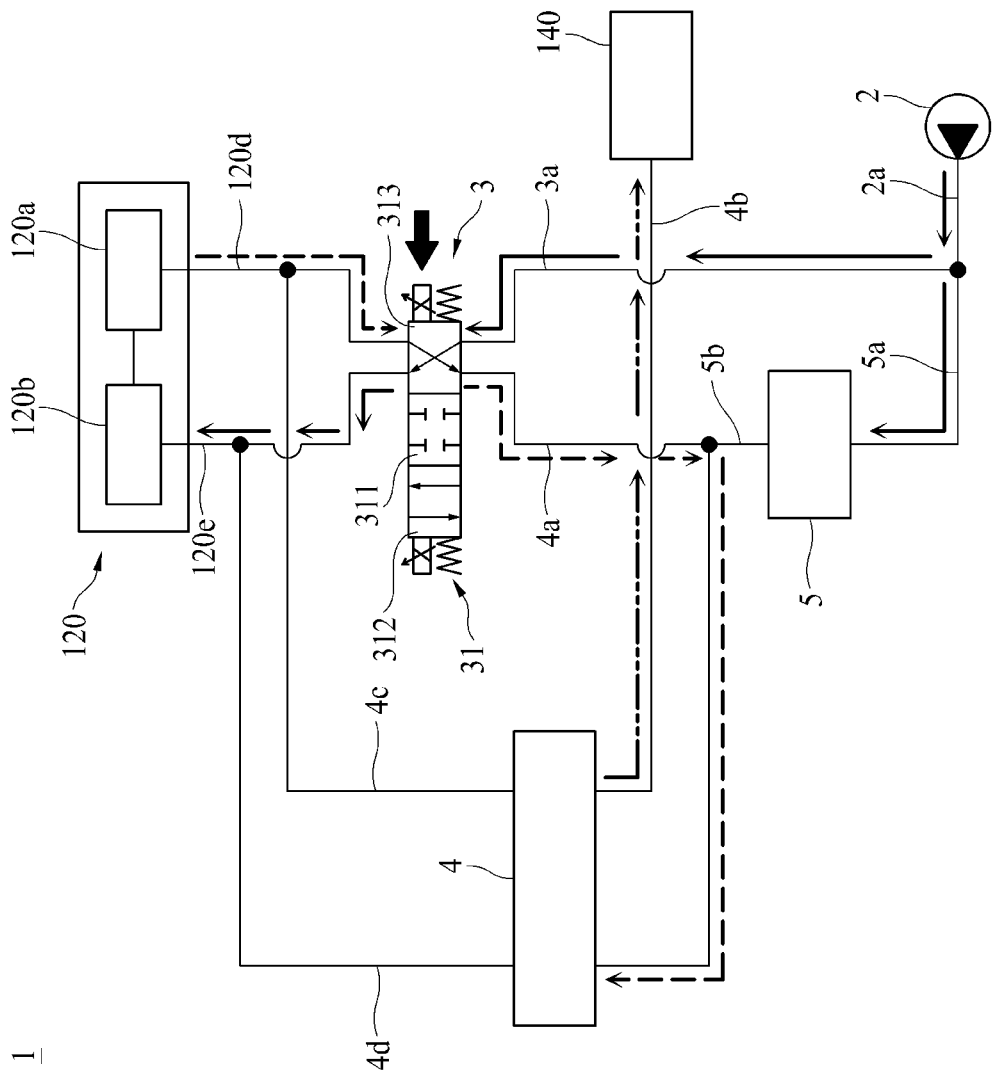

Referring to FIGS. 5 to 7, the automatic steering unit 3 may include an automatic steering valve 31.

The automatic steering valve 31 moves according to the automatic steering. The automatic steering valve 31 may move according to control by the controller 130 (see FIG. 2). The automatic steering valve 31 may move to change a flowing path of the working fluid supplied from the steering pump 2 according to the automatic steering.

The automatic steering valve 31 may include a first automatic steering mechanism 311, a second automatic steering mechanism 312, and a third automatic steering mechanism 313.

The first automatic steering mechanism 311 blocks the working fluid supplied from the steering pump 2 from being supplied to the steering cylinder 120. As illustrated in FIG. 5, as the automatic steering valve 31 moves, the first automatic steering mechanism 311 may be connected to each of the automatic supply line 3a, the manual supply line 4a, the first steering line 120d, and the second steering line 120e. Accordingly, the first automatic steering mechanism 311 may block all the lines from being connected to each other. Therefore, the first automatic steering mechanism 311 may block the working fluid from flowing to the first steering line 120d and the second steering line 120e from the automatic supply line 3a and may block the working fluid from flowing to the manual supply line 4a from the first steering line 120d and the second steering line 120e.

The second automatic steering mechanism 312 allows the working fluid supplied from the steering pump 2 to be supplied to the steering cylinder 120. As illustrated in FIG. 6, as the automatic steering valve 31 moves, the second automatic steering mechanism 312 may be connected to each of the automatic supply line 3a, the manual supply line 4a, the first steering line 120d, and the second steering line 120e. Accordingly, the second automatic steering mechanism 312 may connect the automatic supply line 3a and the first steering line 120d and, simultaneously, connect the second steering line 120e and the manual supply line 4a. Therefore, the second automatic steering mechanism 312 may cause the working fluid to pass so that the working fluid flows from the automatic supply line 3a to the first steering line 120d and may cause the working fluid to pass so that the working fluid flows from the second steering line 120e to the manual supply line 4a. Accordingly, since the working fluid is discharged from the second hydraulic chamber 120b while the first hydraulic chamber 120a is being filled with the working fluid, the steering cylinder 120 may change the traveling direction to a first direction. Meanwhile, the working fluid discharged from the second hydraulic chamber 120b may be discharged to the external device 140 through a discharge line 4b via the second steering line 120e, the second automatic steering mechanism 312, the manual supply line 4a, and the manual steering unit 4.

The third automatic steering mechanism 313 allows the working fluid supplied from the steering pump 2 to be supplied to the steering cylinder 120. As illustrated in FIG. 7, as the automatic steering valve 31 moves, the third automatic steering mechanism 313 may be connected to each of the automatic supply line 3a, the manual supply line 4a, the first steering line 120d, and the second steering line 120e. Accordingly, the third automatic steering mechanism 313 may connect the automatic supply line 3a and the second steering line 120e and, simultaneously, connect the first steering line 120d and the manual supply line 4a. Therefore, the third automatic steering mechanism 313 may cause the working fluid to pass so that the working fluid flows from the automatic supply line 3a to the second steering line 120e and may cause the working fluid to pass so that the working fluid flows from the first steering line 120d to the manual supply line 4a. Accordingly, since the working fluid is discharged from the first hydraulic chamber 120a while the second hydraulic chamber 120b is being filled with the working fluid, the steering cylinder 120 may change the traveling direction to a second direction. The second direction is a direction opposite to the first direction. Meanwhile, the working fluid discharged from the first hydraulic chamber 120a may be discharged to the external device 140 through the discharge line 4b via the first steering line 120d, the third automatic steering mechanism 313, the manual supply line 4a, and the manual steering unit 4.

With respect to a direction in which the automatic steering valve 31 moves, an elastic member may be coupled to both sides of the automatic steering valve 31. The elastic members may elastically press both sides of the automatic steering valve 31. Accordingly, when the automatic steering is not performed, the automatic steering valve 31 may be disposed at a position where the first automatic steering mechanism 311 is connected to each of the automatic supply line 3a, the manual supply line 4a, the first steering line 120d, and the second steering line 120e.

Figure 8:
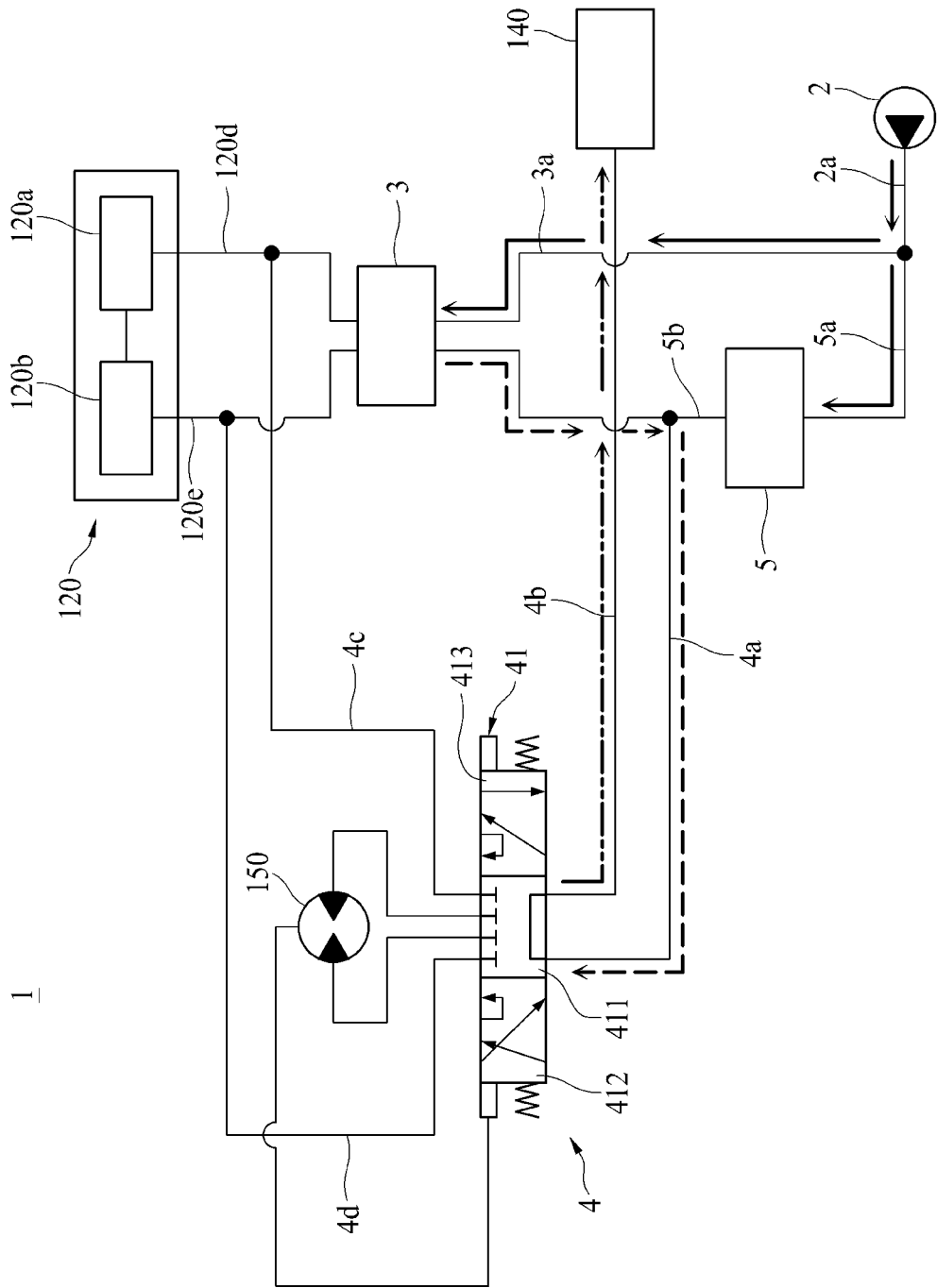
Figure 9:
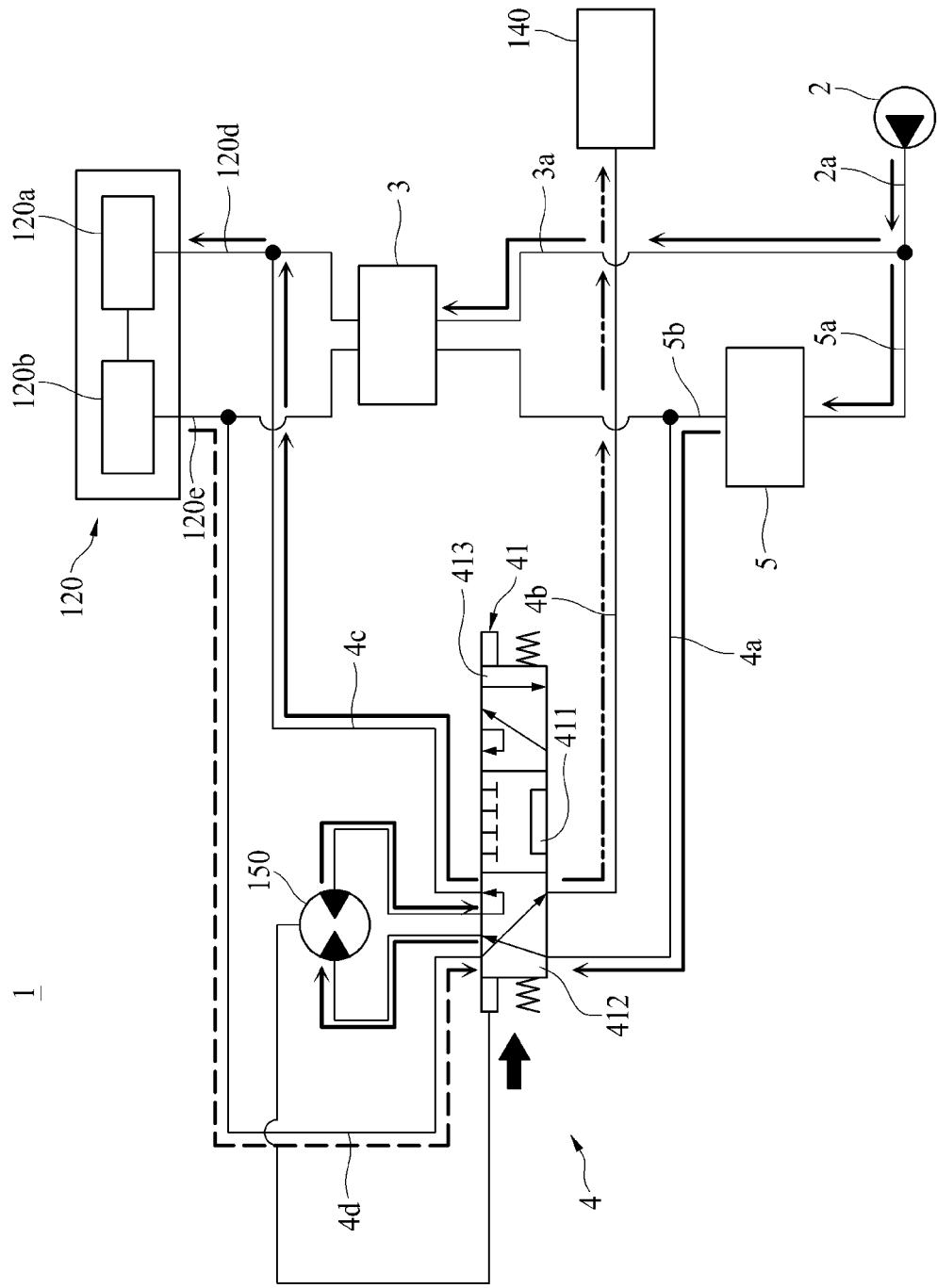
Figure 10:
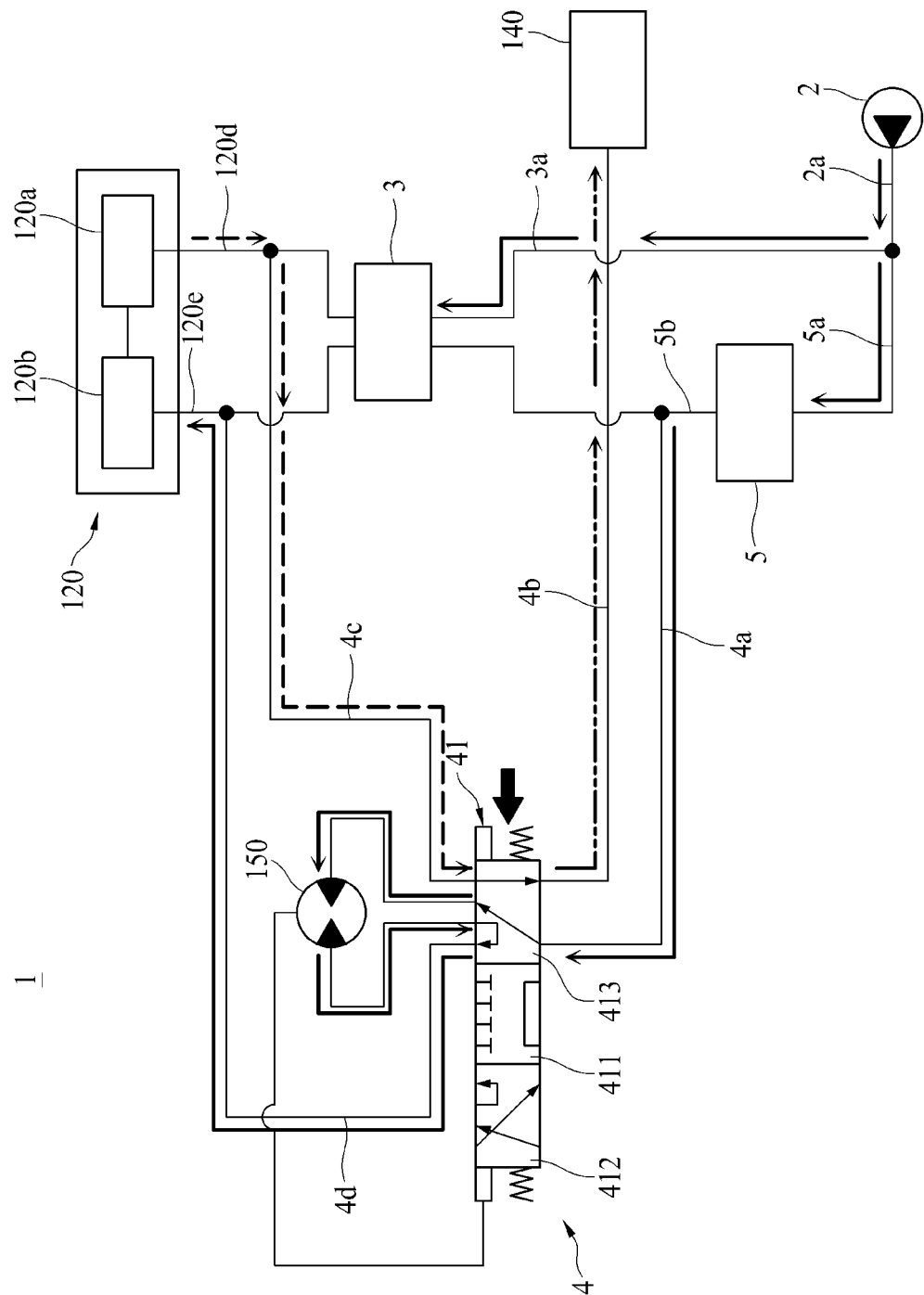
Figure 11:
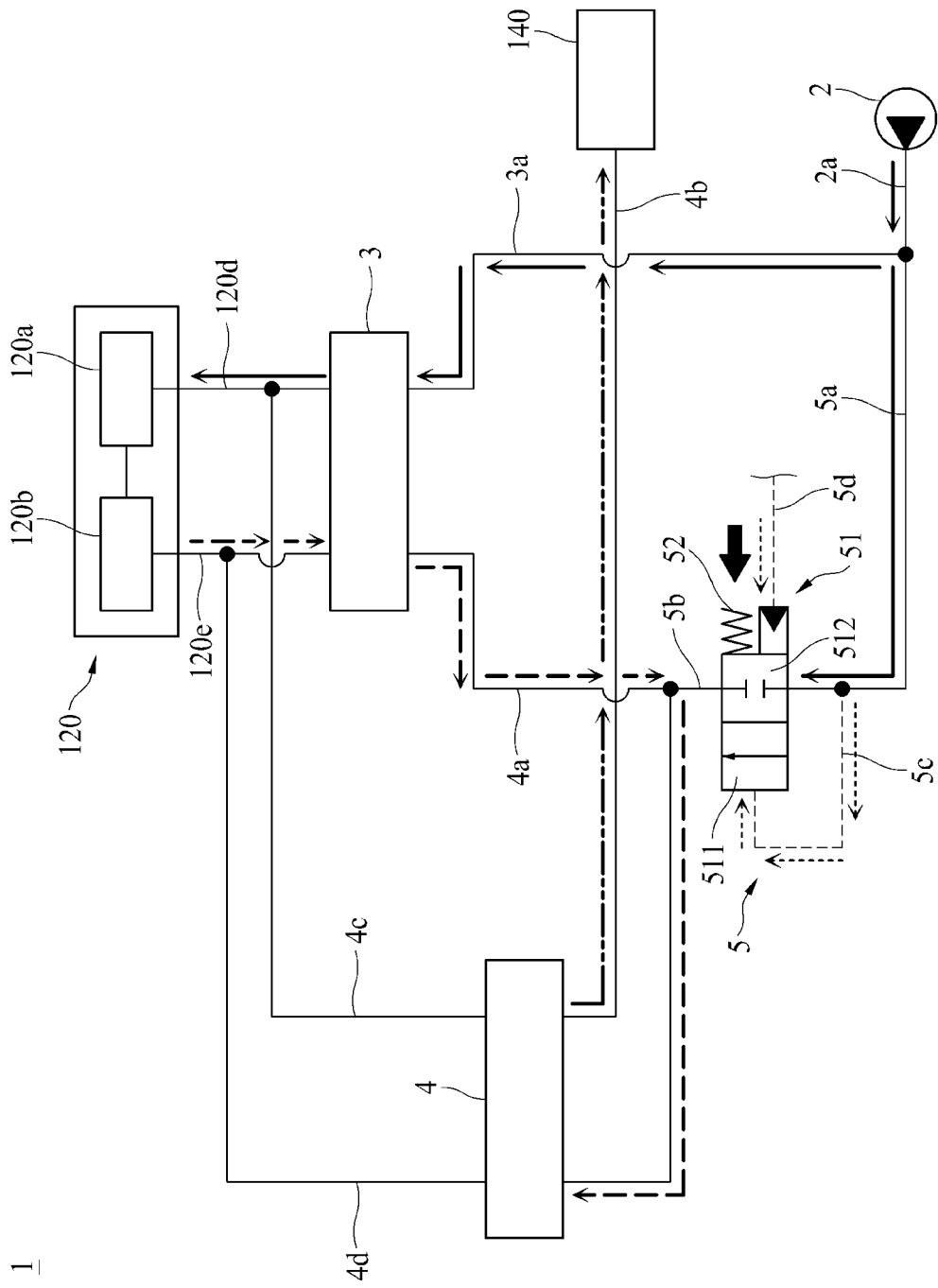

Referring to FIGS. 8 to 10, the manual steering unit 4 changes the traveling direction as the manual steering is performed.

The manual steering unit 4 may be connected to each of the steering pump 2 and the automatic steering unit 3. The manual steering unit 4 may be connected to the steering pump 2 through the manual changing unit 5. The manual steering unit 4 may be connected to the automatic steering unit 3 through the manual supply line 4a. In this case, the manual supply line 4a may be connected to each of the manual steering unit 4, the manual changing unit 5, and the automatic steering unit 3. The manual steering unit 4 may be connected to the external device 140 through the discharge line 4b.

The manual steering unit 4 may be connected to the steering cylinder 120. The manual steering unit 4 may be connected to the steering cylinder 120 through a first manual steering line 4c and a second manual steering line 4d. The first manual steering line 4c may be connected to the first steering line 120d and may be connected to the first hydraulic chamber 120a through the first steering line 120d. The second manual steering line 4d may be connected to the second steering line 120e and may be connected to the second hydraulic chamber 120b through the second steering line 120e.

Referring to FIGS. 8 to 10, the manual steering unit 4 may include a manual steering valve 41.

The manual steering valve 41 moves according to the manual steering. The manual steering valve 41 may move as the steering wheel is turned. The manual steering valve 41 may move to change a flowing path of the working fluid, which is supplied from the steering pump 2, through the manual changing unit 5 according to the manual steering. At an inlet side of the manual steering valve 41, the manual supply line 4a and the discharge line 4b may be connected. At an outlet side of the manual steering valve 41, the first manual steering line 4c and the second manual steering line 4d may be connected. A hydraulic motor 150 may be additionally connected to the manual steering valve 41. When, as the manual steering is performed, the working fluid is supplied from the manual steering valve 41 to the steering cylinder 120, the working fluid may flow to the manual steering valve 41 again via the hydraulic motor 150 and then be supplied from the manual steering valve 41 to the first manual steering line 4c or the second manual steering line 4d.

The manual steering valve 41 may include a first manual steering mechanism 411, a second manual steering mechanism 412, and a third manual steering mechanism 413.

The first manual steering mechanism 411 blocks a working fluid supplied from the manual supply line 4a from being supplied to the steering cylinder 120. In this case, the working fluid supplied from the manual supply line 4a may have been, according to the automatic steering, supplied via the automatic steering unit 3 after being discharged from the steering cylinder 120. The working fluid supplied from the manual supply line 4a may have been supplied from the manual changing unit 5 when the automatic steering is not performed. The first manual steering mechanism 411 may allow the working fluid supplied from the manual supply line 4a to be supplied to the discharge line 4b. As illustrated in FIG. 8, as the manual steering valve 41 moves, the first manual steering mechanism 411 may be connected to each of the manual supply line 4a, the discharge line 4b, the first manual steering line 4c, the second manual steering line 4d, and the hydraulic motor 150. Accordingly, the first manual steering mechanism 411 may, while connecting only the manual supply line 4a and the discharge line 4b, block the other lines from being connected to each other. Therefore, the first manual steering mechanism 411 may cause the working fluid supplied from the manual supply line 4a to pass so that the working fluid flows to the discharge line 4b. In this case, the working fluid supplied from the manual supply line 4a may be discharged to the external device 140 via the first manual steering mechanism 411 and the discharge line 4b. Therefore, the hydraulic steering device 1 for an agricultural vehicle according to the present disclosure is implemented so that the working fluid may be discharged to the external device 140 through a single discharge line 4b, not only when the manual steering is performed, but also when the automatic steering is performed.

The second manual steering mechanism 412 allows the working fluid supplied from the manual supply line 4a to be supplied to the steering cylinder 120. In this case, the working fluid supplied from the manual supply line 4a is supplied from the steering pump 2 through the manual changing unit 5 according to the manual steering. As illustrated in FIG. 9, as the manual steering valve 41 moves, the second manual steering mechanism 412 may be connected to each of the manual supply line 4a, the discharge line 4b, the first manual steering line 4c, the second manual steering line 4d, and the hydraulic motor 150. Accordingly, the second manual steering mechanism 412 may connect the manual supply line 4a and the hydraulic motor 150 and, simultaneously, connect the hydraulic motor 150 and the first manual steering line 4c. That is, the second manual steering mechanism 412 may connect the manual supply line 4a and the first manual steering line 4c. Simultaneously, the second manual steering mechanism 412 may connect the second manual steering line 4d and the discharge line 4b. Therefore, the second manual steering mechanism 412 may cause the working fluid to pass so that the working fluid flows from the manual supply line 4a to the first manual steering line 4c and may cause the working fluid to pass so that the working fluid flows from the second manual steering line 4d to the discharge line 4b. Accordingly, since the working fluid is discharged from the second hydraulic chamber 120b while the first hydraulic chamber 120a is being filled with the working fluid, the steering cylinder 120 may change the traveling direction to the first direction. Meanwhile, the working fluid discharged from the second hydraulic chamber 120b may be discharged to the external device 140 through the discharge line 4b via the second manual steering line 4d and the second manual steering mechanism 412.

The third manual steering mechanism 413 allows the working fluid supplied from the manual supply line 4a to be supplied to the steering cylinder 120. In this case, the working fluid supplied from the manual supply line 4a may be supplied from the steering pump 2 through the manual changing unit 5 according to the manual steering. As illustrated in FIG. 10, as the manual steering valve 41 moves, the third manual steering mechanism 413 may be connected to each of the manual supply line 4a, the discharge line 4b, the second manual steering line 4d, the first manual steering line 4c, and the hydraulic motor 150. Accordingly, the third manual steering mechanism 413 may connect the manual supply line 4a and the hydraulic motor 150 and, simultaneously, connect the hydraulic motor 150 and the second manual steering line 4d. That is, the third manual steering mechanism 413 may connect the manual supply line 4a and the second manual steering line 4d. Simultaneously, the third manual steering mechanism 413 may connect the first manual steering line 4c and the discharge line 4b. Therefore, the third manual steering mechanism 413 may cause the working fluid to pass so that the working fluid flows from the manual supply line 4a to the second manual steering line 4d and may cause the working fluid to pass so that the working fluid flows from the first manual steering line 4c to the discharge line 4b. Accordingly, since the working fluid is discharged from the first hydraulic chamber 120a while the second hydraulic chamber 120b is being filled with the working fluid, the steering cylinder 120 may change the traveling direction to the second direction. Meanwhile, the working fluid discharged from the first hydraulic chamber 120a may be discharged to the external device 140 through the discharge line 4b via the first manual steering line 4c and the third manual steering mechanism 413.

With respect to a direction in which the manual steering valve 41 moves, an elastic member may be coupled to both sides of the manual steering valve 41. The elastic members may elastically press both sides of the manual steering valve 41. Accordingly, when the manual steering is not performed, the manual steering valve 41 may be disposed at a position where the first manual steering mechanism 411 is connected to each of the manual supply line 4a, the discharge line 4b, the first manual steering line 4c, the second manual steering line 4d, and the hydraulic motor 150.

Referring to FIGS. 3 to 10, the manual changing unit 5 selectively causes the working fluid supplied from the steering pump 2 to pass according to whether the manual steering is performed.

When the manual steering is performed, as illustrated in FIG. 4, the manual changing unit 5 may allow passage of the working fluid supplied from the steering pump 2. Accordingly, the working fluid supplied by the steering pump 2 may be supplied to the manual steering unit 4 through the manual changing unit 5. Since this is a state in which the manual steering is performed, the working fluid supplied to the manual steering unit 4 may be supplied to the steering cylinder 120.

When the automatic steering is performed in a state in which the manual steering is not performed, as illustrated in FIG. 3, the manual changing unit 5 may block passage of the working fluid supplied from the steering pump 2. Accordingly, the working fluid supplied by the steering pump 2 is not able to be supplied to the manual steering unit 4 through the manual changing unit 5. The working fluid supplied by the steering pump 2 may be supplied to the steering cylinder 120 through the automatic steering unit 3.

When the automatic steering is not performed in the state in which the manual steering is not performed, as illustrated in FIG. 4, the manual changing unit 5 may allow passage of the working fluid supplied from the steering pump 2. Accordingly, the working fluid supplied by the steering pump 2 may be supplied to the manual steering unit 4 through the manual changing unit 5. Since this is a state in which the manual steering is not performed, the working fluid supplied to the manual steering unit 4 may be discharged to the external device 140 through the discharge line 4b without being supplied to the steering cylinder 120. Therefore, it is possible to prevent application of excessive pressure to the pump supply line 2a, the automatic supply line 3a, and the like due to the steering pump 2 continuing to supply the working fluid.

The manual changing unit 5 may be connected to each of the steering pump 2 and the manual steering unit 4. The manual changing unit 5 may be connected to the steering pump 2 through a changing supply line 5a. The changing supply line 5a may be connected to the pump supply line 2a and may be connected to the steering pump 2 through the pump supply line 2a. The manual changing unit 5 may be connected to the manual steering unit 4 through a changing discharge line 5b. The changing discharge line 5b may be connected to the manual supply line 4a and may be connected to the manual steering unit 4 through the manual supply line 4a.

The manual changing unit 5 may include a manual changing valve 51.

The manual changing valve 51 moves between a manual blocking position and a manual changing position. As illustrated in FIG. 3, when the manual changing valve 51 is disposed at the manual blocking position, the manual changing valve 51 may block supply of the working fluid from the changing supply line 5a to the changing discharge line 5b. Accordingly, the working fluid supplied by the steering pump 2 may be blocked by the manual changing valve 51 so that the working fluid is not able to be supplied to the manual steering unit 4 through the manual changing unit 5. This case may be a state in which the automatic steering is performed in a state in which the manual steering is not performed. As illustrated in FIG. 4, when the manual changing valve 51 is disposed at the manual changing position, the manual changing valve 51 may allow supply of the working fluid from the changing supply line 5a to the changing discharge line 5b. Accordingly, the working fluid supplied by the steering pump 2 may be supplied to the manual steering unit 4 through the manual changing valve 51. This case may be a state in which the manual steering is performed or a state in which neither the manual steering nor the automatic steering is performed. The manual changing valve 51 may move between the manual blocking position and the manual changing position according to a hydraulic pressure of the working fluid flowing along the changing supply line 5a.

The manual changing valve 51 may include a manual changing mechanism 511 and a manual blocking mechanism 512.

The manual changing mechanism 511 allows passage of a working fluid. As illustrated in FIG. 4, when the manual changing valve 51 is disposed at the manual changing position, the manual changing mechanism 511 may be connected to each of the changing supply line 5a and the changing discharge line 5b. Accordingly, the working fluid supplied from the steering pump 2 may pass through the manual changing valve 51 and be supplied to the manual steering unit 4.

The manual blocking mechanism 512 blocks passage of a working fluid. As illustrated in FIG. 3, when the manual changing valve 51 is disposed at the manual blocking position, the manual blocking mechanism 512 may be connected to each of the changing supply line 5a and the changing discharge line 5b. Accordingly, since the working fluid supplied from the steering pump 2 is not able to pass through the manual changing valve 51, the working fluid is not able to be supplied to the manual steering unit 4 through the manual changing valve 51.

The manual changing unit 5 may include a first changing control line 5c and a manual blocking elastic member 52.

The first changing control line 5c is connected to each of the changing supply line 5a and one side of the manual changing valve 51. A portion of the working fluid flowing along the changing supply line 5a may be branched to the first changing control line 5c and then, while flowing along the first changing control line 5c, press the one side of the manual changing valve 51. In this case, due to the working fluid flowing along the first changing control line 5c, the manual changing valve 51 may be pressed in a direction in which the manual changing valve 51 moves from the manual blocking position to the manual changing position.

The manual blocking elastic member 52 is coupled to the other side of the manual changing valve 51. The manual blocking elastic member 52 may press the other side of the manual changing valve 51 in a direction in which the manual changing valve 51 moves from the manual changing position to the manual blocking position. Accordingly, while the one side of the manual changing valve 51 is pressed due to a hydraulic pressure of the working fluid flowing along the first changing control line 5c, the other side of the manual changing valve 51 may be pressed due to an elastic force of the manual blocking elastic member 52. Therefore, using a difference between the hydraulic pressure of the working fluid flowing along the first changing control line 5c and the elastic force of the manual blocking elastic member 52, the manual changing valve 51 may move between the manual blocking position and the manual changing position. In this case, since the elastic force of the manual blocking elastic member 52 is a predetermined value, the manual changing valve 51 may move between the manual blocking position and the manual changing position according to the hydraulic pressure of the working fluid flowing along the first changing control line 5c. The hydraulic pressure of the working fluid flowing along the first changing control line 5c and the hydraulic pressure of the working fluid flowing along the changing supply line 5a may be equal to each other.

When the manual steering is performed, the hydraulic pressure of the working fluid flowing along the first changing control line 5c may be increased to be greater than the elastic force of the manual blocking elastic member 52. Accordingly, when the manual steering is performed, the manual changing valve 51 may be moved to the manual changing position. Therefore, the working fluid supplied by the steering pump 2 may pass through the manual changing valve 51 and be supplied to the manual steering unit 4. In this case, the working fluid supplied by the steering pump 2 may be supplied to the steering cylinder 120 via the manual changing unit 5 and the manual steering unit 4.

When the automatic steering is performed in a state in which the manual steering is not performed, the hydraulic pressure of the working fluid flowing along the first changing control line 5c may be decreased to be less than the elastic force of the manual blocking elastic member 52. Accordingly, when the automatic steering is performed in the state in which the manual steering is not performed, the manual changing valve 51 may move to the manual blocking position. Therefore, since the working fluid supplied by the steering pump 2 is not able to pass through the manual changing valve 51, the working fluid is not able to be supplied to the manual steering unit 4 through the manual changing valve 51. In this case, the working fluid supplied by the steering pump 2 may be supplied to the steering cylinder 120 via the automatic steering unit 3 without passing through the manual changing unit 5.

When the automatic steering is not performed in the state in which the manual steering is not performed, the hydraulic pressure of the working fluid flowing along the first changing control line 5c may be increased to be greater than the elastic force of the manual blocking elastic member 52. This is because, since the steering pump 2 continues to supply the working fluid in a state in which the working fluid passes through neither the automatic steering unit 3 nor the manual changing unit 5, the hydraulic pressure of the working fluid flowing along the first changing control line 5c is increased. Accordingly, when the automatic steering is not performed in the state in which the manual steering is not performed, the manual changing valve 51 may move to the manual changing position. Therefore, the working fluid supplied by the steering pump 2 may pass through the manual changing valve 51 and be supplied to the manual steering unit 4. In this case, the working fluid supplied by the steering pump 2 may be discharged to the external device 140 through the discharge line 4b via the manual changing unit 5 and the manual steering unit 4.

Referring to FIGS. 3 to 13, the manual changing unit 5 may include a second changing control line 5d.

The second changing control line 5d is connected to the other side of the manual changing valve 51. Since the second changing control line 5d is connected to the other side of the manual changing valve 51, a working fluid flowing along the second changing control line 5d may press the other side of the manual changing valve 51. Accordingly, a pressing force, which is the sum of the elastic force of the manual blocking elastic member 52 and the hydraulic pressure of the working fluid flowing along the second changing control line 5d, may press the other side of the manual changing valve 51 in a direction in which the manual changing valve 51 moves from the manual changing position to the manual blocking position. The working fluid flowing along the second changing control line 5d is a branched portion of the working fluid flowing to be supplied to the steering cylinder 120. Accordingly, the hydraulic steering device 1 for an agricultural vehicle according to the present disclosure may, when the automatic steering is performed in the state in which the manual steering is not performed, use a portion of the working fluid for the automatic steering to place the manual changing valve 51 at the manual blocking position. Therefore, the hydraulic steering device 1 for an agricultural vehicle according to the present disclosure may improve stability for the automatic steering in the state in which the manual steering is not performed.

Meanwhile, when the manual steering is performed, the hydraulic pressure of the working fluid flowing along the first changing control line 5c becomes greater than the pressing force which is the sum of the elastic force of the manual blocking elastic member 52 and the hydraulic pressure of the working fluid flowing along the second changing control line 5d. Accordingly, the manual changing valve 51 may, by moving to the manual changing position, supply the working fluid to the manual steering unit 4.

Figure 12:
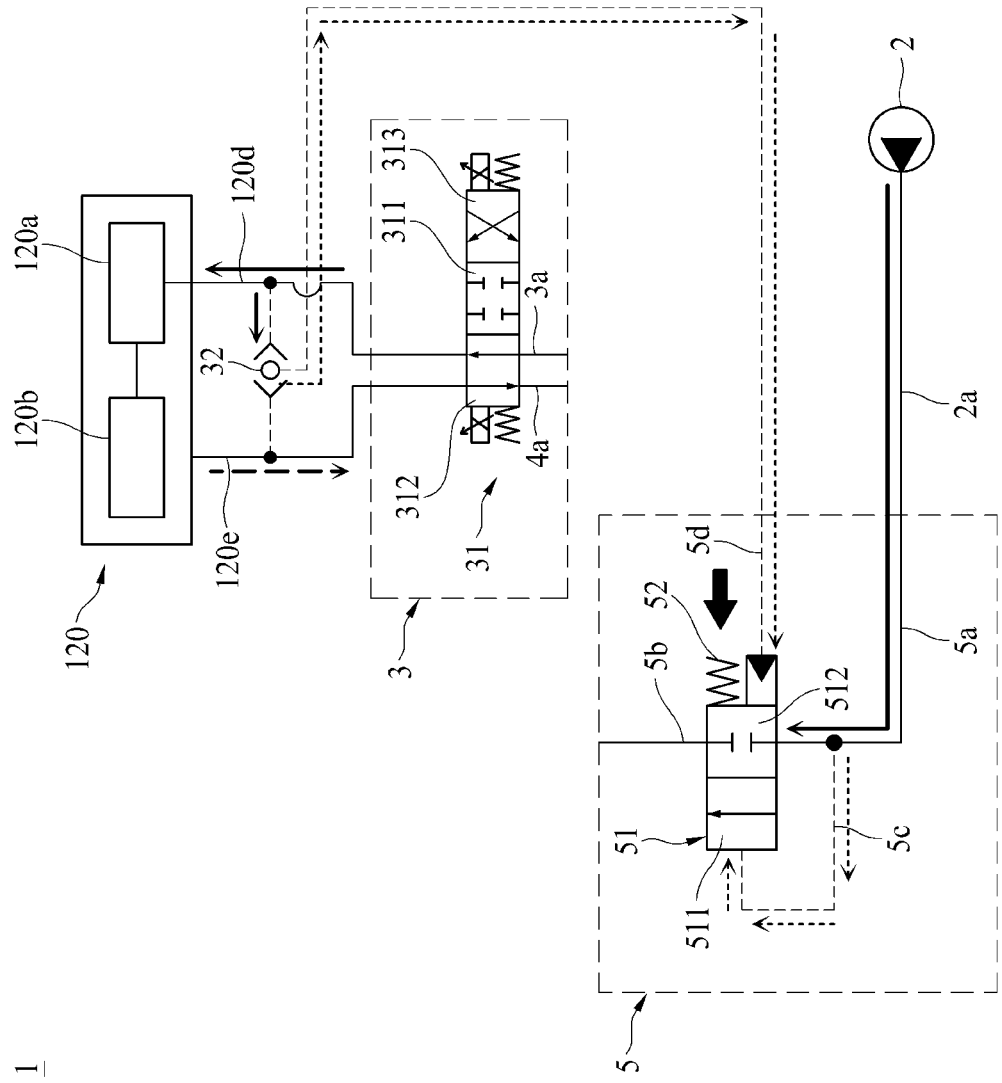

As illustrated in FIG. 12, the second changing control line 5d may be connected to a shuttle valve 32 connected to each of the first steering line 120d and the second steering line 120e. In this case, one side of the second changing control line 5d may be connected to the other side of the manual changing valve 51, and simultaneously, the other side of the second changing control line 5d may be connected to the shuttle valve 32. Accordingly, when the automatic steering is performed in the state in which the manual steering is not performed, a portion of the working fluid supplied to the steering cylinder 120 along any one of the first steering line 120d and the second steering line 120e may be branched to the shuttle valve 32 and then supplied to the second changing control line 5d through the shuttle valve 32. The working fluid supplied to the second changing control line 5d through the shuttle valve 32 may press the other side of the manual changing valve 51. Therefore, the hydraulic steering device 1 for an agricultural vehicle according to the present disclosure may be implemented to place the manual changing valve 51 at the manual blocking position using a portion of the working fluid supplied to the steering cylinder 120 along any one of the first steering line 120d and the second steering line 120e. Meanwhile, although a portion of the working fluid supplied to the steering cylinder 120 along the first steering line 120d is illustrated as being supplied to the second changing control line 5d in FIG. 12, when the position of the automatic steering valve 31 is changed due to a change in a direction of the automatic steering, a portion of the working fluid supplied to the steering cylinder 120 along the second steering line 120e may also be supplied to the second changing control line 5d.

Figure 13:
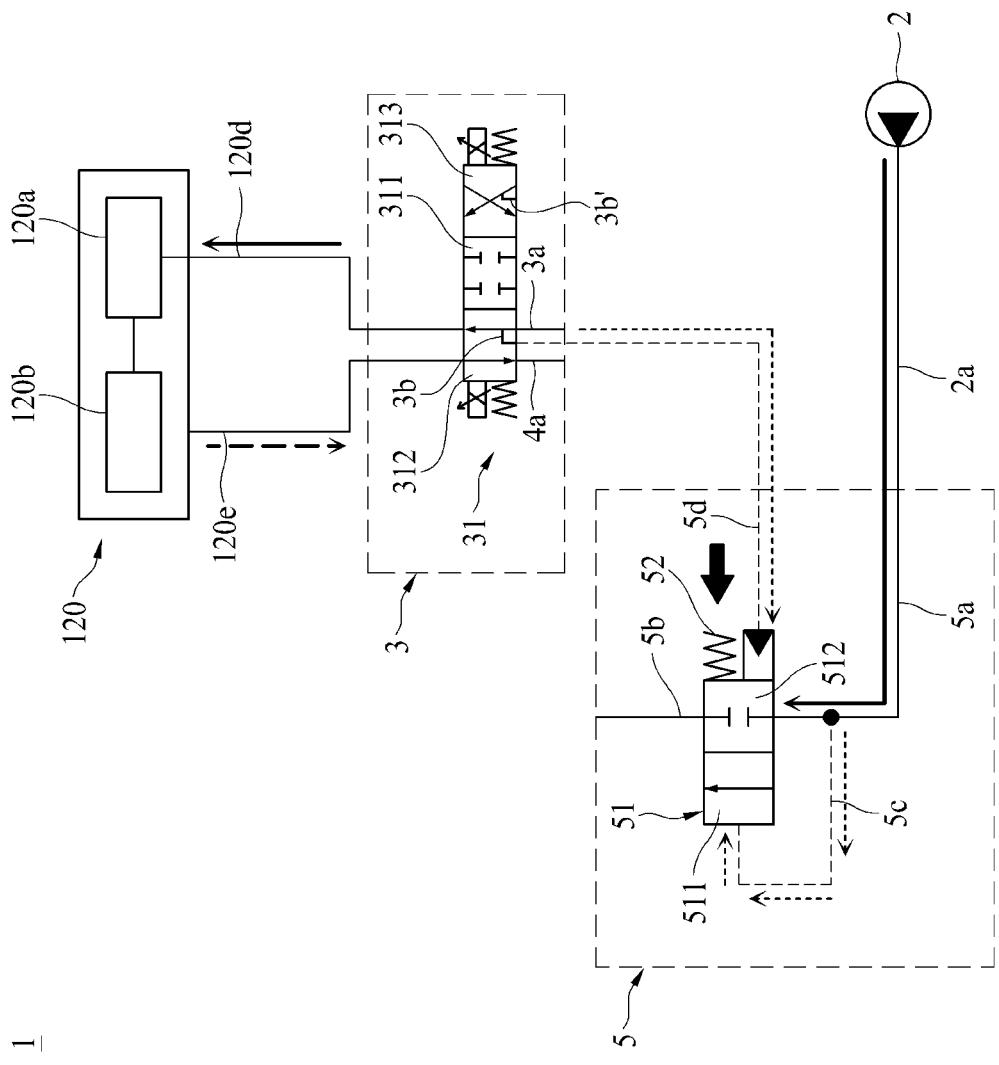

As illustrated in FIG. 13, the second changing control line 5d may also be connected to the automatic steering valve 31. In this case, one side of the second changing control line 5d may be connected to the other side of the manual changing valve 51, and simultaneously, the other side of the second changing control line 5d may be connected to the automatic steering valve 31. Accordingly, when the automatic steering is performed, a portion of the working fluid flowing to pass through the automatic steering valve 31 may be branched and supplied to the second changing control line 5d and then may flow along the second changing control line 5d and press the other side of the manual changing valve 51. Therefore, the hydraulic steering device 1 for an agricultural vehicle according to the present disclosure may be implemented to place the manual changing valve 51 at the manual blocking position using a portion of the working fluid passing through the automatic steering valve 31 to be supplied to the steering cylinder 120. Meanwhile, although a portion of the working fluid passing through the second automatic steering mechanism 312 to be supplied to the steering cylinder 120 is illustrated as being supplied to the second changing control line 5d in FIG. 13, when the position of the automatic steering valve 31 is changed due to a change in a direction of the automatic steering, a portion of the working fluid passing through the third automatic steering mechanism 313 to be supplied to the steering cylinder 120 may also be supplied to the second changing control line 5d. In this case, the automatic steering valve 31 may include branching control lines 3b and 3b' configured to branch a portion of the working fluid supplied to the steering cylinder 120 to supply the portion of the working fluid to the second changing control line 5d. The branching control lines 3b and 3b' may be disposed at the second automatic steering mechanism 312 and the third automatic steering mechanism 313, respectively. The branching control line 3b disposed at the second automatic steering mechanism 312 may be connected to a line for connecting the automatic supply line 3a and the first steering line 120d at the second automatic steering mechanism 312. The branching control line 3b' disposed at the third automatic steering mechanism 313 may be connected to a line for connecting the automatic supply line 3a and the second steering line 120e at the third automatic steering mechanism 313. Although not illustrated, the branching control line may also be disposed at the first automatic steering mechanism 311.

Figure 14:
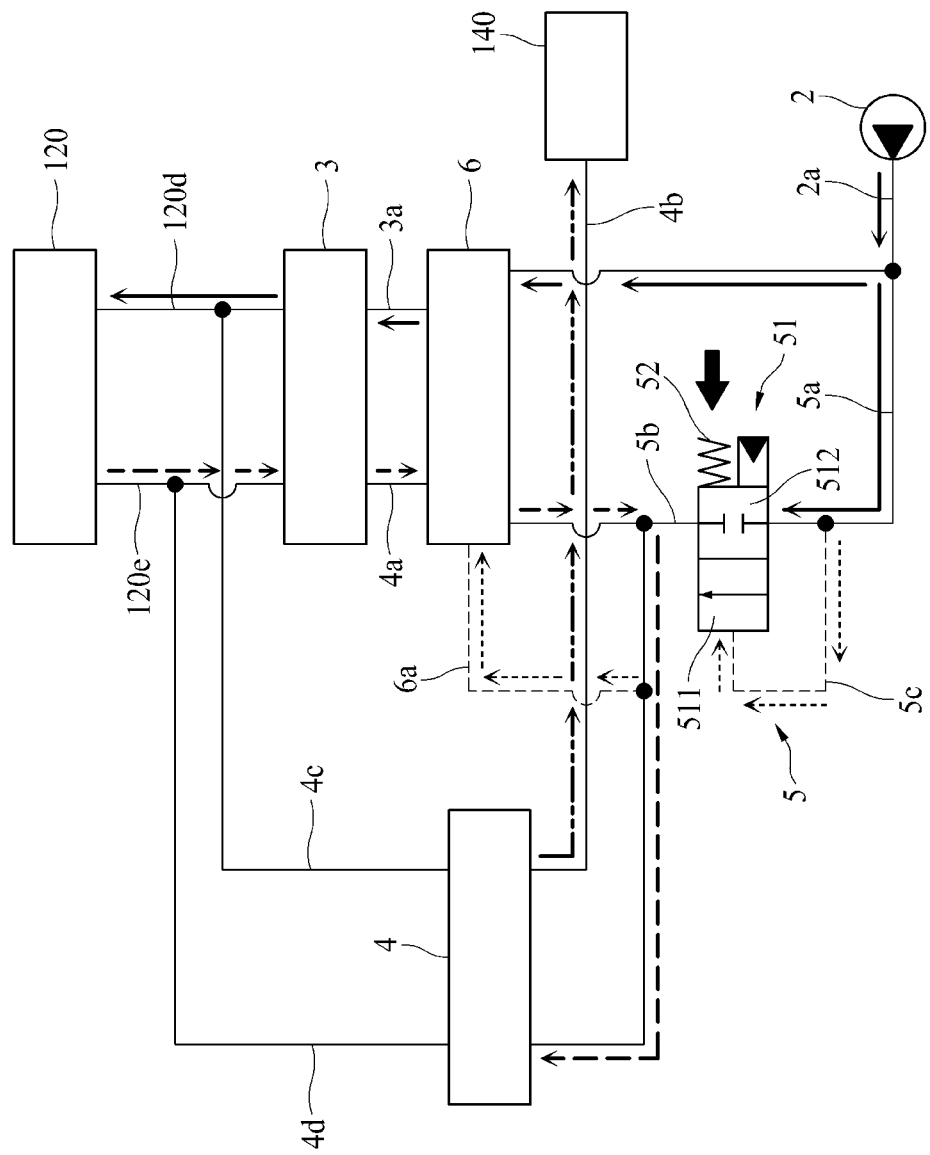
Figure 15:
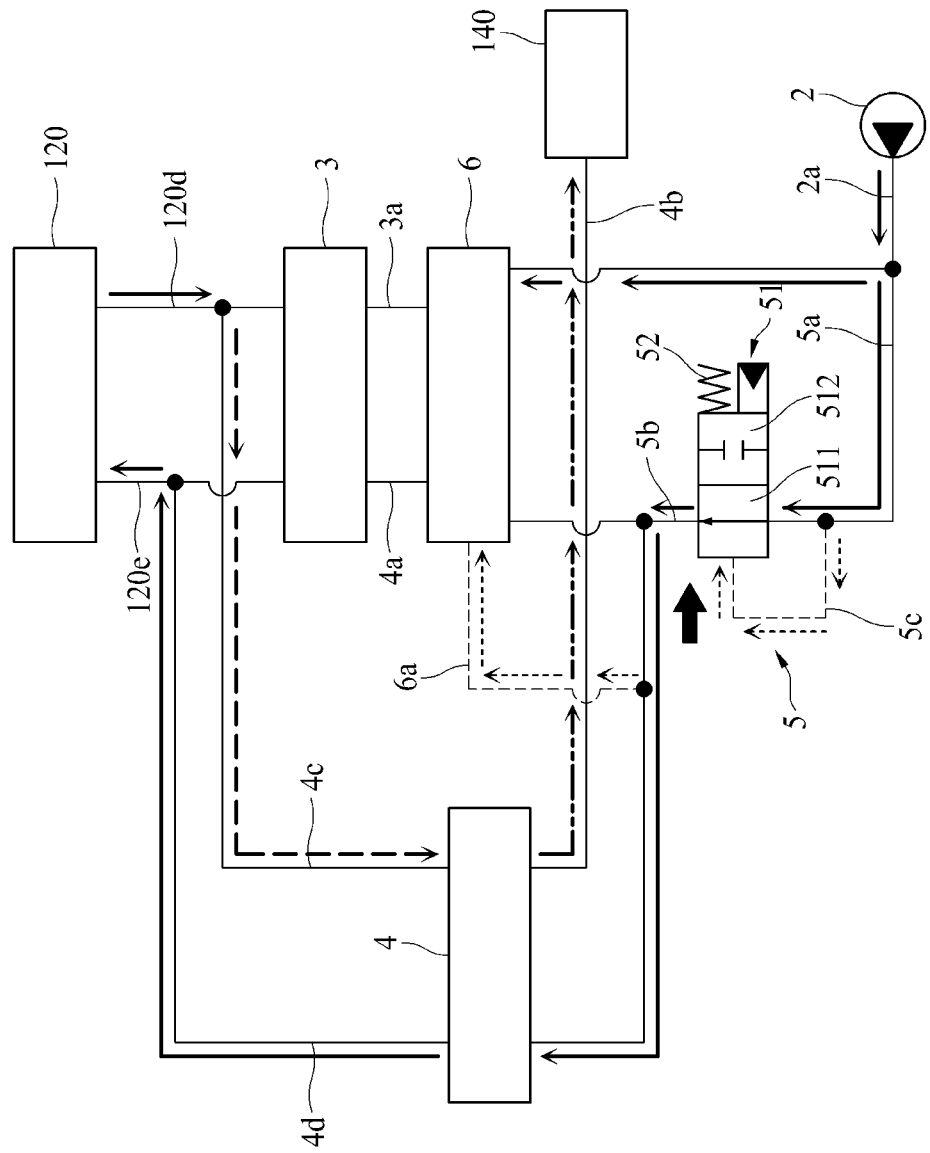

Referring to FIGS. 14 and 15, the hydraulic steering device 1 for an agricultural vehicle according to the present disclosure may include an automatic blocking unit 6.

The automatic blocking unit 6 selectively blocks a working fluid for the automatic steering from being supplied to the steering cylinder 120 according to whether the manual steering is performed. The automatic blocking unit 6 may be connected to the manual supply line 4a. Therefore, the automatic blocking unit 6 may selectively block passage of the working fluid for the automatic steering according to the hydraulic pressure of the working fluid flowing along the manual supply line 4a.

As illustrated in FIG. 14, when the manual steering is not performed, the automatic blocking unit 6 may cause the working fluid for the automatic steering to pass so that the working fluid for the automatic steering is supplied to the steering cylinder 120. In this case, the hydraulic pressure of the working fluid flowing along the manual supply line 4a may not be high enough to change an operational state of the automatic blocking unit 6 disposed at a position where the automatic blocking unit 6 causes the working fluid for the automatic steering to pass.

When the automatic steering is performed in the state in which the manual steering is not performed, the working fluid supplied by the steering pump 2 may flow along the automatic supply line 3a and pass through the automatic blocking unit 6 and the automatic steering unit 3 and then may flow along any one of the first steering line 120d and the second steering line 120e and be supplied to the steering cylinder 120. In this case, the working fluid discharged from the steering cylinder 120 may flow along the other one of the first steering line 120d and the second steering line 120e and be supplied to the automatic steering unit 3 and may pass through the automatic steering unit 3 and then flow along the manual supply line 4a. Then, the working fluid may flow along the manual supply line 4a, pass through the automatic blocking unit 6, and then be supplied to the manual steering unit 4. Then, the working fluid may, after passing through the manual steering unit 4, flow along the discharge line 4b and be discharged to the external device 140.

In the case of the moment when the manual steering is performed in a state in which the automatic steering is performed, the working fluid, which is discharged from the steering cylinder 120 and flows along the other one of the first steering line 120d and the second steering line 120e to be supplied to the automatic steering unit 3, may pass through the automatic steering unit 3 and then flow along the manual supply line 4a. Then, the working fluid may flow along the manual supply line 4a to pass through the automatic blocking unit 6 and then be supplied to the manual steering unit 4. Then, the working fluid may pass through the manual steering unit 4 and then flow along any one of the first manual steering line 4c and the second manual steering line 4d to be supplied to the steering cylinder 120. In this case, the working fluid, which is discharged from the steering cylinder 120 and flows along the other one of the first manual steering line 4c and the second manual steering line 4d to be supplied to the manual steering unit 4, may pass through the manual steering unit 4 and then flow along the discharge line 4b to be discharged to the external device 140.

In this way, from the moment when the manual steering is performed in the state in which the automatic steering is performed, the hydraulic pressure of the working fluid flowing along the manual supply line 4a increases. Accordingly, due to the hydraulic pressure of the working fluid flowing along the manual supply line 4a, as illustrated in FIG. 15, the automatic blocking unit 6 may be operated to be disposed at a position where the automatic blocking unit 6 blocks passage of the working fluid for the automatic steering. Therefore, since the working fluid supplied by the steering pump 2 is not able to pass through the automatic blocking unit 6, the hydraulic pressure of the working fluid flowing along the pump supply line 2a, the automatic supply line 3a, the changing supply line 5a, and the first changing control line 5c increases. Accordingly, due to the hydraulic pressure of the working fluid flowing along the first changing control line 5c, the manual changing valve 51 may be operated to cause the working fluid supplied from the steering pump 2 to pass. Therefore, by passing through the manual changing unit 5 and being supplied to the manual steering unit 4, the working fluid supplied by the steering pump 2 is used in the manual steering.

In this way, the hydraulic steering device 1 for an agricultural vehicle according to the present disclosure may be implemented so that, even when the automatic steering unit 3 does not operate to block passage of the working fluid for the automatic steering when the manual steering is performed, the automatic blocking unit 6 blocks passage of the working fluid for the automatic steering using the hydraulic pressure of the working fluid flowing along the manual supply line 4a. Accordingly, the working fluid supplied by the steering pump 2 may pass through the manual changing unit 5 and be supplied to the manual steering unit 4. Therefore, since the hydraulic steering device 1 for an agricultural vehicle according to the present disclosure is able to change to the manual steering just by manipulation of the steering wheel without control of the automatic steering unit 3 by the controller 130 (see FIG. 2), an ease of operation for changing to the manual steering may be improved.

Meanwhile, in the automatic blocking unit 6 selectively blocking the working fluid for the automatic steering from being supplied to the steering cylinder 120 according to whether the manual steering is performed, the working fluid for the automatic steering may flow along the automatic supply line 3a at an inlet side of the automatic steering unit 3. As a modified embodiment therefor, the working fluid for the automatic steering may also flow along the first steering line 120d or the second steering line 120e at an outlet side of the automatic steering unit 3.

Here, the automatic blocking unit 6 may be implemented according to various embodiments according to an arrangement relationship, an operational relationship, the number of valves, and the like. Embodiments of the automatic blocking unit 6 will be sequentially described with reference to the accompanying drawings.

According to the arrangement relationship, the automatic blocking unit 6 may be implemented mainly according to an embodiment in which the automatic blocking unit 6 is disposed at a front end of the automatic steering unit 3 as illustrated in FIGS. 14 to 21 (hereinafter referred to as "front end arrangement embodiment") and an embodiment in which the automatic blocking unit 6 is disposed at a rear end of the automatic steering unit 3 as illustrated in FIGS. 22 to 26 (hereinafter referred to as "rear end arrangement embodiment").

Referring to FIGS. 14 and 15, in the front end arrangement embodiment, the automatic blocking unit 6 is disposed between the steering pump 2 and the automatic steering unit 3. In this case, the automatic blocking unit 6 may be installed to be connected to each of the automatic supply line 3a and the manual supply line 4a. Accordingly, the automatic blocking unit 6 may selectively cause the working fluid flowing along the automatic supply line 3a to pass so that the working fluid is selectively supplied from the steering pump 2 to the automatic steering unit 3. Simultaneously, the automatic blocking unit 6 may selectively cause the working fluid flowing along the manual supply line 4a to pass so that the working fluid is selectively supplied from the automatic steering unit 3 to the manual steering unit 4.

For example, when the manual steering is not performed, the automatic blocking unit 6 may cause the working fluid flowing along the automatic supply line 3a to pass so that the working fluid is supplied from the steering pump 2 to the automatic steering unit 3 and, simultaneously, cause the working fluid flowing along the manual supply line 4a to pass so that the working fluid is supplied from the automatic steering unit 3 to the manual steering unit 4. In this case, the working fluid flowing along the manual supply line 4a may have been discharged from the steering cylinder 120.

For example, when the manual steering is performed, the automatic blocking unit 6 may block passage of the working fluid flowing along the automatic supply line 3a so that the working fluid is not able to be supplied from the steering pump 2 to the automatic steering unit 3 and, simultaneously, block passage of the working fluid flowing along the manual supply line 4a so that the working fluid is not able to be supplied from the automatic steering unit 3 to the manual steering unit 4. In this case, the working fluid flowing along the manual supply line 4a may have been discharged from the steering cylinder 120. Meanwhile, when the automatic blocking unit 6 blocks passage of the working fluid flowing along each of the automatic supply line 3a and the manual supply line 4a, the working fluid supplied from the manual steering unit 4 to the steering cylinder 120 and the working fluid discharged from the steering cylinder 120 to the manual steering unit 4 are not able to pass through the automatic blocking unit 6.

Figure 22:
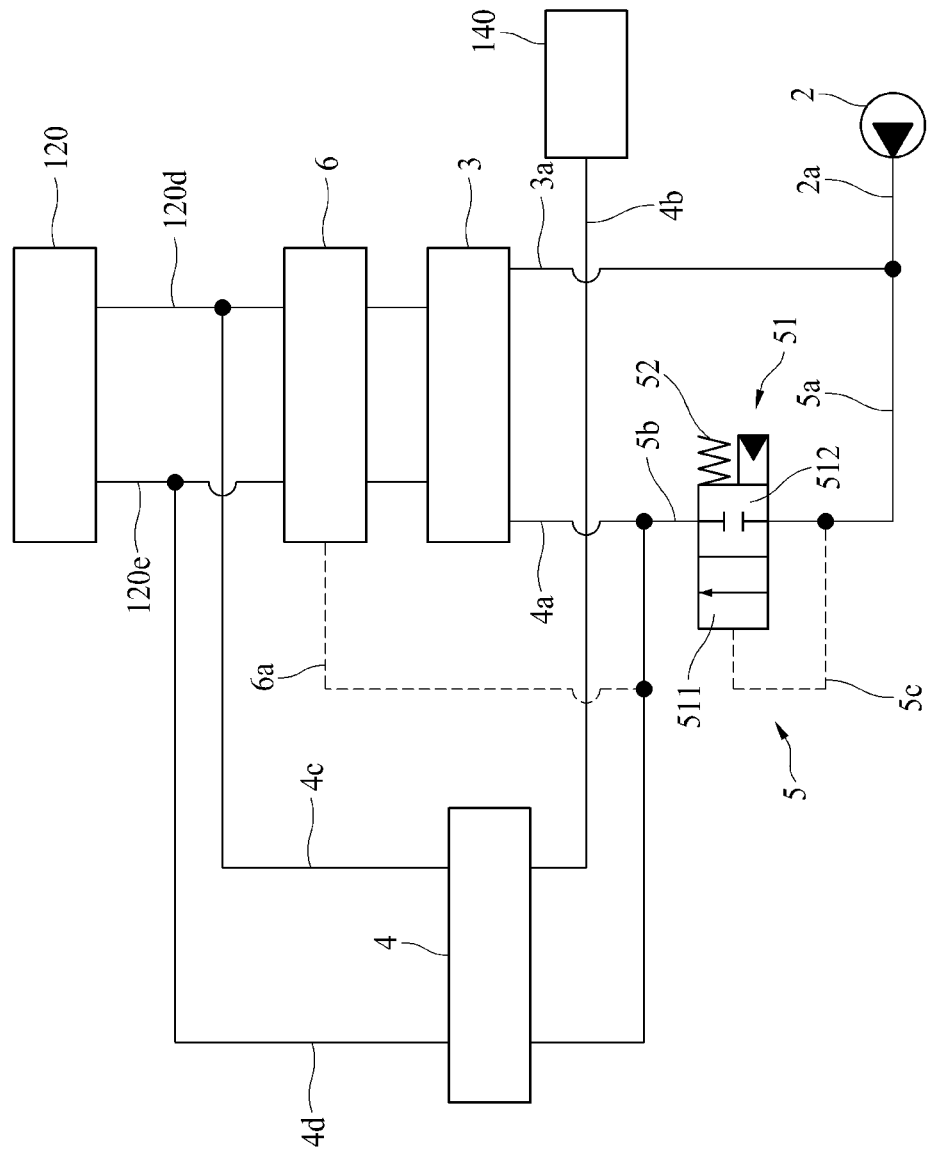

Referring to FIG. 22, in the rear end arrangement embodiment, the automatic blocking unit 6 is disposed between the automatic steering unit 3 and the steering cylinder 120. In this case, the automatic blocking unit 6 may be installed to be connected to each of the first steering line 120*d* and the second steering line 120*e*. Accordingly, the automatic blocking unit 6 may selectively cause the working fluid flowing along each of the first steering line 120*d* and the second steering line 120*e* to pass so that the working fluid is selectively supplied from the automatic steering unit 3 to the steering cylinder 120 and selectively discharged from the steering cylinder 120 to the automatic steering unit 3, simultaneously.

For example, when the manual steering is not performed, the automatic blocking unit 6 may cause the working fluid flowing along each of the first steering line 120*d* and the second steering line 120*e* to pass so that the working fluid is supplied from the automatic steering unit 3 to the steering cylinder 120 and discharged from the steering cylinder 120 to the automatic steering unit 3, simultaneously.

For example, when the manual steering is performed, the automatic blocking unit 6 may block passage of the working fluid flowing along each of the first steering line 120*d* and the second steering line 120*e* so that the working fluid is not able to be supplied from the automatic steering unit 3 to the steering cylinder 120 and not able to be discharged from the steering cylinder 120 to the automatic steering unit 3, simultaneously. In this case, the first manual steering line 4*c* and the second manual steering line 4*d* may be connected to the first steering line 120*d* and the second steering line 120*e*, respectively, between the automatic blocking unit 6 and the steering cylinder 120. Meanwhile, when the automatic blocking unit 6 blocks passage of the working fluid flowing along each of the first steering line 120*d* and the second steering line 120*e*, the working fluid supplied from the manual steering unit 4 to the steering cylinder 120 and the working fluid discharged from the steering cylinder 120 to the manual steering unit 4 are not able to pass through the automatic blocking unit 6.

Hereinafter, the front end arrangement embodiment will be described in detail with reference to the accompanying drawings.

<Automatic Blocking Unit According to First Embodiment>

Figure 16:
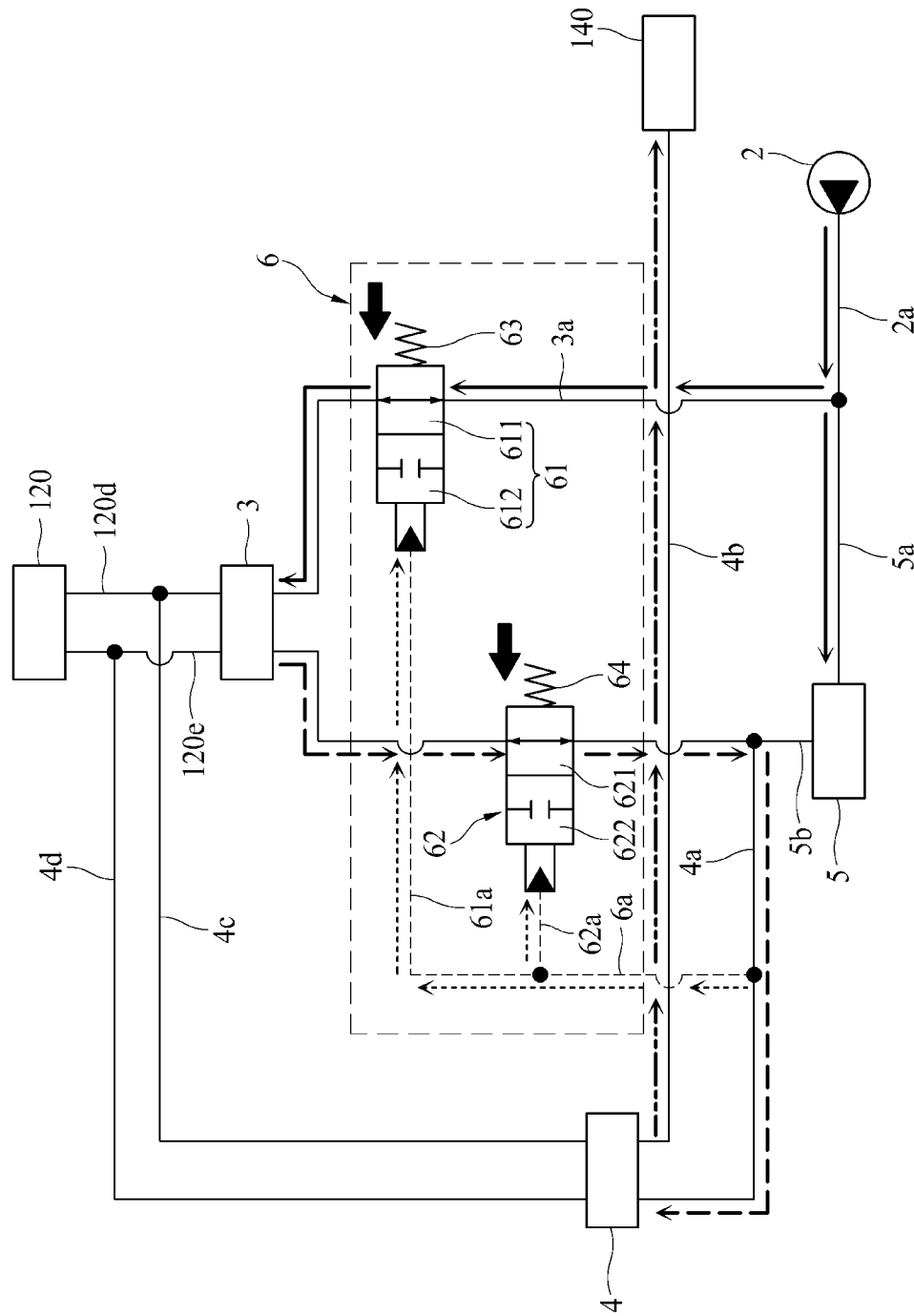
Figure 17:
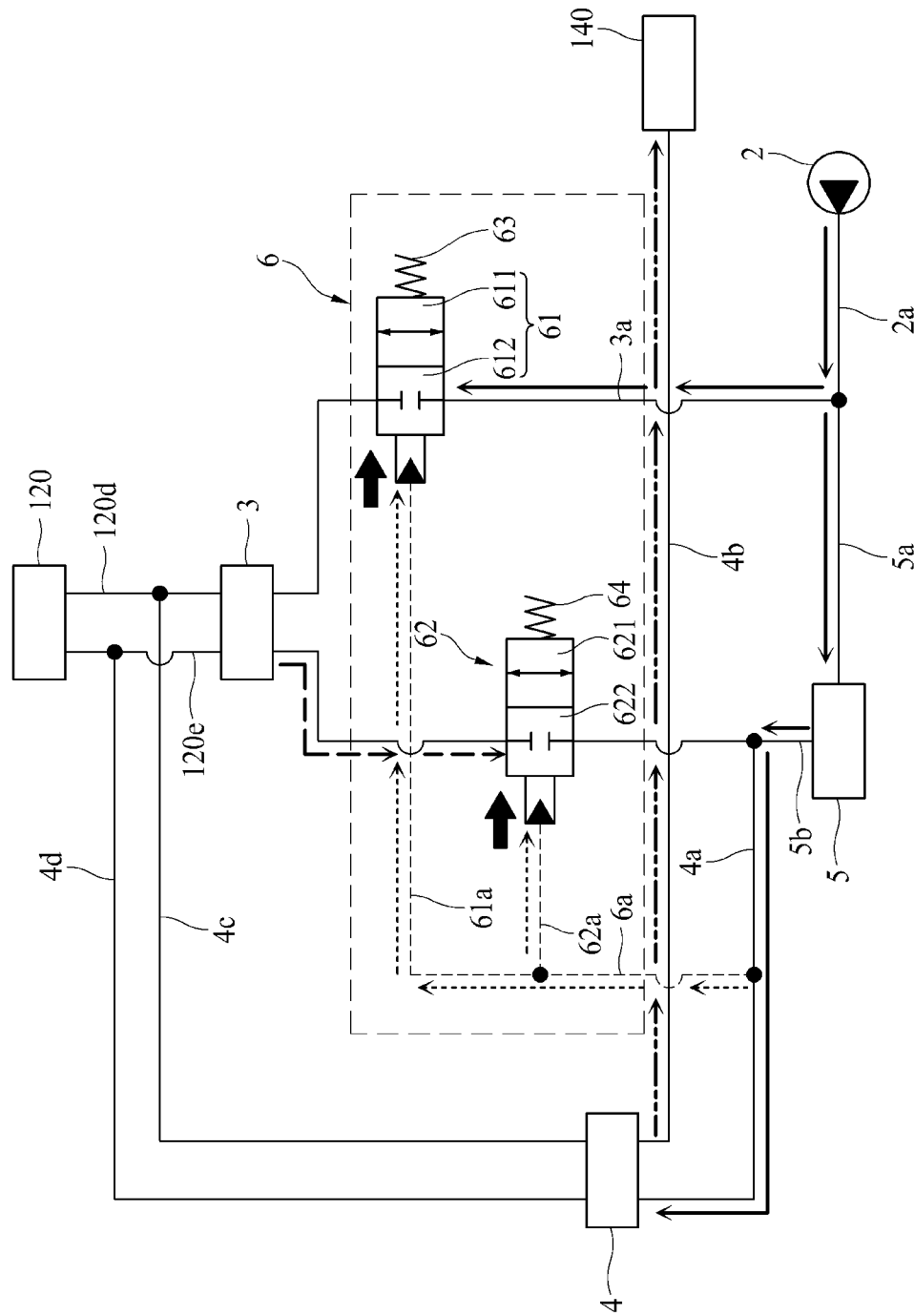

Referring to FIGS. 16 and 17, an automatic blocking unit 6 according to a first embodiment may include a first automatic blocking valve 61 and a second automatic blocking valve 62.

The first automatic blocking valve 61 selectively blocks the working fluid for the automatic steering from being supplied to the steering cylinder 120 according to the hydraulic pressure of the working fluid flowing along the manual supply line 4*a*. The hydraulic pressure of the working fluid flowing along the manual supply line 4*a* may vary according to whether the manual steering is performed.

The first automatic blocking valve 61 may move between a first automatic changing position and a first automatic blocking position according to the hydraulic pressure of the working fluid flowing along the manual supply line 4*a*. As illustrated in FIG. 16, when the first automatic blocking valve 61 is disposed at the first automatic changing position, the first automatic blocking valve 61 may allow the working fluid for the automatic steering to be supplied to the steering cylinder 120. As illustrated in FIG. 17, when the first automatic blocking valve 61 is disposed at the first automatic blocking position, the first automatic blocking valve 61 may block the working fluid for the automatic steering from being supplied to the steering cylinder 120.

The first automatic blocking valve 61 may be connected to a manual control line 6*a*. The manual control line 6*a* is connected to the manual supply line 4*a*. A first manual branch line 61*a* may be connected to one side of the first automatic blocking valve 61. In this case, the manual control line 6*a* may have one side connected to the manual supply line 4*a* and the other side connected to the first manual branch line 61*a*. The first manual branch line 61*a* may have one side connected to the manual control line 6*a* and the other side connected to the one side of the first automatic blocking valve 61. Accordingly, a portion of the working fluid flowing along the manual supply line 4*a* may, after being branched to the manual control line 6*a*, flow along the manual control line 6*a* and the first manual branch line 61*a* and press the one side of the first automatic blocking valve 61. In this case, the working fluid flowing along the first manual branch line 61*a* may press the one side of the first automatic blocking valve 61 in a direction in which the first automatic blocking valve 61 moves from the first automatic changing position to the first automatic blocking position. Therefore, when, as the manual steering is performed, the hydraulic pressure of the working fluid flowing along the manual supply line 4*a*, the manual control line 6*a*, and the first manual branch line 61*a* increases, the first automatic blocking valve 61 may move from the first automatic changing position to the first automatic blocking position and thus block passage of the working fluid for the automatic steering. Accordingly, since the hydraulic pressure of the working fluid flowing along the pump supply line 2*a* and the changing supply line 5*a* increases, the manual changing unit 5 may cause the working fluid supplied from the steering pump 2 to pass. Therefore, by passing through the manual changing unit 5 and being supplied to the manual steering unit 4, the working fluid supplied from the steering pump 2 may be used in the manual steering. Meanwhile, the working fluid discharged from the steering cylinder 120 in a process in which the manual steering is performed may be induced to be discharged to the manual steering unit 4. Also, the working fluid supplied from the manual steering unit 4 to the steering cylinder 120 in the process in which the manual steering is performed may be supplied to the steering cylinder 120 without leaking through the first automatic blocking valve 61.

The first automatic blocking valve 61 may be installed to be connected to the automatic supply line 3*a*. As illustrated in FIG. 16, when the first automatic blocking valve 61 is disposed at the first automatic changing position, the working fluid supplied from the steering pump 2 may pass through the first automatic blocking valve 61 and be supplied to the automatic steering unit 3. The working fluid supplied to the automatic steering unit 3 may be supplied to the steering cylinder 120 in a direction in which the automatic steering is performed. As illustrated in FIG. 17, when the first automatic blocking valve 61 is disposed at the first automatic blocking position, the working fluid supplied from the steering pump 2 is not able to pass through the first automatic blocking valve 61 and thus is not able to be supplied to the automatic steering unit 3. In this case, when the steering pump 2 continues to supply the working fluid, the hydraulic pressure of the working fluid flowing along the pump supply line 2*a* and the changing supply line 5*a* increases. Accordingly, since the manual changing unit 5 causes the working fluid supplied from the steering pump 2 to pass, by passing through the manual changing unit 5 and being supplied to the manual steering unit 4, the working fluid supplied from the steering pump 2 may be used in the manual steering.

The first automatic blocking valve 61 may include a first passing mechanism 611 and a first blocking mechanism 612.

The first passing mechanism 611 allows passage of a working fluid. As illustrated in FIG. 16, when the first automatic blocking valve 61 is disposed at the first automatic changing position, the first passing mechanism 611 may be connected to the automatic supply line 3*a*. Accordingly, the working fluid supplied from the steering pump 2 may pass through the first passing mechanism 611 and be supplied to the automatic steering unit 3.

The first blocking mechanism 612 blocks passage of a working fluid. As illustrated in FIG. 17, when the first automatic blocking valve 61 is disposed at the first automatic blocking position, the first blocking mechanism 612 may be connected to the automatic supply line 3*a*. Accordingly, the working fluid supplied from the steering pump 2 is not able to pass through the first blocking mechanism 612 and thus is not able to be supplied to the automatic steering unit 3.

The second automatic blocking valve 62 selectively blocks passage of the working fluid discharged from the steering cylinder 120 according to the hydraulic pressure of the working fluid flowing along the manual supply line 4*a*. The second automatic blocking valve 62 may move between a second automatic changing position and a second automatic blocking position according to the hydraulic pressure of the working fluid flowing along the manual supply line 4*a*. As illustrated in FIG. 16, when the second automatic blocking valve 62 is disposed at the second automatic changing position, the second automatic blocking valve 62 may allow passage of the working fluid discharged from the steering cylinder 120. As illustrated in FIG. 17, when the second automatic blocking valve 62 is disposed at the second automatic blocking position, the second automatic blocking valve 62 may block passage of the working fluid discharged from the steering cylinder 120.

The second automatic blocking valve 62 may be connected to the manual control line 6*a*. A second manual branch line 62*a* may be connected to one side of the second automatic blocking valve 62. In this case, the manual control line 6*a* may have one side connected to the manual supply line 4*a* and the other side connected to the second manual branch line 62*a*. The second manual branch line 62*a* may have one side connected to the manual control line 6*a* and the other side connected to the one side of the second automatic blocking valve 62. Accordingly, a portion of the working fluid flowing along the manual supply line 4*a* may, after being branched to the manual control line 6*a*, flow along the manual control line 6*a* and the second manual branch line 62*a* and press the one side of the second automatic blocking valve 62. In this case, the working fluid flowing along the second manual branch line 62*a* may press the one side of the second automatic blocking valve 62 in a direction in which the second automatic blocking valve 62 moves from the second automatic changing position to the second automatic blocking position. Therefore, when, as the manual steering is performed, the hydraulic pressure of the working fluid flowing along the manual supply line 4*a*, the manual control line 6*a*, and the second manual branch line 62*a* increases, the second automatic blocking valve 62 may move from the second automatic changing position to the second automatic blocking position and thus block passage of the working fluid discharged from the steering cylinder 120. Accordingly, the working fluid discharged from the steering cylinder 120 in a process in which the manual steering is performed may be induced to be discharged to the manual steering unit 4. Also, the working fluid supplied from the manual steering unit 4 to the steering cylinder 120 in the process in which the manual steering is performed may be supplied to the steering cylinder 120 without leaking through the second automatic blocking valve 62.

The second automatic blocking valve 62 may be installed to be connected to the manual supply line 4*a*. As illustrated in FIG. 16, when the second automatic blocking valve 62 is disposed at the second automatic changing position, the working fluid discharged from the steering cylinder 120 may be, after passing through the second automatic blocking valve 62 and being supplied to the manual steering unit 4, discharged to the external device 140 through the discharge line 4*b*. As illustrated in FIG. 17, when the second automatic blocking valve 62 is disposed at the second automatic blocking position, the working fluid discharged from the steering cylinder 120 is not able to pass through the second automatic blocking valve 62 and thus is not able to be supplied to the manual steering unit 4 through the manual supply line 4*a*.

The second automatic blocking valve 62 may include a second passing mechanism 621 and a second blocking mechanism 622.

The second passing mechanism 621 allows passage of a working fluid. As illustrated in FIG. 16, when the second automatic blocking valve 62 is disposed at the second automatic changing position, the second passing mechanism 621 may be connected to the manual supply line 4*a*. Accordingly, the working fluid discharged from the steering cylinder 120 may be, after passing through the second passing mechanism 621 and being supplied to the manual steering unit 4, discharged to the external device 140 through the discharge line 4*b*.

The second blocking mechanism 622 blocks passage of a working fluid. As illustrated in FIG. 17, when the second automatic blocking valve 62 is disposed at the second automatic blocking position, the second blocking mechanism 622 may be connected to the manual supply line 4*a*. Accordingly, the working fluid supplied from the steering cylinder 120 is not able to pass through the second blocking mechanism 622 and thus is not able to be supplied to the manual steering unit 4 through the manual supply line 4*a*.

Referring to FIGS. 16 and 17, the automatic blocking unit 6 may include a first automatic changing elastic member 63 and a second automatic changing elastic member 64.

The first automatic changing elastic member 63 is coupled to the other side of the first automatic blocking valve 61. The first automatic changing elastic member 63 may press the other side of the first automatic blocking valve 61 in a direction in which the first automatic blocking valve 61 moves from the first automatic blocking position to the first automatic changing position. Accordingly, the first automatic blocking valve 61 may have one side pressed due to the hydraulic pressure of the working fluid flowing along the first manual branch line 61*a* and the other side pressed due to an elastic force of the first automatic changing elastic member 63. Therefore, using a difference between the hydraulic pressure of the working fluid flowing along the first manual branch line 61*a* and the elastic force of the first automatic changing elastic member 63, the first automatic blocking valve 61 may move between the first automatic changing position and the first automatic blocking position. In this case, since the elastic force of the first automatic changing elastic member 63 is a predetermined value, the first automatic blocking valve 61 may move between the first automatic changing position and the first automatic blocking position according to the hydraulic pressure of the working fluid flowing along the first manual branch line 61*a*. The hydraulic pressure of the working fluid flowing along the first manual branch line 61*a*, the hydraulic pressure of the working fluid flowing along the manual control line 6*a*, and the hydraulic pressure of the working fluid flowing along the manual supply line 4a may be equal to each other.

When the manual steering is not performed, the hydraulic pressure of the working fluid flowing along the first manual branch line 61a may be decreased to be less than the elastic force of the first automatic changing elastic member 63. Accordingly, when the manual steering is not performed, the first automatic blocking valve 61 may move to the first automatic changing position. Therefore, the working fluid supplied by the steering pump 2 may pass through the first automatic blocking valve 61. Even when the automatic steering is performed in the state in which the manual steering is not performed, the first automatic blocking valve 61 may move to the first automatic changing position.

When the manual steering is performed, the hydraulic pressure of the working fluid flowing along the first manual branch line 61a may be increased to be greater than the elastic force of the first automatic changing elastic member 63. Accordingly, when the manual steering is performed, the first automatic blocking valve 61 may move to the first automatic blocking position. Therefore, the working fluid supplied by the steering pump 2 is not able to pass through the first automatic blocking valve 61.

In this way, the first automatic changing elastic member 63 may be formed to have an elastic force greater than the hydraulic pressure of the working fluid flowing along the first manual branch line 61a when the manual steering is not performed and have an elastic force less than the hydraulic pressure of the working fluid flowing along the first manual branch line 61a when the manual steering is performed.

The second automatic changing elastic member 64 is coupled to the other side of the second automatic blocking valve 62. The second automatic changing elastic member 64 may press the other side of the second automatic blocking valve 62 in a direction in which the second automatic blocking valve 62 moves from the second automatic blocking position to the second automatic changing position. Accordingly, the second automatic blocking valve 62 may have one side pressed due to the hydraulic pressure of the working fluid flowing along the second manual branch line 62a and the other side pressed due to an elastic force of the second automatic changing elastic member 64. Therefore, using a difference between the hydraulic pressure of the working fluid flowing along the second manual branch line 62a and the elastic force of the second automatic changing elastic member 64, the second automatic blocking valve 62 may move between the second automatic changing position and the second automatic blocking position. In this case, since the elastic force of the second automatic changing elastic member 64 is a predetermined value, the second automatic blocking valve 62 may move between the second automatic changing position and the second automatic blocking position according to the hydraulic pressure of the working fluid flowing along the second manual branch line 62a. The hydraulic pressure of the working fluid flowing along the second manual branch line 62a, the hydraulic pressure of the working fluid flowing along the manual control line 6a, and the hydraulic pressure of the working fluid flowing along the manual supply line 4a may be equal to each other.

When the manual steering is not performed, the hydraulic pressure of the working fluid flowing along the second manual branch line 62a may be decreased to be less than the elastic force of the second automatic changing elastic member 64. Accordingly, when the manual steering is not performed, the second automatic blocking valve 62 may move to the second automatic changing position. Therefore, the working fluid discharged from the steering cylinder 120 may pass through the second automatic blocking valve 62. Even when the automatic steering is performed in the state in which the manual steering is not performed, the second automatic blocking valve 62 may move to the second automatic changing position.

When the manual steering is performed, the hydraulic pressure of the working fluid flowing along the second manual branch line 62a may be increased to be greater than the elastic force of the second automatic changing elastic member 64. Accordingly, when the manual steering is performed, the second automatic blocking valve 62 may move to the second automatic blocking position. Therefore, the working fluid discharged from the steering cylinder 120 is not able to pass through the second automatic blocking valve 62.

In this way, the second automatic changing elastic member 64 may be formed to have an elastic force greater than the hydraulic pressure of the working fluid flowing along the second manual branch line 62a when the manual steering is not performed and have an elastic force less than the hydraulic pressure of the working fluid flowing along the second manual branch line 62a when the manual steering is performed.

<Automatic Blocking Unit According to Second Embodiment>

Figure 18:
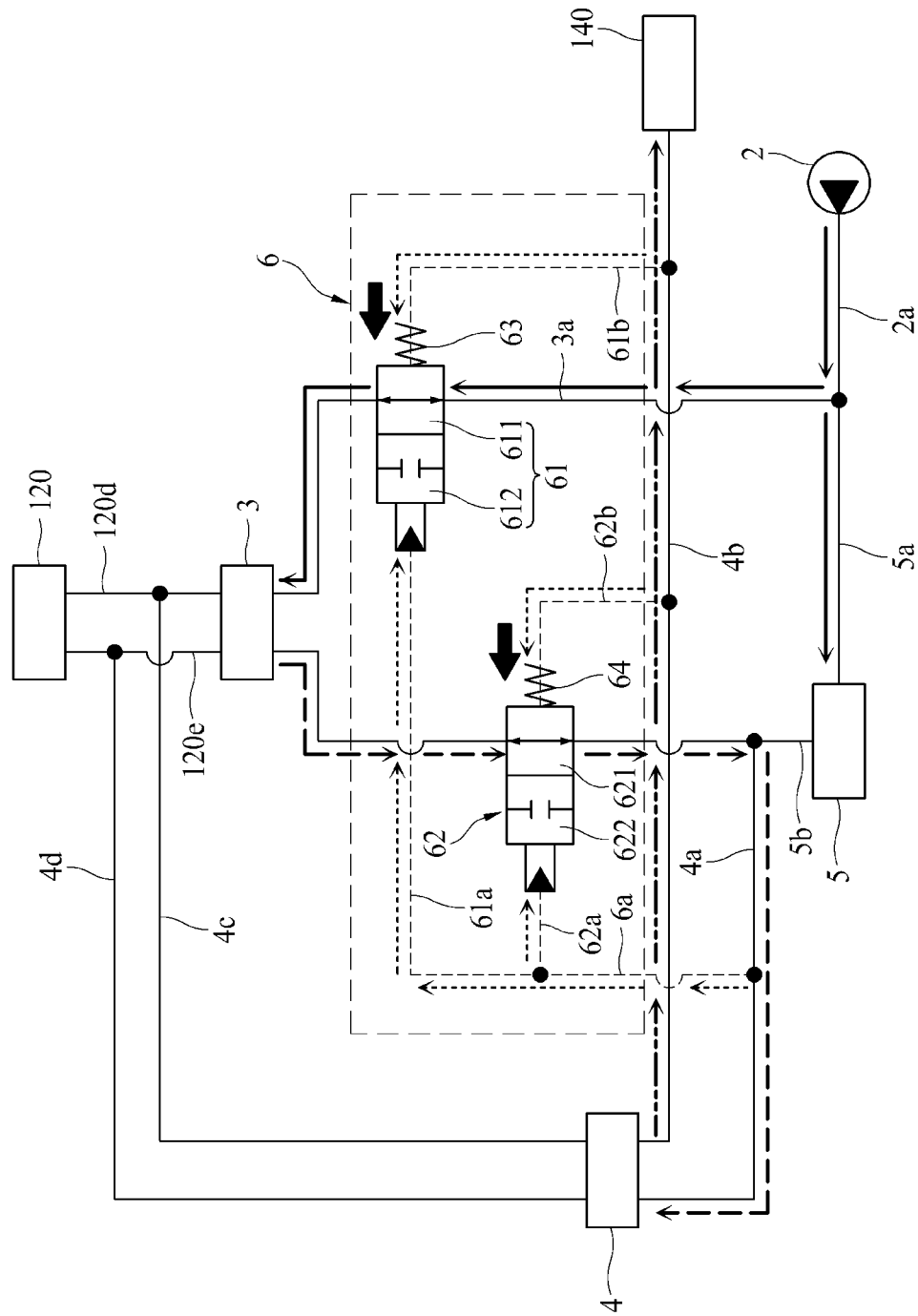

Referring to FIG. 18, an automatic blocking unit 6 according to a second embodiment may be implemented to substantially match the automatic blocking unit 6 according to the first embodiment illustrated in FIGS. 16 and 17. Therefore, the automatic blocking unit 6 according to the second embodiment will be described focusing on differences from the first embodiment.

The automatic blocking unit 6 may further include a first automatic control line 61b and a second automatic control line 62b.

The first automatic control line 61b is connected to the other side of the first automatic blocking valve 61. Since the first automatic control line 61b is connected to the other side of the first automatic blocking valve 61, a working fluid flowing along the first automatic control line 61b may press the other side of the first automatic blocking valve 61. Accordingly, a pressing force, which is the sum of the elastic force of the first automatic changing elastic member 63 and the hydraulic pressure of the working fluid flowing along the first automatic control line 61b, may press the other side of the first automatic blocking valve 61 in a direction in which the first automatic blocking valve 61 moves from the first automatic blocking position to the first automatic changing position.

The first automatic control line 61b may be connected to each of the discharge line 4b and the other side of the first automatic blocking valve 61. Accordingly, the working fluid flowing along the first automatic control line 61b is a branched portion of the working fluid flowing to be discharged to the external device 140 along the discharge line 4b.

The first automatic changing elastic member 63 in the second embodiment in which the first automatic control line 61b is included may be implemented to have a smaller elastic force than the first automatic changing elastic member 63 in the first embodiment in which the first automatic control line 61b is not included. Therefore, in the second embodiment in which the first automatic control line 61b is included, material costs for the first automatic changing elastic member 63 may be reduced as compared to the first embodiment in which the first automatic control line 61b is not included.

Meanwhile, when the manual steering is performed, the hydraulic pressure of the working fluid flowing along the first manual branch line 61a becomes greater than the pressing force which is the sum of the elastic force of the first automatic changing elastic member 63 and the hydraulic pressure of the working fluid flowing along the first automatic control line 61b. Accordingly, the first automatic blocking valve 61 may move to the first automatic blocking position and thus block supply of the working fluid from the steering pump 2 to the automatic steering unit 3.

The second automatic control line 62b is connected to the other side of the second automatic blocking valve 62. Since the second automatic control line 62b is connected to the other side of the second automatic blocking valve 62, a working fluid flowing along the second automatic control line 62b may press the other side of the second automatic blocking valve 62. Accordingly, a pressing force, which is the sum of the elastic force of the second automatic changing elastic member 64 and the hydraulic pressure of the working fluid flowing along the second automatic control line 62b, may press the other side of the second automatic blocking valve 62 in a direction in which the second automatic blocking valve 62 moves from the second automatic blocking position to the second automatic changing position.

The second automatic control line 62b may be connected to each of the discharge line 4b and the other side of the second automatic blocking valve 62. Accordingly, the working fluid flowing along the second automatic control line 62b is a branched portion of the working fluid flowing to be discharged to the external device 140 along the discharge line 4b.

The second automatic changing elastic member 64 in the second embodiment in which the second automatic control line 62b is included may be implemented to have a smaller elastic force than the second automatic changing elastic member 64 in the first embodiment in which the second automatic control line 62b is not included. Therefore, in the second embodiment in which the second automatic control line 62b is included, material costs for the second automatic changing elastic member 64 may be reduced as compared to the first embodiment in which the second automatic control line 62b is not included.

Meanwhile, when the manual steering is performed, the hydraulic pressure of the working fluid flowing along the second manual branch line 62a becomes greater than the pressing force which is the sum of the elastic force of the second automatic changing elastic member 64 and the hydraulic pressure of the working fluid flowing along the second automatic control line 62b. Accordingly, the second automatic blocking valve 62 may move to the second automatic blocking position and thus block the working fluid discharged from the steering cylinder 120 from being supplied to the manual steering unit 4 through the manual supply line 4a.

<Automatic Blocking Unit According to Third Embodiment>

Figure 19:
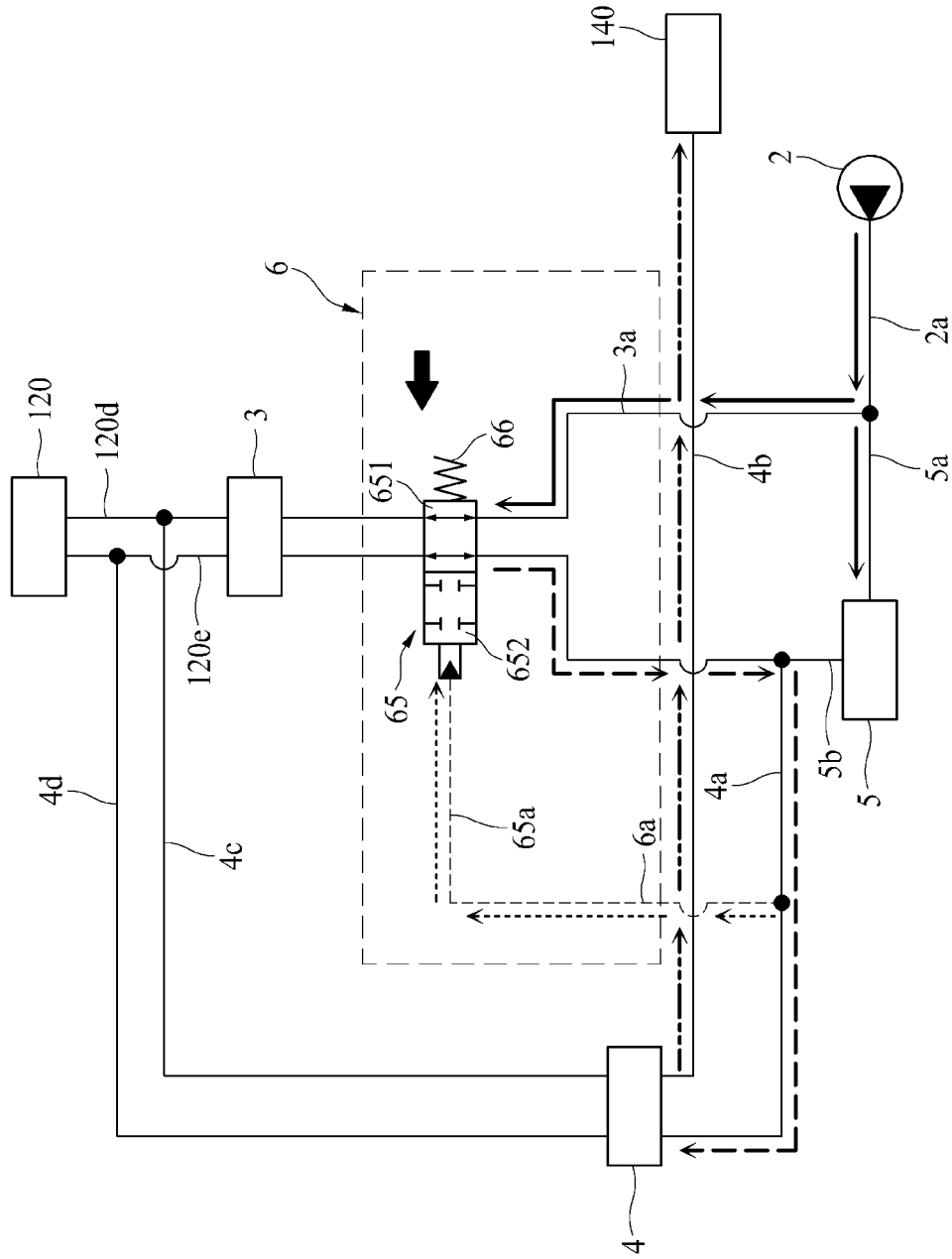
Figure 20:
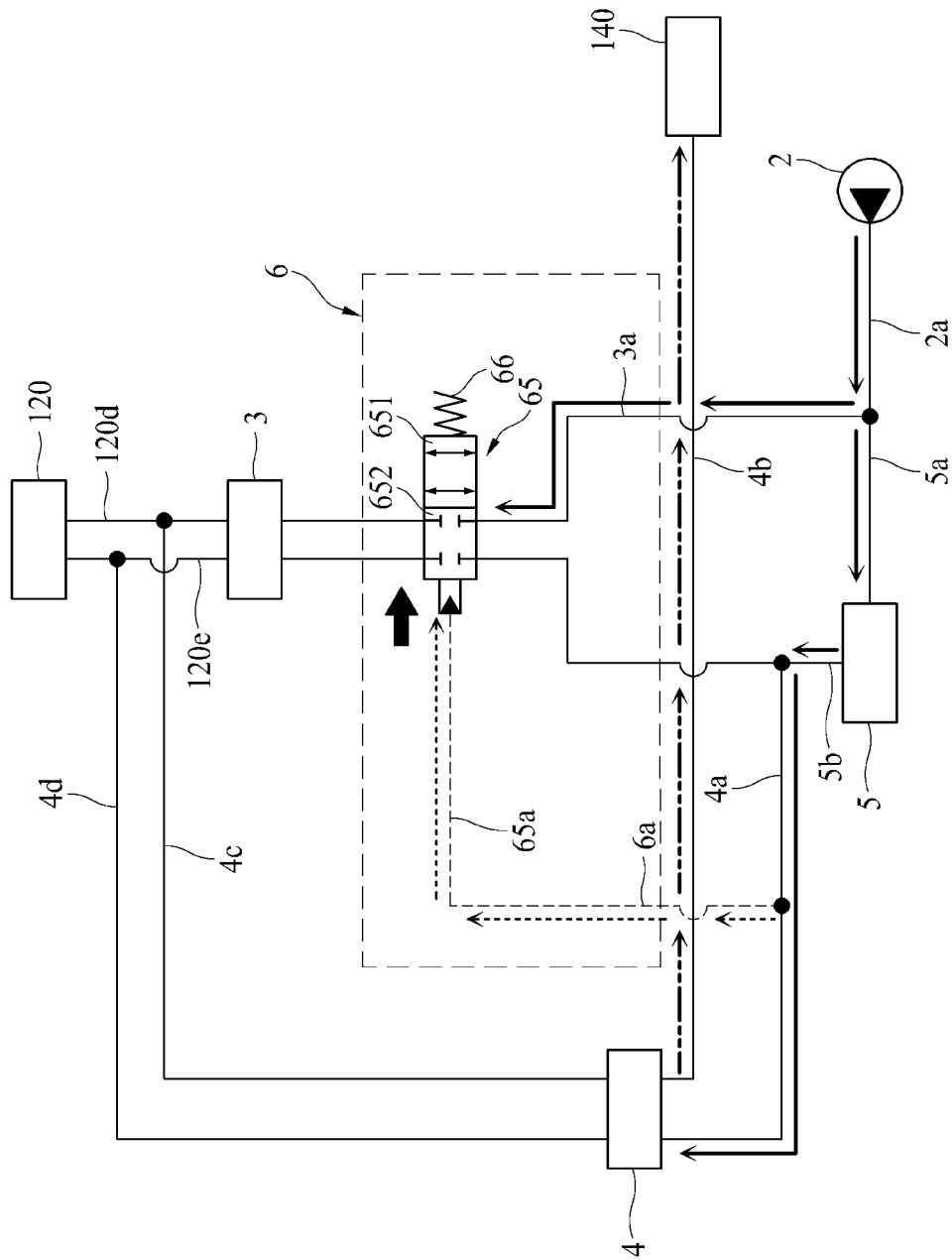

Referring to FIGS. 19 and 20, an automatic blocking unit 6 according to a third embodiment may be implemented to substantially match the automatic blocking unit 6 according to the first embodiment illustrated in FIGS. 16 and 17. Therefore, the automatic blocking unit 6 according to the third embodiment will be described focusing on differences from the first embodiment.

The automatic blocking unit 6 according to the third embodiment differs from the first embodiment in that the first automatic blocking valve 61 (see FIG. 16) and the second automatic blocking valve 62 (see FIG. 16) in the first embodiment are replaced with a single automatic blocking valve 65.

The automatic blocking valve 65 may move between an automatic changing position and an automatic blocking position according to a hydraulic pressure of a working fluid flowing along the manual supply line 4a. When the automatic blocking valve 65 is disposed at the automatic changing position as illustrated in FIG. 19, the automatic blocking valve 65 may, while allowing supply of a working fluid for the automatic steering to the steering cylinder 120, allow passage of a working fluid discharged from the steering cylinder 120. When the automatic blocking valve 65 is disposed at the automatic blocking position as illustrated in FIG. 20, the automatic blocking valve 65 may, while blocking supply of the working fluid for the automatic steering to the steering cylinder 120, block passage of the working fluid discharged from the steering cylinder 120.

The automatic blocking valve 65 may be connected to the manual control line 6a. A manual branch line 65a may be connected to one side of the automatic blocking valve 65. In this case, the manual control line 6a may have one side connected to the manual supply line 4a and the other side connected to the manual branch line 65a. The manual branch line 65a may have one side connected to the manual control line 6a and the other side connected to the one side of the automatic blocking valve 65. Accordingly, a portion of the working fluid flowing along the manual supply line 4a may, after being branched to the manual control line 6a, flow along the manual control line 6a and the manual branch line 65a and press the one side of the automatic blocking valve 65. In this case, the working fluid flowing along the manual branch line 65a may press the one side of the automatic blocking valve 65 in a direction in which the automatic blocking valve 65 moves from the automatic changing position to the automatic blocking position.

The automatic blocking valve 65 may be installed to be connected to each of the automatic supply line 3a and the manual supply line 4a. When the automatic blocking valve 65 is disposed at the automatic changing position as illustrated in FIG. 19, the working fluid supplied from the steering pump 2 may pass through the automatic blocking valve 65 and be supplied to the automatic steering unit 3. In this case, the working fluid discharged from the steering cylinder 120 may pass through the automatic blocking valve 65 and be supplied to the manual steering unit 4 through the manual supply line 4a. When the automatic blocking valve 65 is disposed at the automatic blocking position as illustrated in FIG. 20, the working fluid supplied from the steering pump 2 is not able to pass through the automatic blocking valve 65 and thus is not able to be supplied to the automatic steering unit 3. In this case, the working fluid discharged from the steering cylinder 120 is not able to pass through the automatic blocking valve 65 and thus is not able to be supplied to the manual steering unit 4 through the manual supply line 4a.

The automatic blocking valve 65 may include a passing mechanism 651 and a blocking mechanism 652.

The passing mechanism 651 allows passage of a working fluid. When the automatic blocking valve 65 is disposed at the automatic changing position as illustrated in FIG. 19, the passing mechanism 651 may be connected to each of the automatic supply line 3a and the manual supply line 4a. Accordingly, the working fluid supplied from the steering pump 2 may pass through the passing mechanism 651 and be supplied to the automatic steering unit 3. The working fluid discharged from the steering cylinder 120 may be, after passing through the passing mechanism 651 and being supplied to the manual steering unit 4, discharged to the external device 140 through the discharge line 4b.

The blocking mechanism 652 blocks passage of a working fluid. When the automatic blocking valve 65 is disposed at the automatic blocking position as illustrated in FIG. 20, the blocking mechanism 652 may be connected to each of the automatic supply line 3a and the manual supply line 4a. Accordingly, the working fluid supplied from the steering pump 2 is not able to pass through the blocking mechanism 652 and thus is not able to be supplied to the automatic steering unit 3. The working fluid discharged from the steering cylinder 120 is not able to pass through the blocking mechanism 652 and thus is not able to be supplied to the manual steering unit 4 through the manual supply line 4a.

The automatic blocking unit 6 may include an automatic changing elastic member 66.

The automatic changing elastic member 66 is coupled to the other side of the automatic blocking valve 65. The automatic changing elastic member 66 may press the other side of the automatic blocking valve 65 in a direction in which the automatic blocking valve 65 moves from the automatic blocking position to the automatic changing position. Accordingly, the automatic blocking valve 65 may have one side pressed due to the hydraulic pressure of the working fluid flowing along the manual branch line 65a and the other side pressed due to an elastic force of the automatic changing elastic member 66. Therefore, using a difference between the hydraulic pressure of the working fluid flowing along the manual branch line 65a and the elastic force of the automatic changing elastic member 66, the automatic blocking valve 65 may move between the automatic changing position and the automatic blocking position. In this case, since the elastic force of the automatic changing elastic member 66 is a predetermined value, the automatic blocking valve 65 may move between the automatic changing position and the automatic blocking position according to the hydraulic pressure of the working fluid flowing along the manual branch line 65a. The hydraulic pressure of the working fluid flowing along the manual branch line 65a, the hydraulic pressure of the working fluid flowing along the manual control line 6a, and the hydraulic pressure of the working fluid flowing along the manual supply line 4a may be equal to each other.

When the manual steering is not performed, the hydraulic pressure of the working fluid flowing along the manual branch line 65a may be decreased to be less than the elastic force of the automatic changing elastic member 66. Accordingly, when the manual steering is not performed, the automatic blocking valve 65 may move to the automatic changing position.

When the manual steering is performed, the hydraulic pressure of the working fluid flowing along the manual branch line 65a may be increased to be greater than the elastic force of the automatic changing elastic member 66. Accordingly, when the manual steering is performed, the automatic blocking valve 65 may move to the automatic blocking position.

In this way, the automatic changing elastic member 66 may be formed to have an elastic force greater than the hydraulic pressure of the working fluid flowing along the manual branch line 65a when the manual steering is not performed and have an elastic force less than the hydraulic pressure of the working fluid flowing along the manual branch line 65a when the manual steering is performed.

<Automatic Blocking Unit According to Fourth Embodiment>

Figure 21:
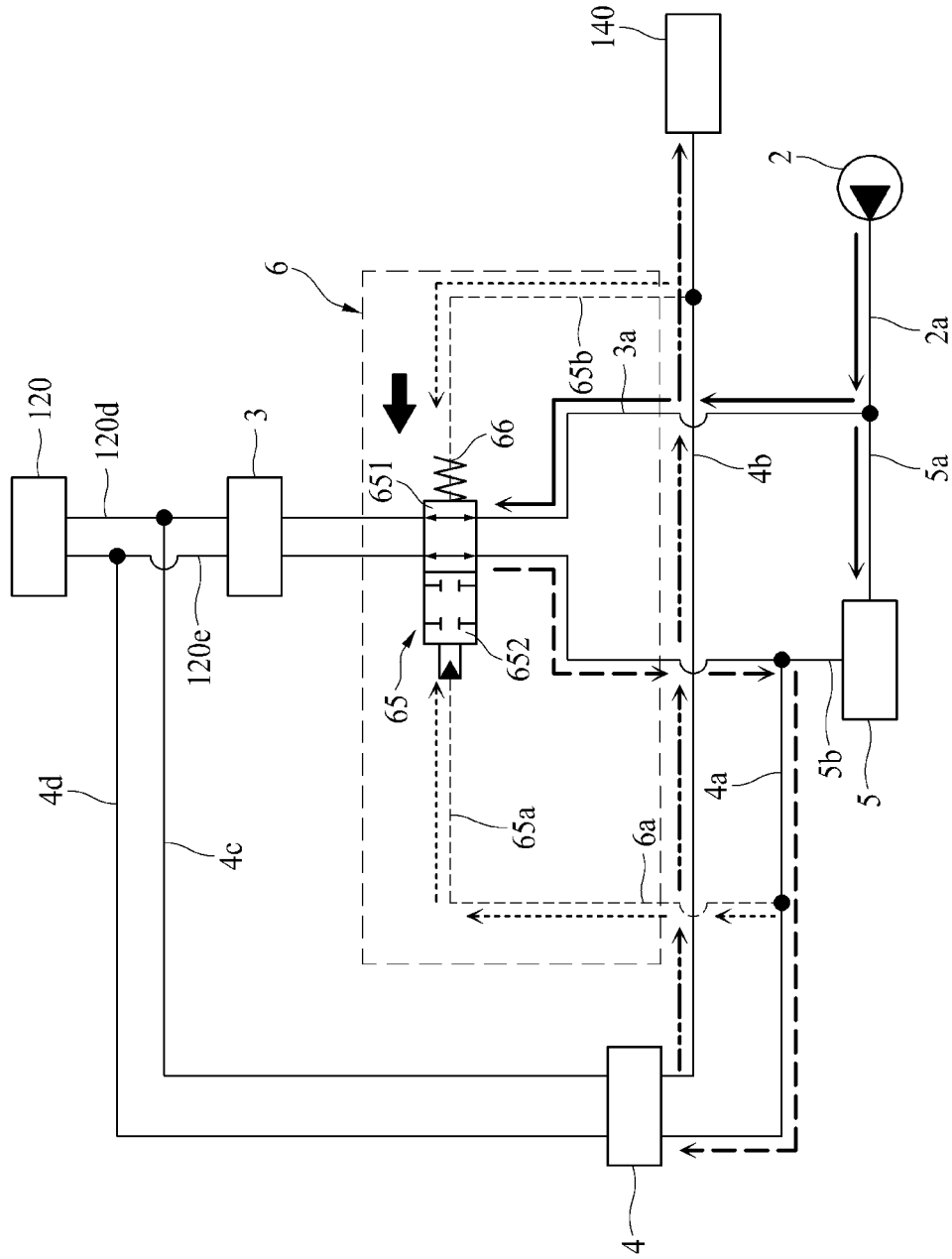

Referring to FIG. 21, an automatic blocking unit 6 according to a fourth embodiment may be implemented to substantially match the automatic blocking unit 6 according to the third embodiment illustrated in FIGS. 19 and 20. Therefore, the automatic blocking unit 6 according to the fourth embodiment will be described focusing on differences from the third embodiment.

The automatic blocking unit 6 may further include an automatic control line 65b.

The automatic control line 65b is connected to the other side of the automatic blocking valve 65. Since the automatic control line 65b is connected to the other side of the automatic blocking valve 65, a working fluid flowing along the automatic control line 65b may press the other side of the automatic blocking valve 65. Accordingly, a pressing force, which is the sum of the elastic force of the automatic changing elastic member 66 and the hydraulic pressure of the working fluid flowing along the automatic control line 65b, may press the other side of the automatic blocking valve 65 in a direction in which the automatic blocking valve 65 moves from the first automatic blocking position to the first automatic changing position.

The automatic control line 65b may be connected to each of the discharge line 4b and the other side of the automatic blocking valve 65. Accordingly, the working fluid flowing along the automatic control line 65b is a branched portion of the working fluid flowing to be discharged to the external device 140 along the discharge line 4b.

The automatic changing elastic member 66 in the fourth embodiment in which the automatic control line 65b is included may be implemented to have a smaller elastic force than the automatic changing elastic member 66 in the third embodiment in which the automatic control line 65b is not included. Therefore, in the fourth embodiment in which the automatic control line 65b is included, material costs for the automatic changing elastic member 66 may be reduced as compared to the third embodiment in which the automatic control line 65b is not included.

Meanwhile, when the manual steering is performed, the hydraulic pressure of the working fluid flowing along the manual branch line 65a becomes greater than the pressing force which is the sum of the elastic force of the automatic changing elastic member 66 and the hydraulic pressure of the working fluid flowing along the automatic control line 65b. Accordingly, the automatic blocking valve 65 may move to the automatic blocking position.

Hereinafter, the rear end arrangement embodiment will be described in detail with reference to the accompanying drawings.

<Automatic Blocking Unit According to Fifth Embodiment>

Figure 23:
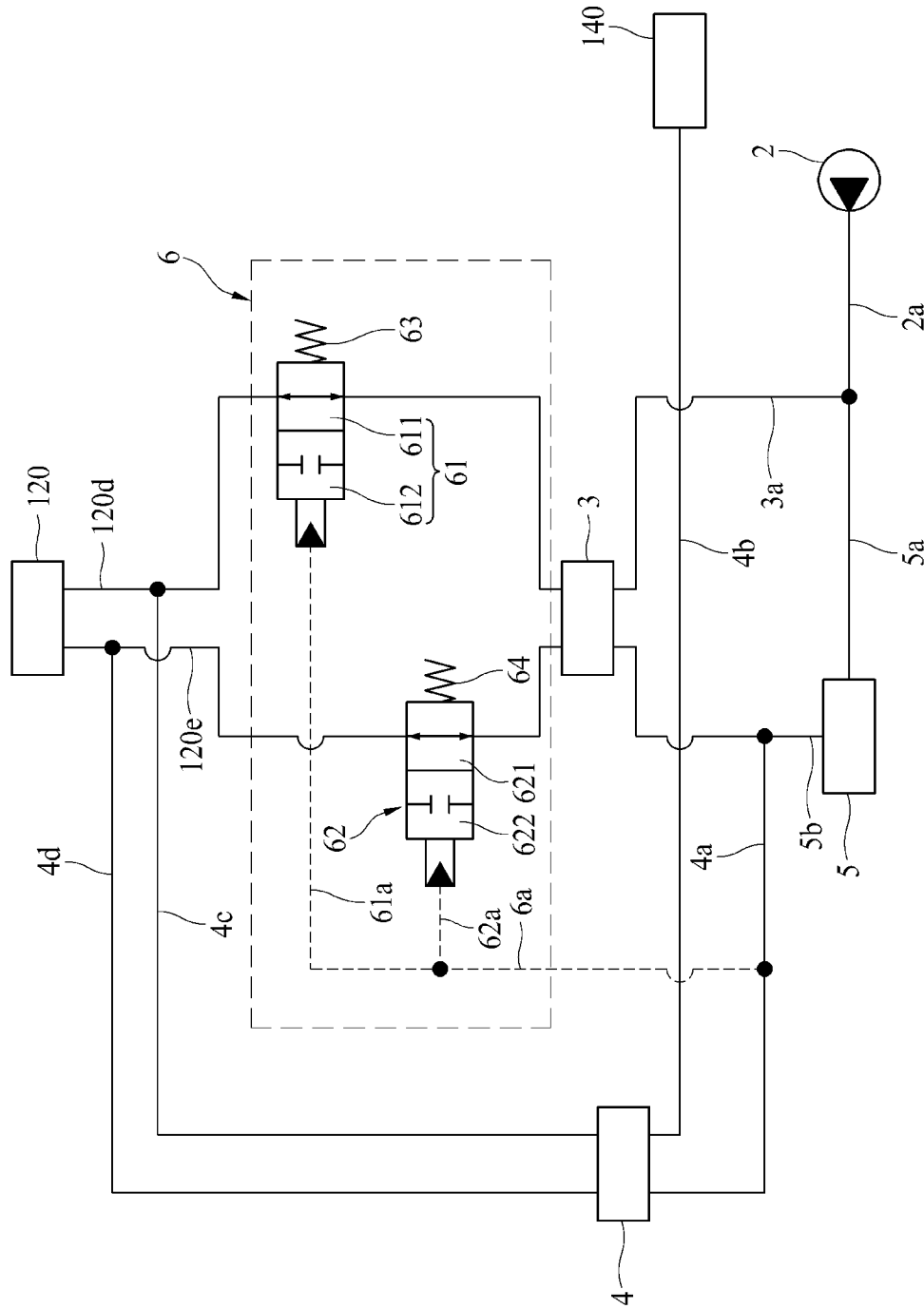

Referring to FIGS. 22 and 23, an automatic blocking unit 6 according to a fifth embodiment may be implemented to substantially match the automatic blocking unit 6 according to the first embodiment illustrated in FIGS. 16 and 17. Therefore, the automatic blocking unit 6 according to the fifth embodiment will be described focusing on differences from the first embodiment.

The automatic blocking unit 6 according to the fifth embodiment differs from the first embodiment in that, instead of the automatic blocking unit 6 being disposed between the steering pump 2 and the automatic steering unit 3 as in the first embodiment, the automatic blocking unit 6 is disposed between the automatic steering unit 3 and the steering cylinder 120.

The first automatic blocking valve 61 may be installed to be connected to the first steering line 120*d*. The first automatic blocking valve 61 may move between the first automatic changing position and the first automatic blocking position according to the hydraulic pressure of the working fluid flowing along the manual supply line 4*a*.

When a working fluid is supplied from the automatic steering unit 3 to the first steering line 120*d*, the first automatic blocking valve 61 may, when disposed at the first automatic changing position, allow passage of the working fluid supplied from the automatic steering unit 3. When a working fluid is discharged from the steering cylinder 120 to the first steering line 120*d*, the first automatic blocking valve 61 may, when disposed at the first automatic changing position, allow passage of the working fluid discharged from the steering cylinder 120.

When a working fluid is supplied from the automatic steering unit 3 to the first steering line 120*d*, the first automatic blocking valve 61 may, when disposed at the first automatic blocking position, block passage of the working fluid supplied from the automatic steering unit 3. In this case, when the steering pump 2 continues to supply the working fluid, the hydraulic pressure of the working fluid flowing along the pump supply line 2*a* and the changing supply line 5*a* increases. Accordingly, since the manual changing unit 5 causes the working fluid supplied from the steering pump 2 to pass, by being supplied to the manual steering unit 4 through the manual changing unit 5, the working fluid supplied from the steering pump 2 may be used in the manual steering. Meanwhile, when a working fluid is discharged from the steering cylinder 120 to the first steering line 120*d*, the first automatic blocking valve 61 may, when disposed at the first automatic blocking position, block passage of the working fluid discharged from the steering cylinder 120.

The first automatic blocking valve 61 may include the first passing mechanism 611 and the first blocking mechanism 612.

The first passing mechanism 611 allows passage of a working fluid. When the first automatic blocking valve 61 is disposed at the first automatic changing position, the first passing mechanism 611 may be connected to the first steering line 120*d*. Accordingly, the working fluid flowing along the first steering line 120*d* may pass through the first automatic blocking valve 61.

The first blocking mechanism 612 blocks passage of a working fluid. When the first automatic blocking valve 61 is disposed at the first automatic blocking position, the first blocking mechanism 612 may be connected to the first steering line 120*d*. Accordingly, the working fluid flowing along the first steering line 120*d* is not able to pass through the first automatic blocking valve 61.

The first automatic blocking valve 61 may have one side pressed due to the hydraulic pressure of the working fluid flowing along the first manual branch line 61*a* and the other side pressed due to the elastic force of the first automatic changing elastic member 63. Therefore, using the difference between the hydraulic pressure of the working fluid flowing along the first manual branch line 61*a* and the elastic force of the first automatic changing elastic member 63, the first automatic blocking valve 61 may move between the first automatic changing position and the first automatic blocking position. In this case, the first automatic changing elastic member 63 may be formed to have an elastic force greater than the hydraulic pressure of the working fluid flowing along the first manual branch line 61*a* when the manual steering is not performed and have an elastic force less than the hydraulic pressure of the working fluid flowing along the first manual branch line 61*a* when the manual steering is performed.

The second automatic blocking valve 62 may be installed to be connected to the second steering line 120*e*. The second automatic blocking valve 62 may move between the second automatic changing position and the second automatic blocking position according to the hydraulic pressure of the working fluid flowing along the manual supply line 4*a*.

When a working fluid is supplied from the automatic steering unit 3 to the second steering line 120*e*, the second automatic blocking valve 62 may, when disposed at the second automatic changing position, allow passage of the working fluid supplied from the automatic steering unit 3. When a working fluid is discharged from the steering cylinder 120 to the second steering line 120*e*, the second automatic blocking valve 62 may, when disposed at the second automatic changing position, allow passage of the working fluid discharged from the steering cylinder 120.

When a working fluid is supplied from the automatic steering unit 3 to the second steering line 120*e*, the second automatic blocking valve 62 may, when disposed at the second automatic blocking position, block passage of the working fluid supplied from the automatic steering unit 3. In this case, when the steering pump 2 continues to supply the working fluid, the hydraulic pressure of the working fluid flowing along the pump supply line 2*a* and the changing supply line 5*a* increases. Accordingly, since the manual changing unit 5 causes the working fluid supplied from the steering pump 2 to pass, by being supplied to the manual steering unit 4 through the manual changing unit 5, the working fluid supplied from the steering pump 2 may be used in the manual steering. Meanwhile, when a working fluid is discharged from the steering cylinder 120 to the second steering line 120*e*, the second automatic blocking valve 62 may, when disposed at the second automatic blocking position, block passage of the working fluid discharged from the steering cylinder 120.

The second automatic blocking valve 62 may include the second passing mechanism 621 and the second blocking mechanism 622.

The second passing mechanism 621 allows passage of a working fluid. When the second automatic blocking valve 62 is disposed at the second automatic changing position, the second passing mechanism 621 may be connected to the second steering line 120*e*. Accordingly, the working fluid flowing along the second steering line 120*e* may pass through the second automatic blocking valve 62.

The second blocking mechanism 622 blocks passage of a working fluid. When the second automatic blocking valve 62 is disposed at the second automatic blocking position, the second blocking mechanism 622 may be connected to the second steering line 120*e*. Accordingly, the working fluid flowing along the second steering line 120*e* is not able to pass through the second automatic blocking valve 62.

The second automatic blocking valve 62 may have one side pressed due to the hydraulic pressure of the working fluid flowing along the second manual branch line 62*a* and the other side pressed due to the elastic force of the second automatic changing elastic member 64. Therefore, using the difference between the hydraulic pressure of the working fluid flowing along the second manual branch line 62*a* and the elastic force of the second automatic changing elastic member 64, the second automatic blocking valve 62 may move between the second automatic changing position and the second automatic blocking position. In this case, the second automatic changing elastic member 64 may be formed to have an elastic force greater than the hydraulic pressure of the working fluid flowing along the second manual branch line 62a when the manual steering is not performed and have an elastic force less than the hydraulic pressure of the working fluid flowing along the second manual branch line 62a when the manual steering is performed.

<Automatic Blocking Unit According to Sixth Embodiment>

Figure 24:
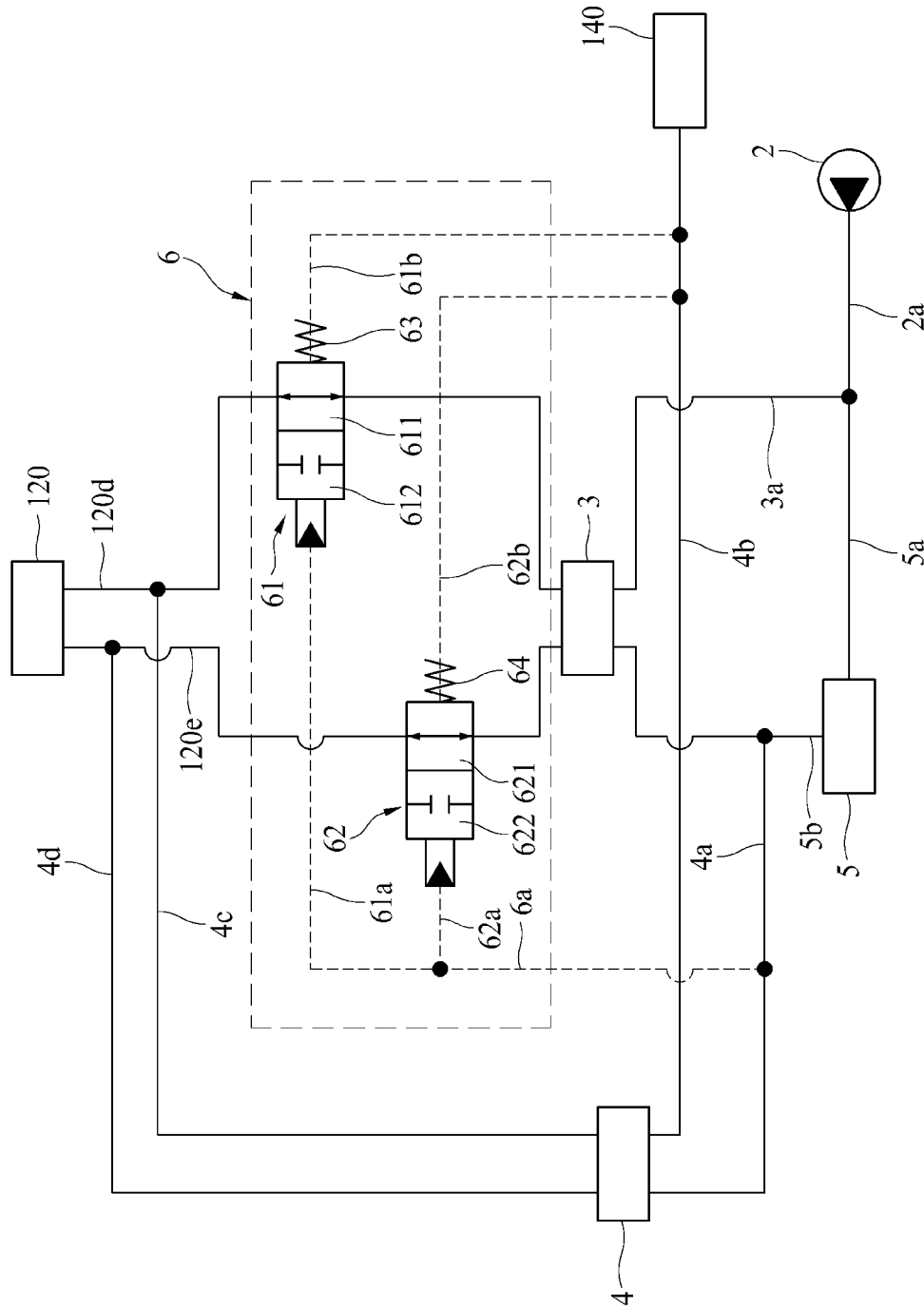

Referring to FIG. 24, an automatic blocking unit 6 according to a sixth embodiment may be implemented to substantially match the automatic blocking unit 6 according to the fifth embodiment illustrated in FIG. 23. Therefore, the automatic blocking unit 6 according to the sixth embodiment will be described focusing on differences from the fifth embodiment.

The automatic blocking unit 6 may further include the first automatic control line 61b and the second automatic control line 62b.

The first automatic control line 61b is connected to the other side of the first automatic blocking valve 61. Since the first automatic control line 61b is connected to the other side of the first automatic blocking valve 61, a working fluid flowing along the first automatic control line 61b may press the other side of the first automatic blocking valve 61. Accordingly, a pressing force, which is the sum of the elastic force of the first automatic changing elastic member 63 and the hydraulic pressure of the working fluid flowing along the first automatic control line 61b, may press the other side of the first automatic blocking valve 61 in a direction in which the first automatic blocking valve 61 moves from the first automatic blocking position to the first automatic changing position.

The first automatic control line 61b may be connected to each of the discharge line 4b and the other side of the first automatic blocking valve 61. Accordingly, the working fluid flowing along the first automatic control line 61b is a branched portion of the working fluid flowing to be discharged to the external device 140 along the discharge line 4b.

The first automatic changing elastic member 63 in the sixth embodiment in which the first automatic control line 61b is included may be implemented to have a smaller elastic force than the first automatic changing elastic member 63 in the fifth embodiment in which the first automatic control line 61b is not included. Therefore, in the sixth embodiment in which the first automatic control line 61b is included, material costs for the first automatic changing elastic member 63 may be reduced as compared to the fifth embodiment in which the first automatic control line 61b is not included.

Meanwhile, when the manual steering is performed, the hydraulic pressure of the working fluid flowing along the first manual branch line 61a becomes greater than the pressing force which is the sum of the elastic force of the first automatic changing elastic member 63 and the hydraulic pressure of the working fluid flowing along the first automatic control line 61b. Accordingly, the first automatic blocking valve 61 may move to the first automatic blocking position.

The second automatic control line 62b is connected to the other side of the second automatic blocking valve 62. Since the second automatic control line 62b is connected to the other side of the second automatic blocking valve 62, a working fluid flowing along the second automatic control line 62b may press the other side of the second automatic blocking valve 62. Accordingly, a pressing force, which is the sum of the elastic force of the second automatic changing elastic member 64 and the hydraulic pressure of the working fluid flowing along the second automatic control line 62b, may press the other side of the second automatic blocking valve 62 in a direction in which the second automatic blocking valve 62 moves from the second automatic blocking position to the second automatic changing position.

The second automatic control line 62b may be connected to each of the discharge line 4b and the other side of the second automatic blocking valve 62. Accordingly, the working fluid flowing along the second automatic control line 62b is a branched portion of the working fluid flowing to be discharged to the external device 140 along the discharge line 4b.

The second automatic changing elastic member 64 in the sixth embodiment in which the second automatic control line 62b is included may be implemented to have a smaller elastic force than the second automatic changing elastic member 64 in the fifth embodiment in which the second automatic control line 62b is not included. Therefore, in the sixth embodiment in which the second automatic control line 62b is included, material costs for the second automatic changing elastic member 64 may be reduced as compared to the fifth embodiment in which the second automatic control line 62b is not included.

Meanwhile, when the manual steering is performed, the hydraulic pressure of the working fluid flowing along the second manual branch line 62a becomes greater than the pressing force which is the sum of the elastic force of the second automatic changing elastic member 64 and the hydraulic pressure of the working fluid flowing along the second automatic control line 62b. Accordingly, the second automatic blocking valve 62 may move to the second automatic blocking position.

<Automatic Blocking Unit According to Seventh Embodiment>

Figure 25:
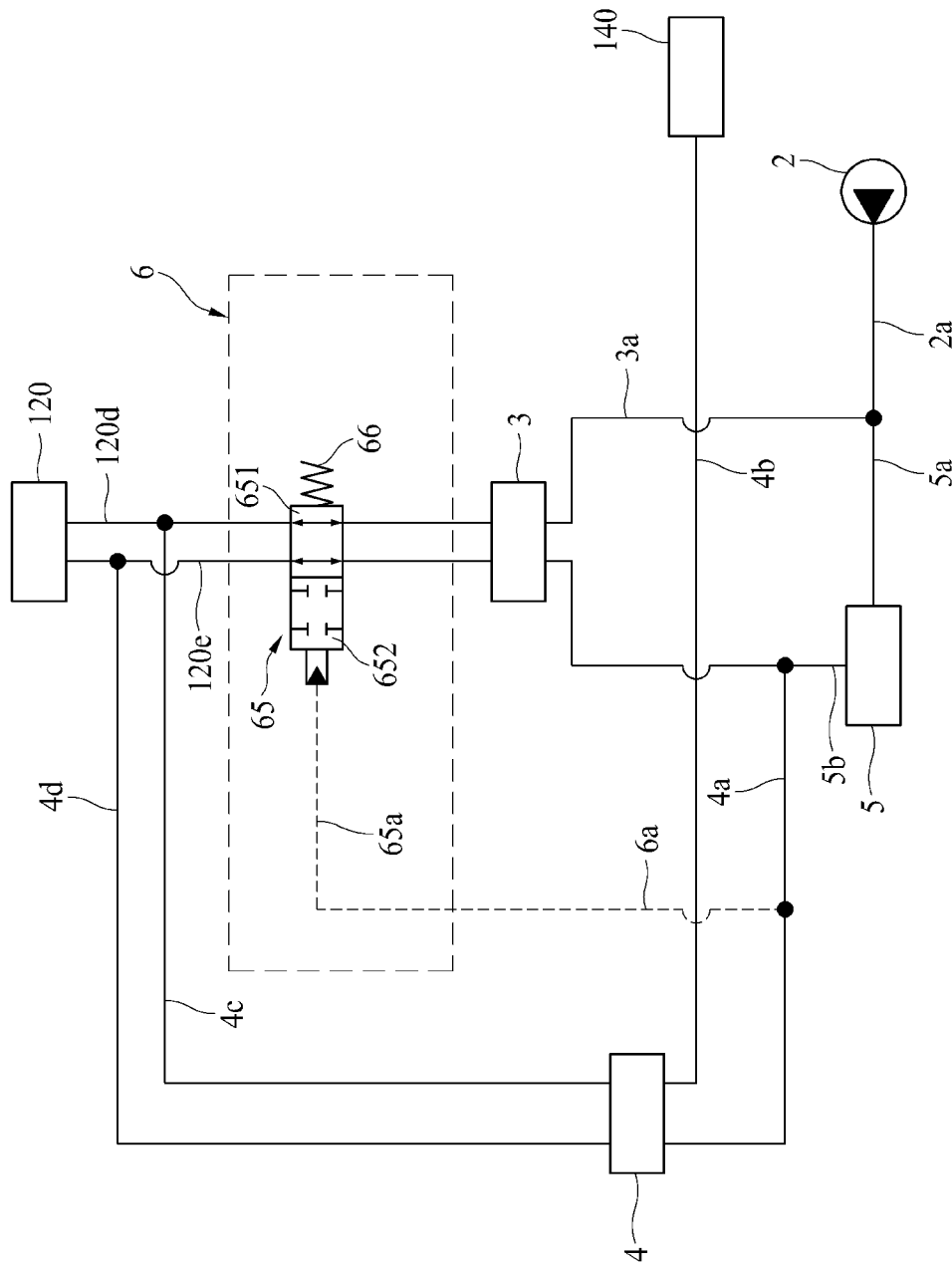

Referring to FIG. 25, an automatic blocking unit 6 according to a seventh embodiment may be implemented to substantially match the automatic blocking unit 6 according to the fifth embodiment illustrated in FIG. 23. Therefore, the automatic blocking unit 6 according to the seventh embodiment will be described focusing on differences from the fifth embodiment.

The automatic blocking unit 6 according to the seventh embodiment differs from the fifth embodiment in that the first automatic blocking valve 61 (see FIG. 23) and the second automatic blocking valve 62 (see FIG. 23) in the fifth embodiment are replaced with a single automatic blocking valve 65.

The automatic blocking valve 65 may be installed to be connected to each of the first steering line 120d and the second steering line 120e. The automatic blocking valve 65 may move between the automatic changing position and the automatic blocking position according to the hydraulic pressure of the working fluid flowing along the manual supply line 4a. When the automatic blocking valve 65 is disposed at the automatic changing position, the automatic blocking valve 65 may, while allowing passage of the working fluid supplied from the automatic steering unit 3, allow passage of the working fluid discharged from the steering cylinder 120. When the automatic blocking valve 65 is disposed at the automatic blocking position, the automatic blocking valve 65 may, while blocking passage of the working fluid supplied from the automatic steering unit 3, block passage of the working fluid discharged from the steering cylinder 120.

The automatic blocking valve 65 may include the passing mechanism 651 and the blocking mechanism 652.

The passing mechanism 651 allows passage of a working fluid. When the automatic blocking valve 65 is disposed at the automatic changing position, the passing mechanism 651 may be connected to each of the first steering line 120d and the second steering line 120e. Accordingly, the working fluid flowing along the first steering line 120d and the working fluid flowing along the second steering line 120e may pass through the automatic blocking valve 65.

The blocking mechanism 652 blocks passage of a working fluid. When the automatic blocking valve 65 is disposed at the automatic blocking position, the blocking mechanism 652 may be connected to each of the first steering line 120d and the second steering line 120e. Accordingly, the working fluid flowing along the first steering line 120d and the working fluid flowing along the second steering line 120e are not able to pass through the automatic blocking valve 65.

The automatic blocking valve 65 may have one side pressed due to the hydraulic pressure of the working fluid flowing along the manual branch line 65a and the other side pressed due to the elastic force of the automatic changing elastic member 66. Therefore, using the difference between the hydraulic pressure of the working fluid flowing along the manual branch line 65a and the elastic force of the automatic changing elastic member 66, the automatic blocking valve 65 may move between the automatic changing position and the automatic blocking position. In this case, the automatic changing elastic member 66 may be formed to have an elastic force greater than the hydraulic pressure of the working fluid flowing along the manual branch line 65a when the manual steering is not performed and have an elastic force less than the hydraulic pressure of the working fluid flowing along the manual branch line 65a when the manual steering is performed.

<Automatic Blocking Unit According to Eighth Embodiment>

Figure 26:
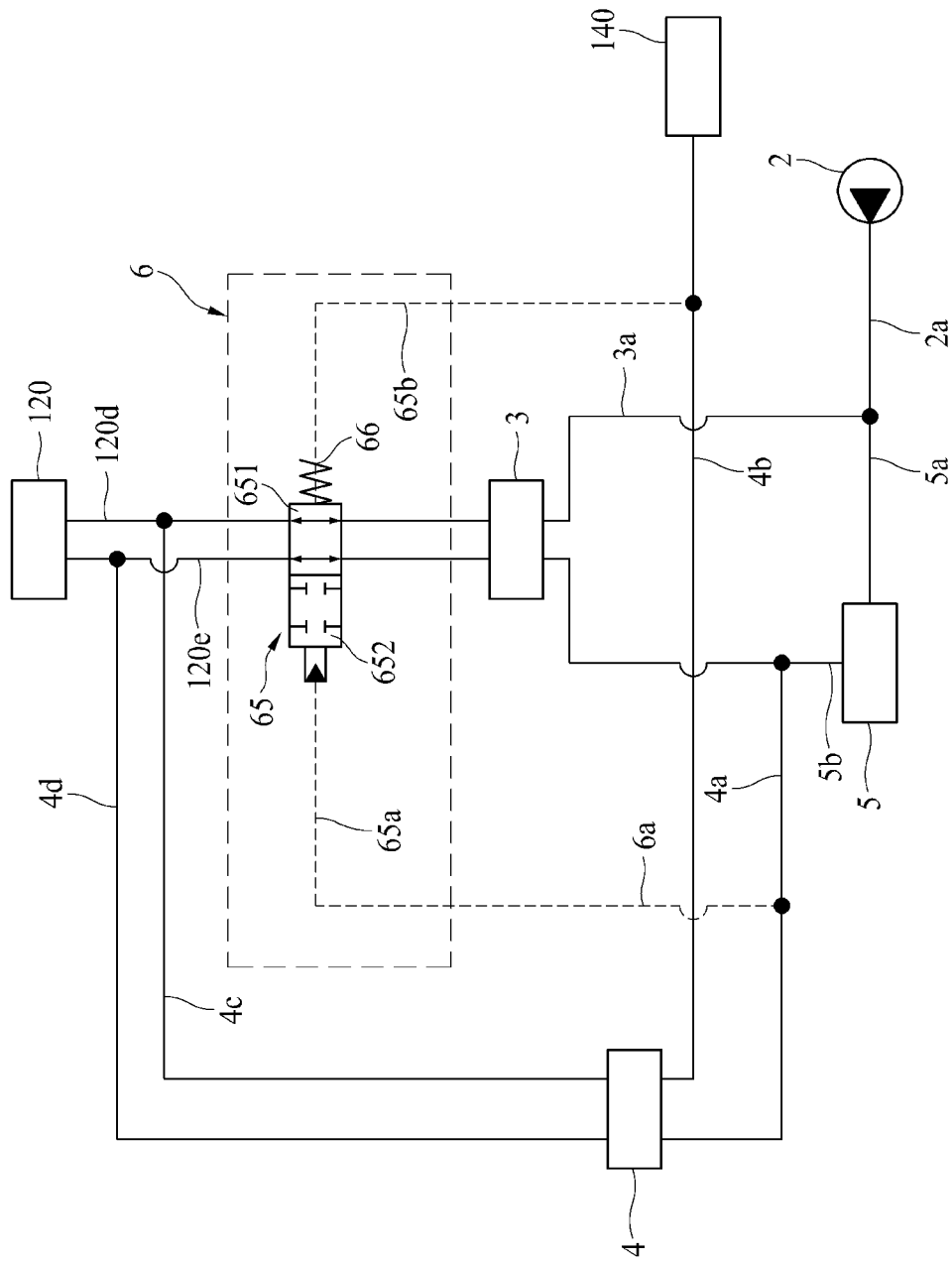

Referring to FIG. 26, an automatic blocking unit 6 according to an eighth embodiment may be implemented to substantially match the automatic blocking unit 6 according to the seventh embodiment illustrated in FIG. 25. Therefore, the automatic blocking unit 6 according to the eighth embodiment will be described focusing on differences from the seventh embodiment.

The automatic blocking unit 6 may further include the automatic control line 65b.

The automatic control line 65b is connected to the other side of the automatic blocking valve 65. Since the automatic control line 65b is connected to the other side of the automatic blocking valve 65, a working fluid flowing along the automatic control line 65b may press the other side of the automatic blocking valve 65. Accordingly, a pressing force, which is the sum of the elastic force of the automatic changing elastic member 66 and the hydraulic pressure of the working fluid flowing along the automatic control line 65b, may press the other side of the automatic blocking valve 65 in a direction in which the automatic blocking valve 65 moves from the automatic blocking position to the automatic changing position. The automatic control line 65b may be connected to each of the discharge line 4b and the other side of the automatic blocking valve 65. Accordingly, the working fluid flowing along the automatic control line 65b is a branched portion of the working fluid flowing to be discharged to the external device 140 along the discharge line 4b.

The automatic changing elastic member 66 in the eighth embodiment in which the automatic control line 65b is included may be implemented to have a smaller elastic force than the automatic changing elastic member 66 in the seventh embodiment in which the automatic control line 65b is not included. Therefore, in the eighth embodiment in which the automatic control line 65b is included, material costs for the automatic changing elastic member 66 may be reduced as compared to the seventh embodiment in which the automatic control line 65b is not included.

Meanwhile, when the manual steering is performed, the hydraulic pressure of the working fluid flowing along the manual branch line 65a becomes greater than the pressing force which is the sum of the elastic force of the automatic changing elastic member 66 and the hydraulic pressure of the working fluid flowing along the automatic control line 65b. Accordingly, the automatic blocking valve 65 may move to the automatic blocking position.

In each of the automatic blocking units 6 according to the first to eighth embodiments described above, the manual changing unit 5 may be implemented to be connected to the shuttle valve 32 as illustrated in FIG. 12. Accordingly, when the automatic steering is performed, the manual changing valve 51 may, through the shuttle valve 32, move to the manual blocking position due to a pressing force which is the sum of the hydraulic pressure of the working fluid flowing along the second changing control line 5d and the elastic force of the manual blocking elastic member 52.

In each of the automatic blocking units 6 according to the first to eighth embodiments described above, the manual changing unit 5 may also be connected to the automatic steering valve 31 having the branching control lines 3b and 3b' as illustrated in FIG. 13. Accordingly, when the automatic steering is performed, the manual changing valve 51 may, through the automatic steering valve 31, move to the manual blocking position due to the pressing force which is the sum of the hydraulic pressure of the working fluid flowing along the second changing control line 5d and the elastic force of the manual blocking elastic member 52.

Referring to FIGS. 27 to 30, the hydraulic steering device 1 for an agricultural vehicle according to the present disclosure may include a selection unit 7.

The selection unit 7 selectively supplies the working fluid supplied from the steering pump 2 toward any one of the manual steering unit 4 and the automatic steering unit 3. The selection unit 7 may be connected to each of the pump supply line 2a, the automatic supply line 3a, and the manual supply line 4a. In this case, the selection unit 7 may selectively supply the working fluid supplied through the pump supply line 2a to any one of the automatic supply line 3a and the manual supply line 4a. By supplying the working fluid to the automatic supply line 3a, the selection unit 7 may supply the working fluid toward the automatic steering unit 3. By supplying the working fluid to the manual supply line 4a, the selection unit 7 may supply the working fluid toward the manual steering unit 4.

Figure 28:
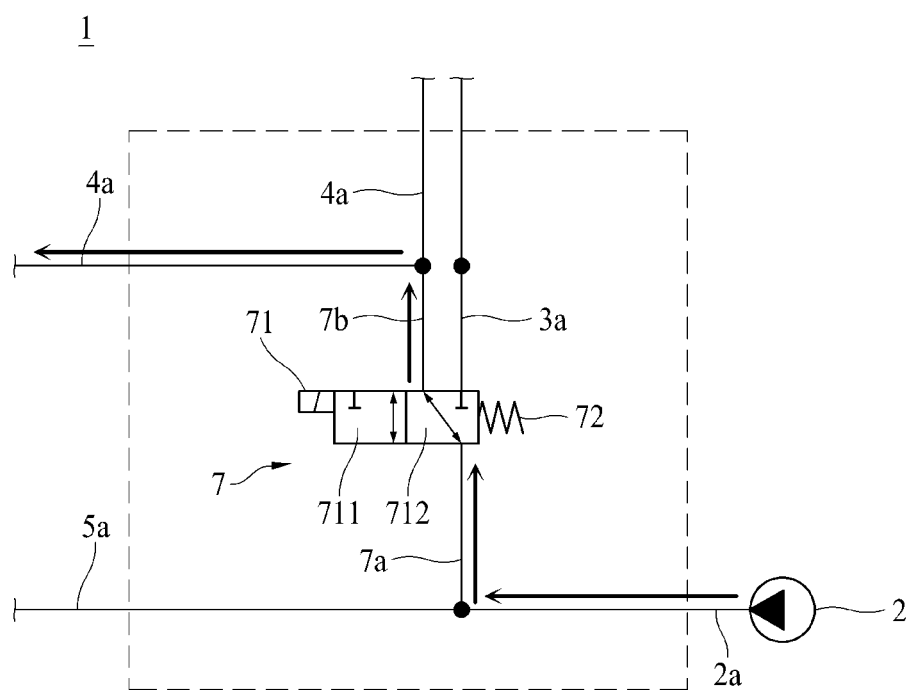

The selection unit 7 may be operated to change a direction of supply of the working fluid according to control by the controller 130 (see FIG. 2). As illustrated in FIG. 28, when the selection unit 7 supplies the working fluid supplied from the steering pump 2 to the manual supply line 4a, the working fluid supplied from the steering pump 2 may be supplied from the selection unit 7 to the manual steering unit 4 without passing through the manual changing unit 5 and the automatic steering unit 3. Accordingly, the hydraulic steering device 1 for an agricultural vehicle according to the present disclosure may achieve the following effects.

First, the manual changing unit 5 is implemented to allow passage of a working fluid only when the hydraulic pressure of the working fluid increases to a predetermined size or more. Accordingly, a pressure acting on the steering pump 2 increases until the manual changing unit 5 allows passage of the working fluid.

On the other hand, the selection unit 7 may be controlled by the controller 130 to allow passage of a working fluid even when the hydraulic pressure of the working fluid does not increase to the predetermined size or more. Accordingly, when the working fluid is supplied to the manual steering unit 4 through the selection unit 7, the pressure acting on the steering pump 2 may be reduced as compared to when the working fluid is supplied to the manual steering unit 4 through the manual changing unit 5.

Therefore, the hydraulic steering device 1 for an agricultural vehicle according to the present disclosure may, using the selection unit 7, lower a defect occurrence rate of the steering pump 2 and increase the service life of the steering pump 2. Meanwhile, despite including the selection unit 7, the hydraulic steering device 1 for an agricultural vehicle according to the present disclosure is implemented to be able to supply a working fluid to the manual steering unit 4 through the manual changing unit 5. Therefore, the hydraulic steering device 1 for an agricultural vehicle according to the present disclosure allows the driver to select an operation method suitable for a working condition, and thus an ability to handle a change in a working condition may be improved.

When the selection unit 7 supplies the working fluid supplied from the steering pump 2 to the automatic supply line 3*a*, as described above with reference to FIGS. 2 to 26, the working fluid supplied from the steering pump 2 may flow differently according to whether the manual steering is performed, the automatic steering is not performed in the state in which the manual steering is not performed, or the automatic steering is performed in the state in which the manual steering is not performed.

Figure 27:
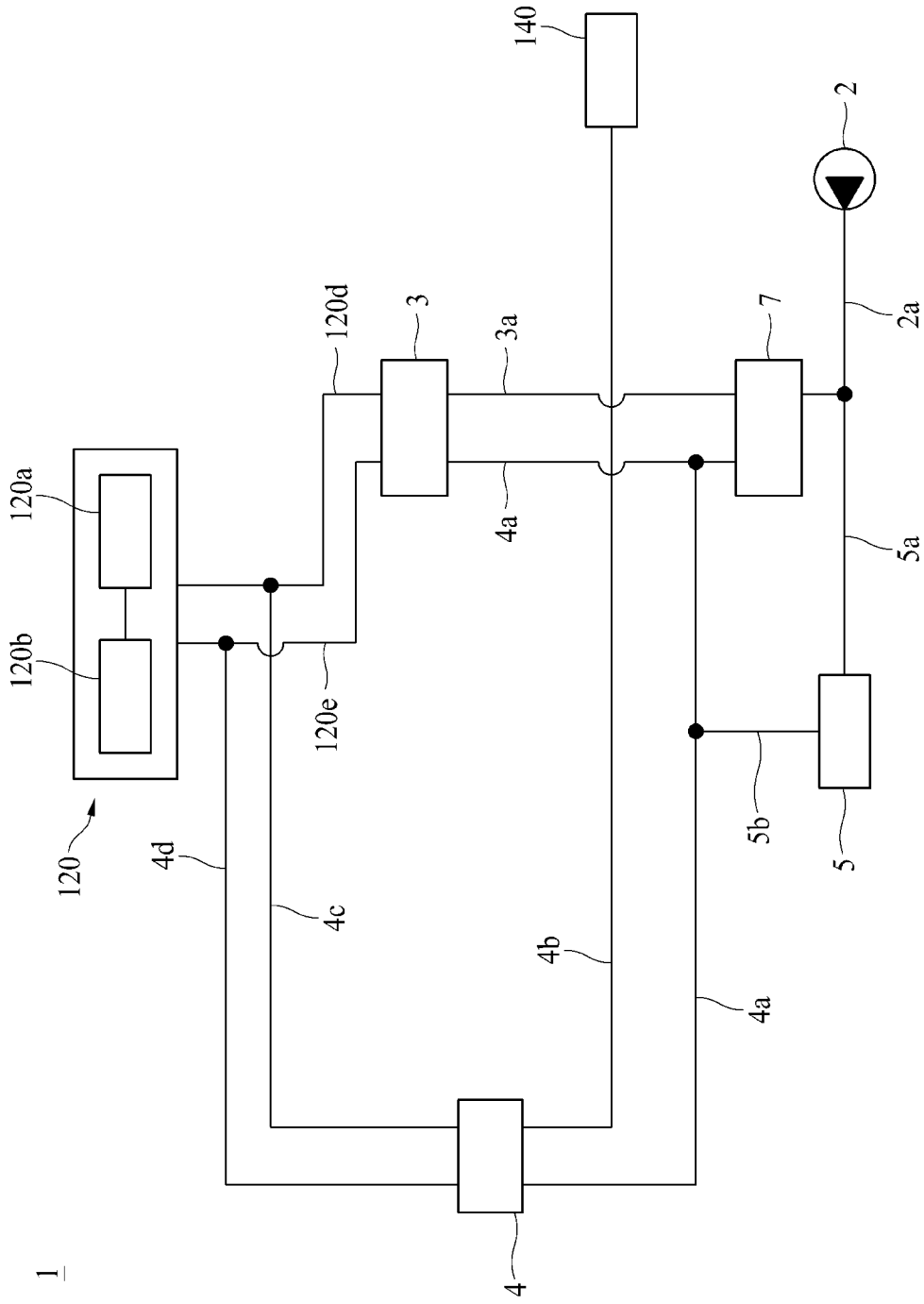
Figure 29:
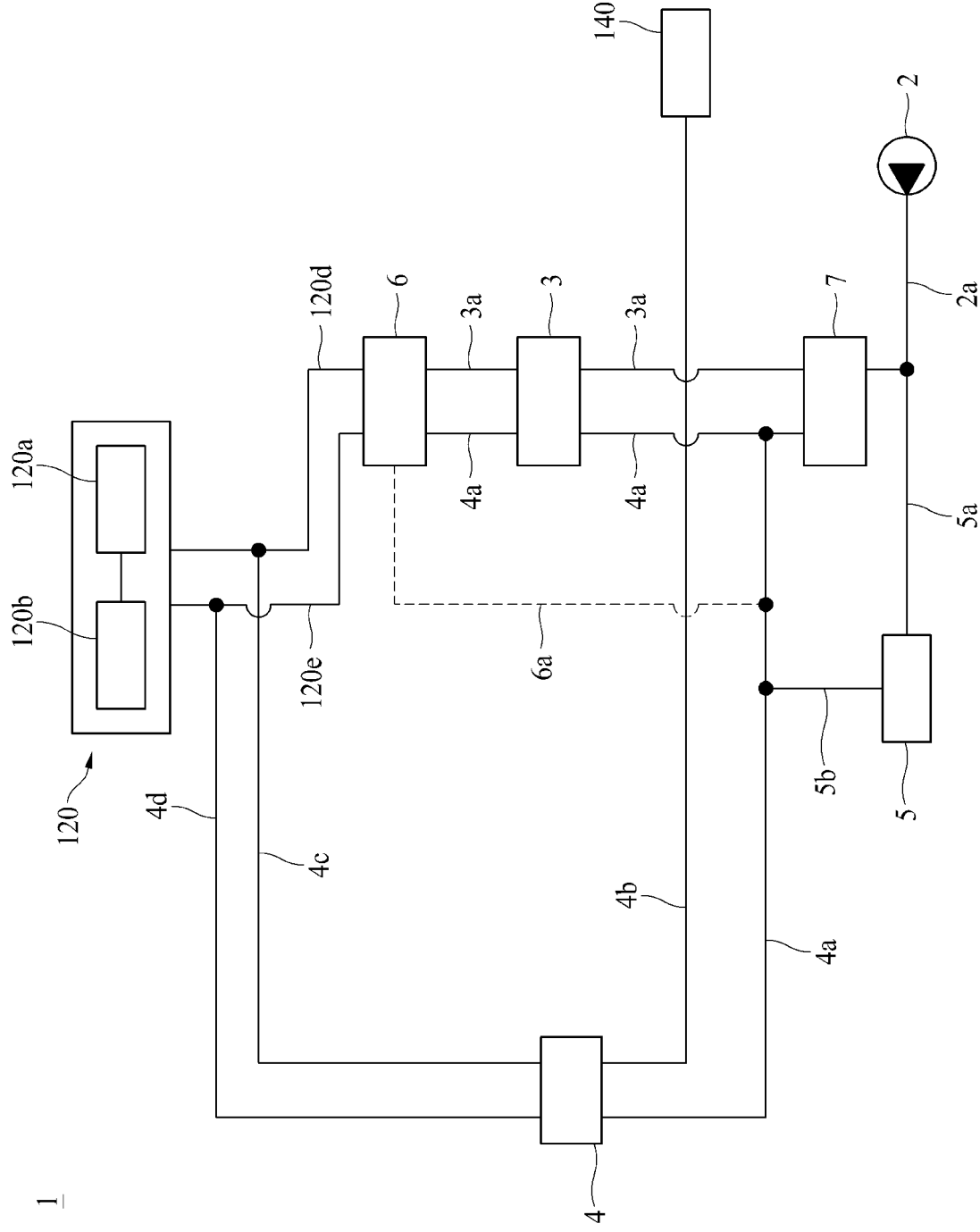
Figure 30:
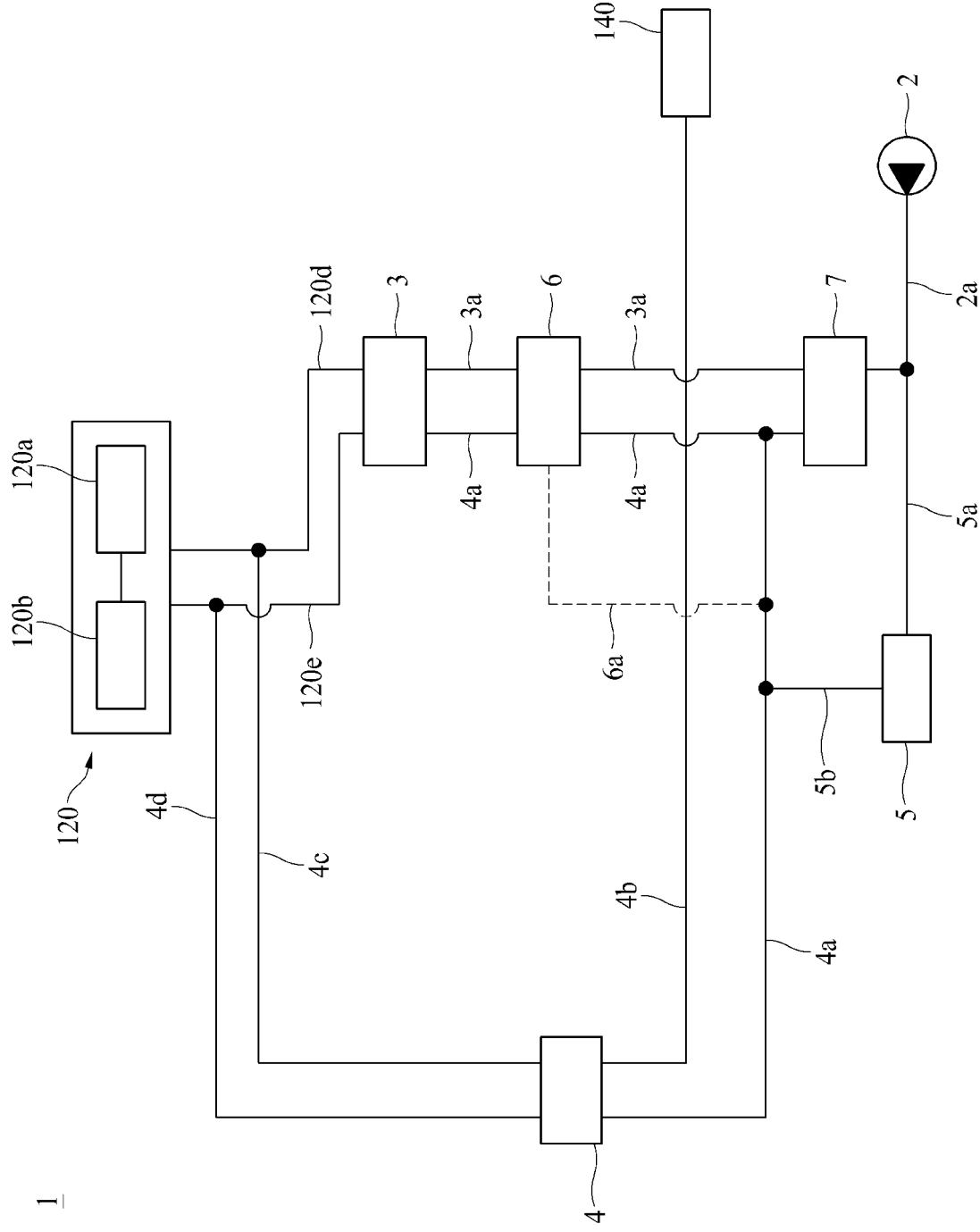

The selection unit 7 may be connected to the manual steering unit 4 through the manual supply line 4*a*. The selection unit 7 may be connected to the automatic steering unit 3 or the automatic blocking unit 6 through the automatic supply line 3*a*. As illustrated in FIG. 27, when the automatic blocking unit 6 is not included, the selection unit 7 may be connected to the automatic steering unit 3 through the automatic supply line 3*a*. As illustrated in FIG. 29, when the automatic blocking unit 6 is implemented according to the rear end arrangement embodiment, the selection unit 7 may be connected to the automatic steering unit 3 through the automatic supply line 3*a*. As illustrated in FIG. 30, when the automatic blocking unit 6 is implemented according to the front end arrangement embodiment, the selection unit 7 may be connected to the automatic blocking unit 6 through the automatic supply line 3*a*.

The selection unit 7 may be connected to the pump supply line 2*a* through a selection supply line 7*a* and may be connected to the steering pump 2 through the pump supply line 2*a*. The selection supply line 7*a* may be connected to the pump supply line 2*a* between the steering pump 2 and the manual changing unit 5. The selection unit 7 may be connected to the manual supply line 4*a* through a selection discharge line 7*b* and may be connected to the manual steering unit 4 through the manual supply line 4*a*.

The selection unit 7 may include a selection valve 71 (see FIG. 28).

The selection valve 71 moves between a manual selection position and a steering selection position. When the selection valve 71 is disposed at the manual selection position, as illustrated in FIG. 28, the selection valve 71 may supply the working fluid supplied from the steering pump 2 to the manual supply line 4*a*. Accordingly, the working fluid supplied from the steering pump 2 may be supplied to the manual steering unit 4 without passing through the manual changing unit 5. When the selection valve 71 is disposed at the steering selection position, the selection valve 71 may supply the working fluid supplied from the steering pump 2 to the automatic supply line 3*a*. Accordingly, the working fluid supplied from the steering pump 2 may flow differently according to whether the manual steering is performed, the automatic steering is not performed in the state in which the manual steering is not performed, or the automatic steering is performed in the state in which the manual steering is not performed.

When the selection valve 71 is included, the selection supply line 7*a* may have one side connected to the pump supply line 2*a* connected to the steering pump 2 and the other side connected to an inlet side of the selection valve 71. The selection discharge line 7*b* may have one side connected to the manual supply line 4*a* connected to the manual steering unit 4 and the other side connected to an outlet side of the selection valve 71. The automatic supply line 3*a* may be connected to the outlet side of the selection valve 71.

The selection valve 71 may include a steering selection mechanism 711 and a manual selection mechanism 712.

The steering selection mechanism 711 connects the selection supply line 7*a* and the automatic supply line 3*a*. When the steering selection mechanism 711 is connected to the selection supply line 7*a* and the automatic supply line 3*a* due to movement of the selection valve 71, the working fluid supplied from the steering pump 2 may pass through the steering selection mechanism 711 and be supplied to the automatic supply line 3*a*. In this case, the steering selection mechanism 711 may be implemented to block connection between the selection supply line 7*a* and the selection discharge line 7*b*.

The manual selection mechanism 712 connects the selection supply line 7*a* and the selection discharge line 7*b*. When the manual selection mechanism 712 is connected to the selection supply line 7*a* and the selection discharge line 7*b* due to movement of the selection valve 71, the working fluid supplied from the steering pump 2 may pass through the manual selection mechanism 712 and be supplied to the manual supply line 4*a* through the selection discharge line 7*b*. In this case, the manual selection mechanism 712 may be implemented to block connection between the selection supply line 7*a* and the automatic supply line 3*a*.

With respect to a direction in which the selection valve 71 moves between the manual selection position and the steering selection position, a selection elastic member 72 may be coupled to one side of the selection valve 71. The selection elastic member 72 may elastically press the one side of the selection valve 71 in a direction moving the selection valve 71 to the manual selection position. Accordingly, when the controller 130 does not control the selection valve 71, the selection valve 71 may be disposed at the manual selection position.

Hereinafter, an embodiment of a hydraulic steering device for an agricultural vehicle according to a modified embodiment of the present disclosure will be described in detail with reference to the accompanying drawings.

Figure 31:
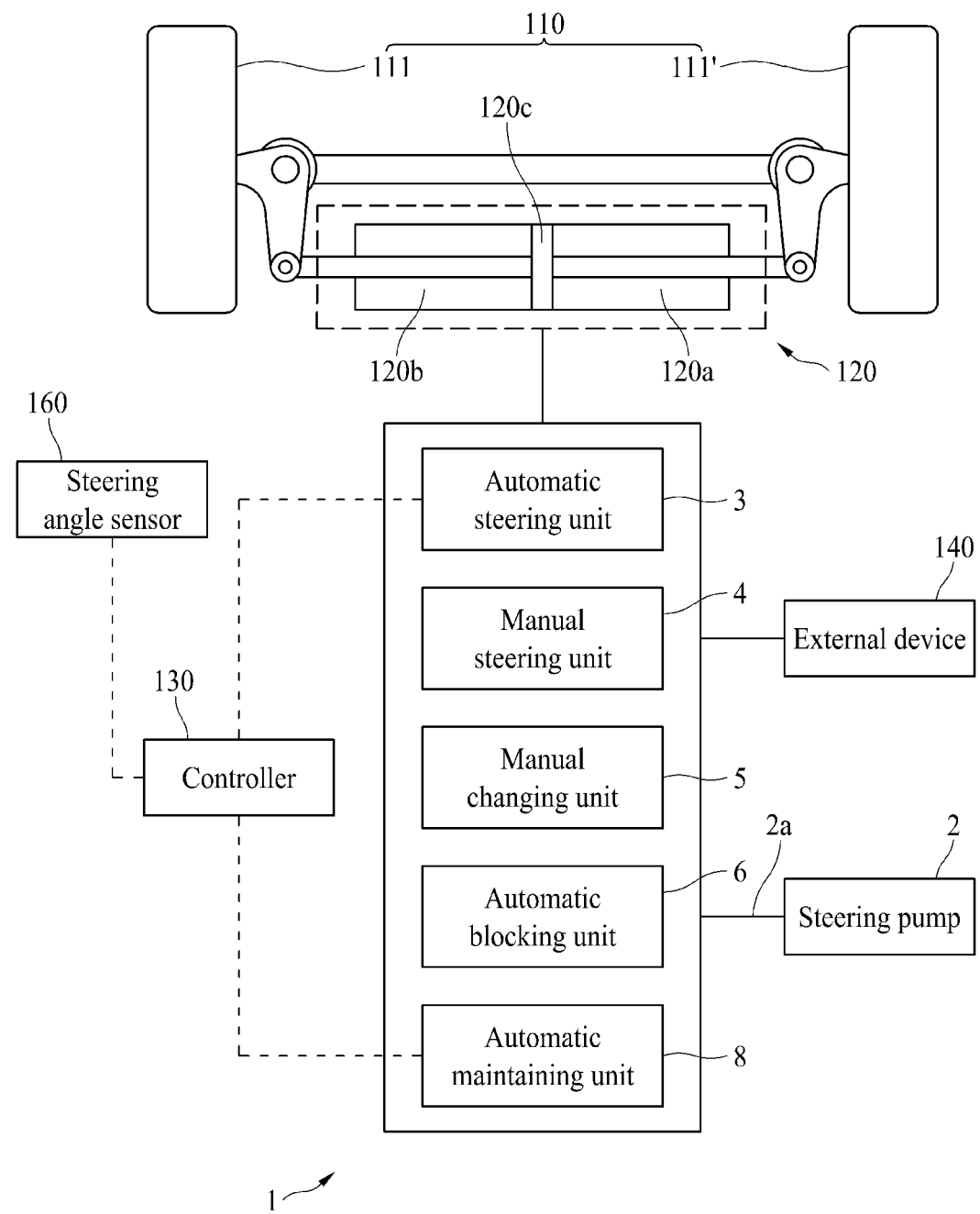
FIG. 31 is a schematic block diagram of an agricultural vehicle which includes a steering device for an agricultural vehicle according to a modified embodiment of the present disclosure.
Figure 32:
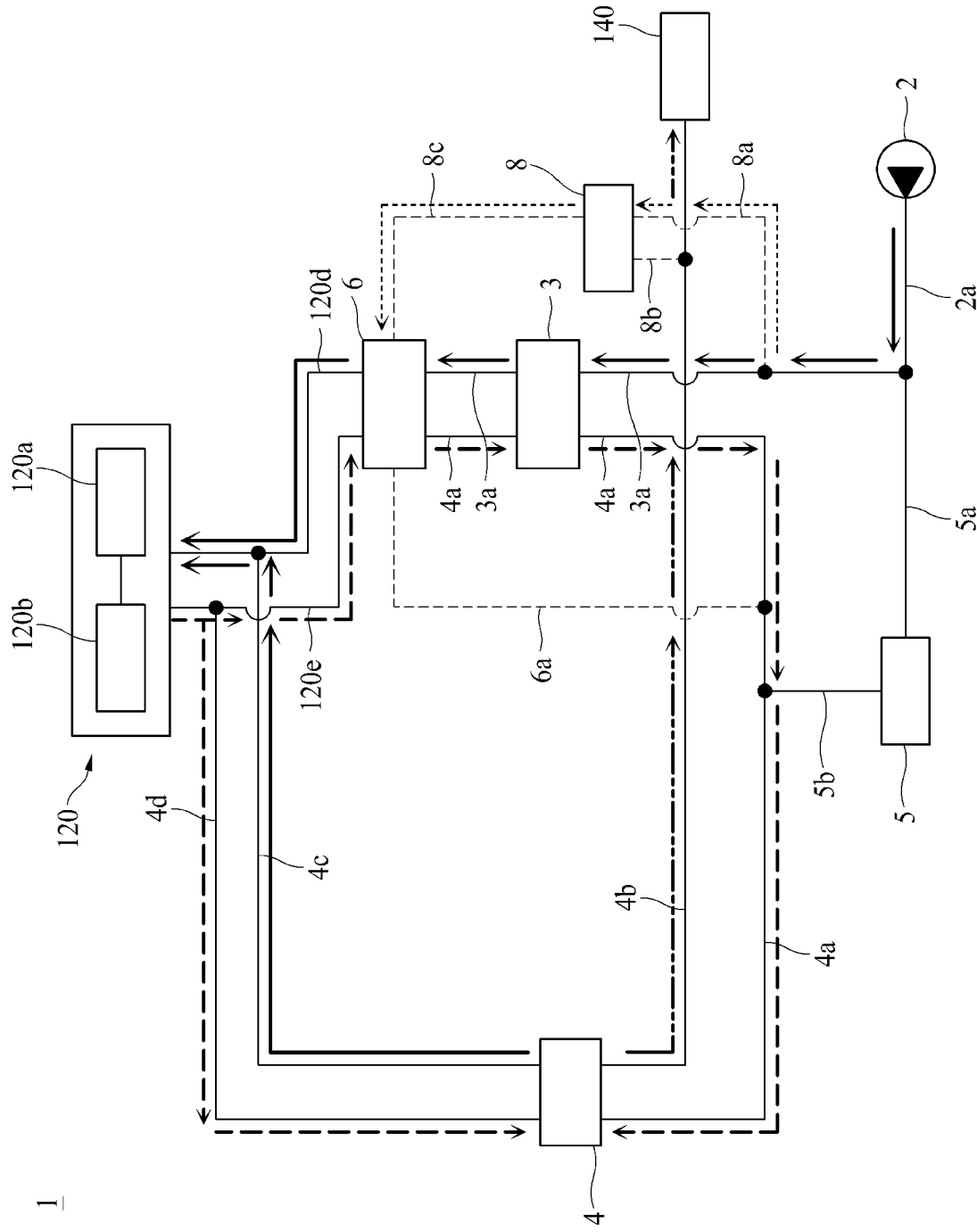
FIGS. 32 to 39 are schematic hydraulic circuit diagrams illustrating a flowing direction of a working fluid in a hydraulic steering device for an agricultural vehicle according to the modified embodiment of the present disclosure.
Figure 33:
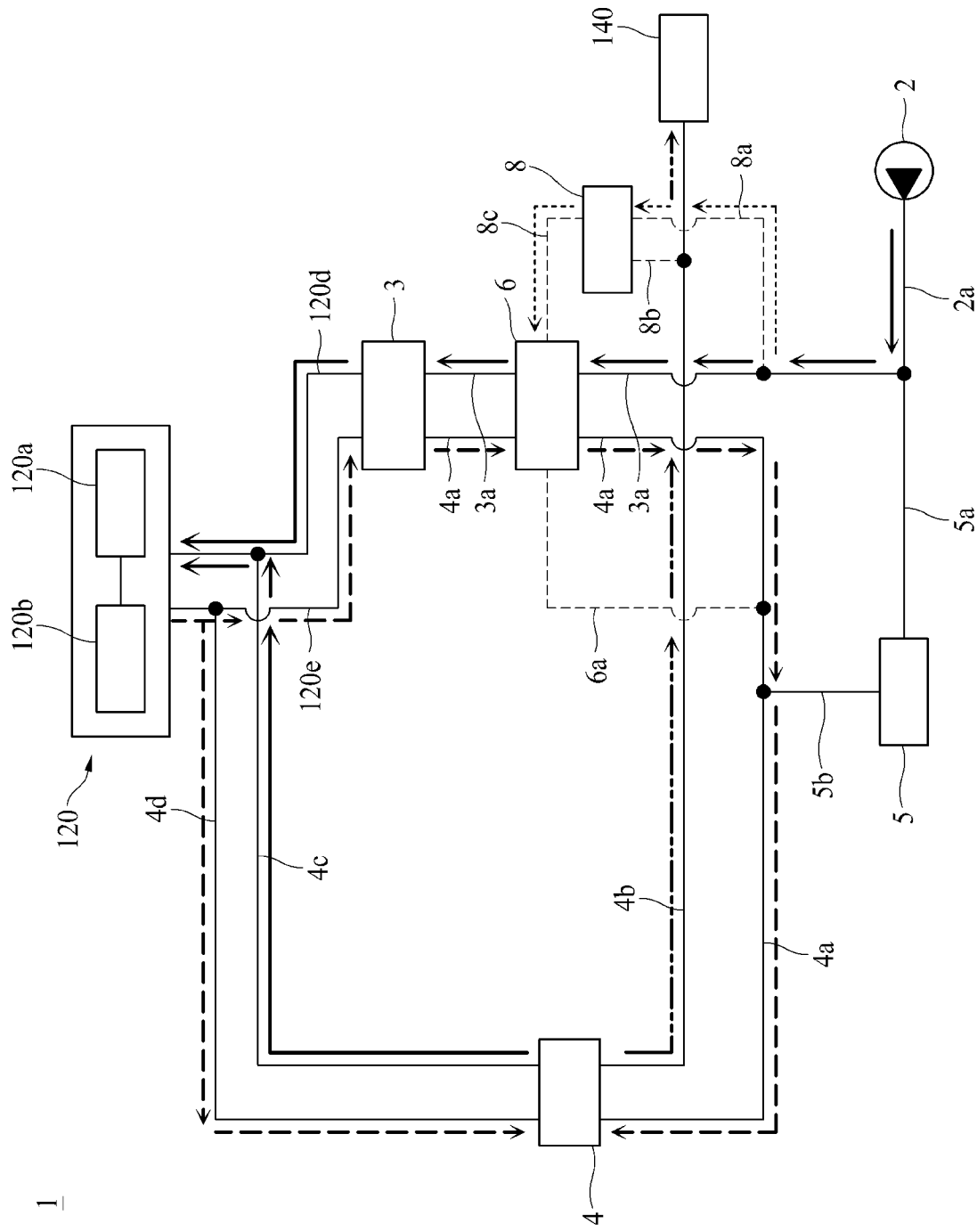

Referring to FIGS. 31 to 33, a hydraulic steering device 1 for an agricultural vehicle according to a modified embodiment of the present disclosure may include the steering pump 2, the automatic steering unit 3, the manual steering unit 4, the manual changing unit 5, and the automatic blocking unit 6. Since the steering pump 2, the automatic steering unit 3, the manual steering unit 4, the manual changing unit 5, and the automatic blocking unit 6 substantially match those described above in relation to the hydraulic steering device 1 for an agricultural vehicle according to the present disclosure, detailed descriptions thereof will be omitted.

In addition to including the steering pump 2, the automatic steering unit 3, the manual steering unit 4, the manual changing unit 5, and the automatic blocking unit 6, the hydraulic steering device 1 for an agricultural vehicle according to the modified embodiment of the present disclosure may further include an automatic maintaining unit 8.

The automatic maintaining unit 8 controls the automatic blocking unit 6. The automatic maintaining unit 8 may control the automatic blocking unit 6 to cause the working fluid for the automatic steering to pass regardless of whether the manual steering is performed. That is, the automatic maintaining unit 8 may control the automatic blocking unit 6 to always cause the working fluid to pass. Accordingly, even when the manual steering is performed, the automatic blocking unit 6 may cause the working fluid to pass.

Therefore, when the automatic blocking unit 6 is controlled by the automatic maintaining unit 8 to cause the working fluid for the automatic steering to pass in the state in which the manual steering is performed, both the automatic steering unit 3 and the manual steering unit 4 may supply the working fluid to the steering cylinder 120. In this case, the controller 130 may receive a manipulation angle of the steering wheel from a steering angle sensor 160 (see FIG. 31) and may control the automatic steering unit 3 according to the received manipulation angle. That is, while the steering wheel is manipulated, the manual steering unit 4 and the automatic steering unit 3 may simultaneously change the traveling direction to the same direction. Accordingly, the hydraulic steering device 1 for an agricultural vehicle according to the modified embodiment of the present disclosure may supply a higher flow rate of working fluid to the steering cylinder 120 relative to the manipulation angle at which the driver turns the steering wheel and thus may change the traveling direction to a greater extent relative to the manipulation angle.

For example, when, due to the automatic maintaining unit 8, the automatic blocking unit 6 always causes the working fluid to pass, the hydraulic steering device 1 for an agricultural vehicle according to the modified embodiment of the present disclosure may, when the manipulation angle is 90°, supply the same flow rate of working fluid as when the manipulation angle is manipulated to 630° to the steering cylinder 120, thus changing the traveling direction identically to when the manipulation angle is manipulated to 630°.

Therefore, even when, due to characteristics of agricultural work, a situation where the traveling direction is changed to a great extent, such as when making a U-turn, frequently occurs, the hydraulic steering device 1 for an agricultural vehicle according to the modified embodiment of the present disclosure may reduce a burden on the driver. In particular, in a case in which the driver manually steers the agricultural vehicle while keeping an eye on the rear to perform agricultural work, even when steering at a large angle is required, the driver may perform desired steering through manipulation at a small angle. Accordingly, the hydraulic steering device 1 for an agricultural vehicle according to the modified embodiment of the present disclosure may improve ease and convenience of the traveling direction changing work and prevent the occurrence of accidents during the process of performing agricultural work.

The automatic maintaining unit 8 may control the automatic blocking unit 6 according to control by the controller 130. The controller 130 may receive a manipulation angle of the steering wheel from the steering angle sensor 160 and may control the automatic maintaining unit 8 according to the received manipulation angle. In this case, the controller 130 may control the automatic maintaining unit 8 according to pre-stored set data to control a maintaining time during which the automatic blocking unit 6 causes a working fluid to pass even when the manual steering is performed, a flow rate of the working fluid caused to pass, and the like. The set data may be pre-stored by a worker. Target angles for changing the traveling direction to a greater extent relative to the manipulation angle may be matched with each manipulation angle and stored in the set data.

Meanwhile, the controller 130 may control the automatic maintaining unit 8 according to whether manipulation is made on a control panel (not illustrated). The driver may perform manipulation on the control panel to select any one operation mode of a first operation mode in which the traveling direction is changed to correspond to the manipulation angle and a second operation mode in which the traveling direction is changed to a greater extent as compared to the first operation mode.

When the first operation mode is selected, the automatic maintaining unit 8 may control the automatic blocking unit 6 so that the automatic blocking unit 6 blocks passage of a working fluid when the manual steering is performed according to control by the controller 130. In this case, the automatic blocking unit 6 may allow passage of the working fluid when the manual steering is not performed.

When the second operation mode is selected, the automatic maintaining unit 8 may control the automatic blocking unit 6 so that the automatic blocking unit 6 allows passage of a working fluid even when the manual steering is performed according to control by the controller 130.

The automatic maintaining unit 8 may be applied to both the automatic blocking unit 6 implemented according to the rear end arrangement embodiment as illustrated in FIG. 32 and the automatic blocking unit 6 implemented according to the front end arrangement embodiment as illustrated in FIG. 33. In this case, the automatic blocking unit 6 implemented according to the front end arrangement embodiment may be implemented to include the first automatic blocking valve 61 and the second automatic blocking valve 62 as in the first embodiment and second embodiment illustrated in FIGS. 16 to 18 or may also be implemented to include the automatic blocking valve 65 as in the third embodiment and fourth embodiment illustrated in FIGS. 19 to 21. The automatic blocking unit 6 implemented according to the rear end arrangement embodiment may be implemented to include the first automatic blocking valve 61 and the second automatic blocking valve 62 as in the fifth embodiment and sixth embodiment illustrated in FIGS. 23 and 24 or may also be implemented to include the automatic blocking valve 65 as in the seventh embodiment and eighth embodiment illustrated in FIGS. 25 and 26.

Figure 34:
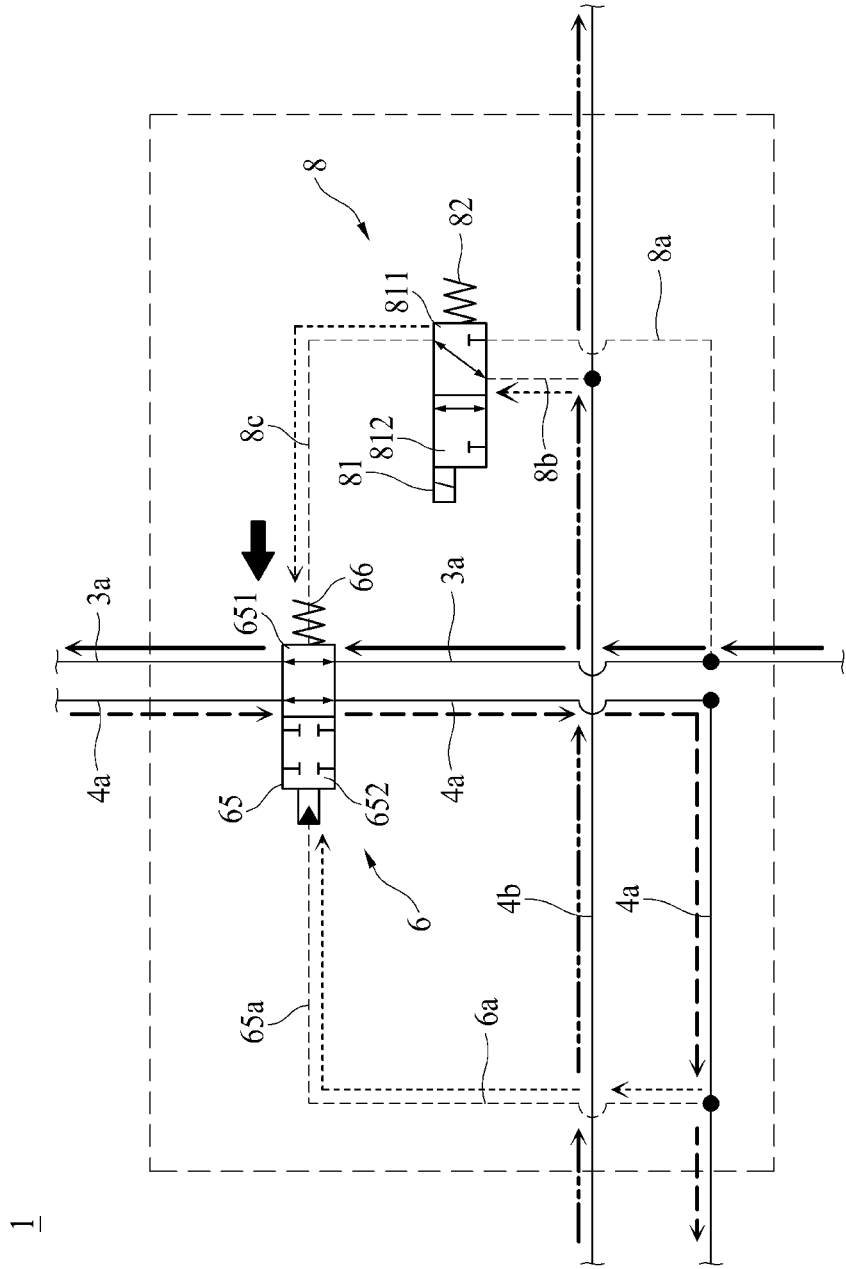
Figure 35:
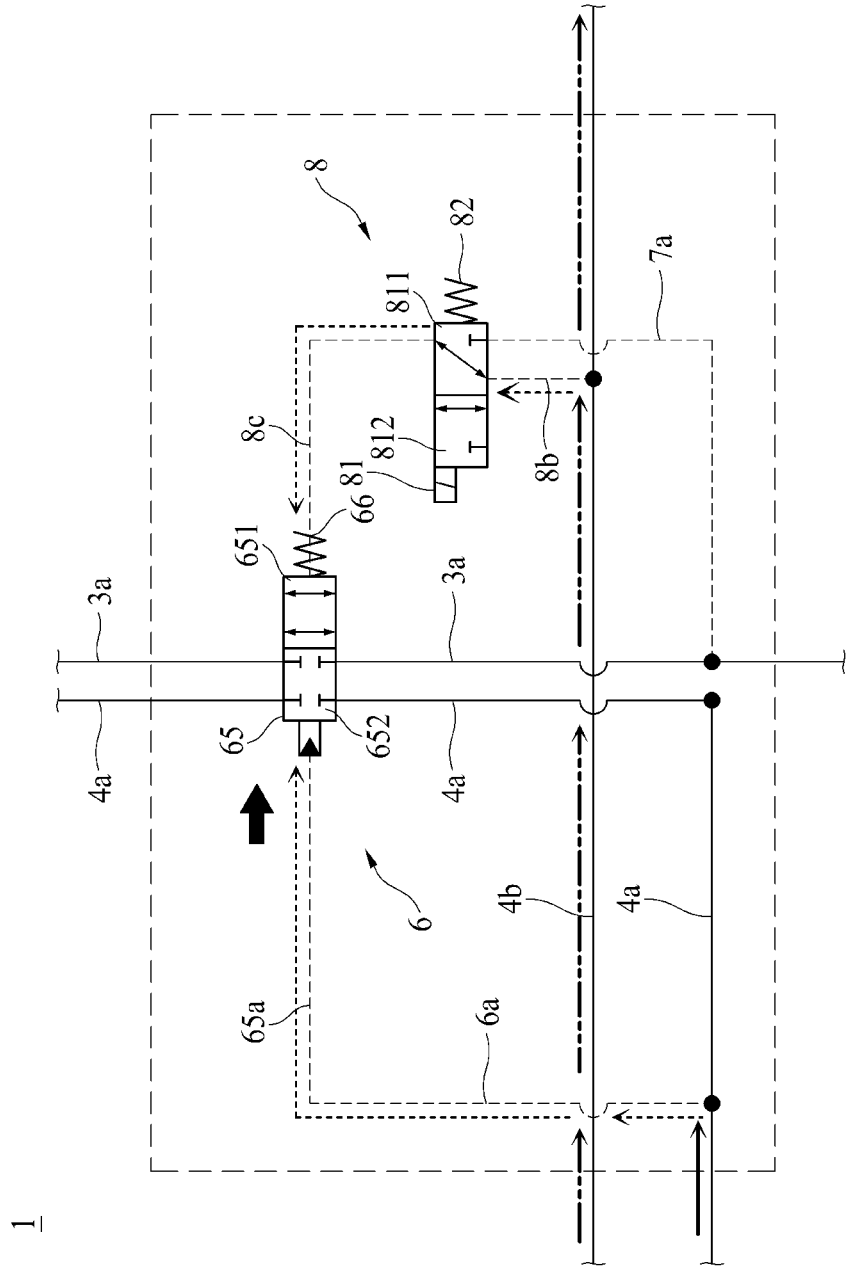
Figure 36:
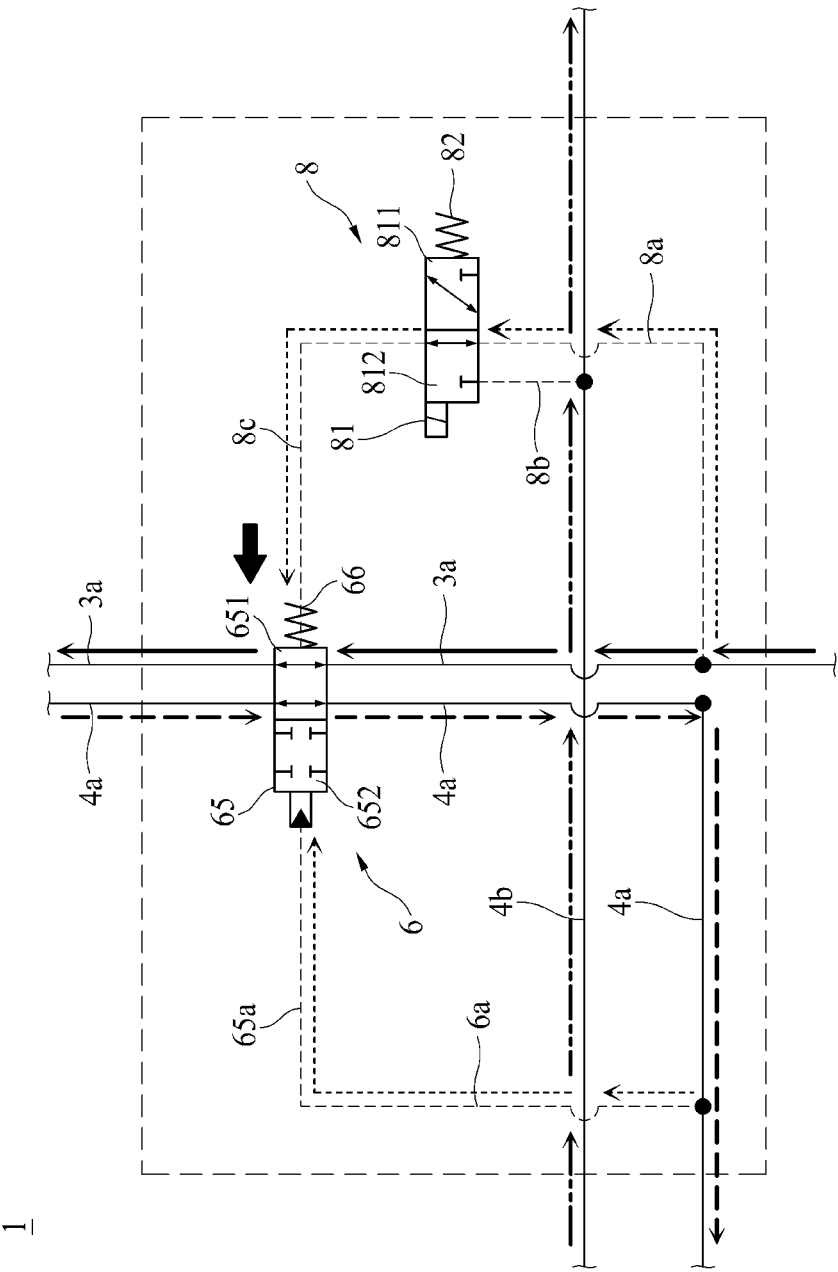
Figure 37:
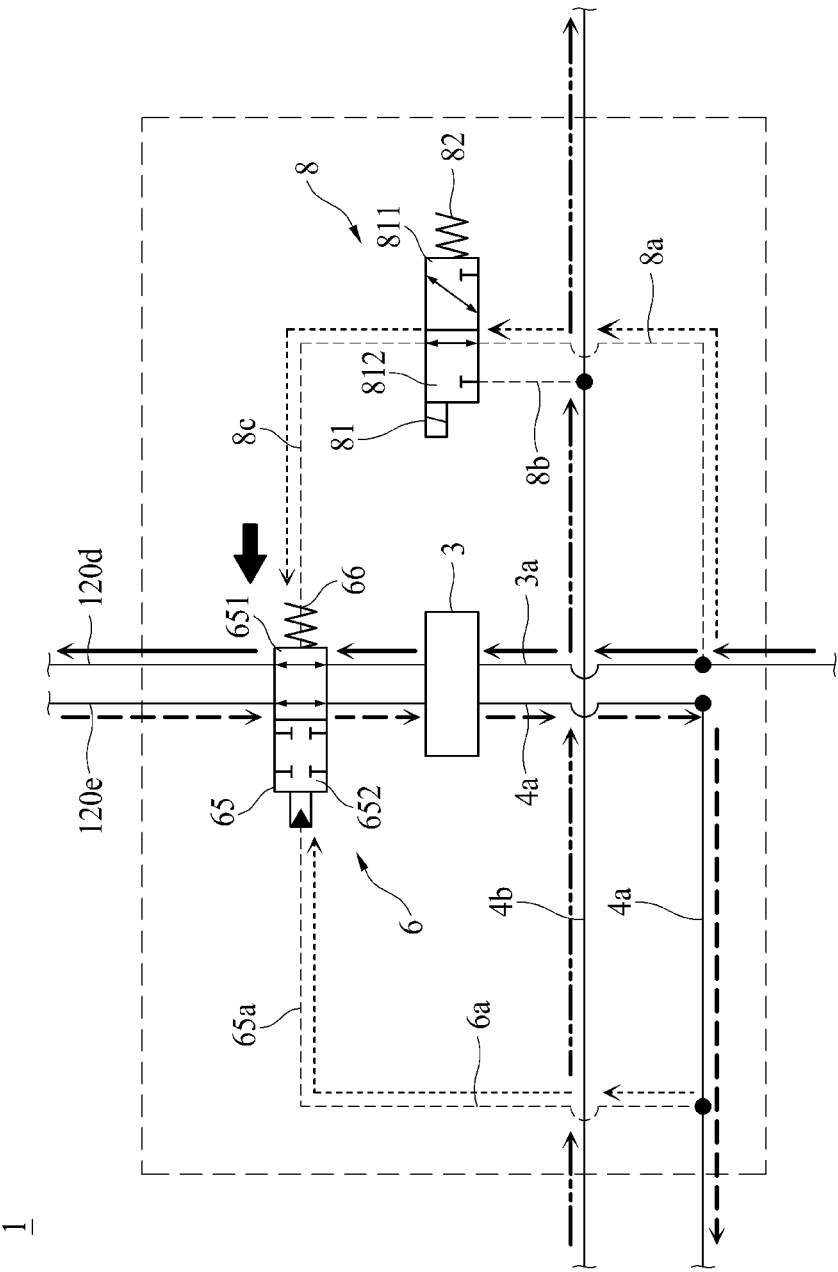

Referring to FIGS. 31 to 37, the automatic maintaining unit 8 may include an automatic maintaining valve 81. FIGS. 34 to 36 illustrate, among the front end arrangement embodiments, an embodiment in which the automatic maintaining unit 8 is applied to the automatic blocking unit 6 implemented to include the automatic blocking valve 65 as in the third embodiment and fourth embodiment. FIG. 37 illustrates, among the rear end arrangement embodiments, an embodiment in which the automatic maintaining unit 8 is applied to the automatic blocking unit 6 implemented to include the automatic blocking valve 65 as in the seventh embodiment and eighth embodiment.

The automatic maintaining valve 81 moves between an automatic maintaining position and a manual priority position. The automatic maintaining valve 81 may move between the automatic maintaining position and the manual priority position according to control by the controller 130. When the automatic maintaining valve 81 moves to the automatic maintaining position as illustrated in FIG. 36, the automatic blocking unit 6 may allow passage of the working fluid for the automatic steering regardless of whether the manual steering is performed. In this case, the automatic blocking unit 6 may allow passage of the working fluid even when the manual steering is performed. When the automatic maintaining valve 81 moves to the manual priority position as illustrated in FIGS. 34 and 35, the automatic blocking unit 6 may selectively block passage of the working fluid for the automatic steering according to whether the manual steering is performed. In this case, the automatic blocking unit 6 may block passage of the working fluid when the manual steering is performed and allow passage of the working fluid when the manual steering is not performed.

The automatic maintaining valve 81 may be connected to each of a first maintaining supply line 8a, a second maintaining supply line 8b, and a maintaining discharge line 8c. The first maintaining supply line 8a may have one side connected to the automatic supply line 3a and the other side connected to an inlet side of the automatic maintaining valve 81. The hydraulic pressure of the working fluid flowing along the automatic supply line 3a and the hydraulic pressure of the working fluid flowing along the pump supply line 2a may be equal to each other. Although not illustrated, the one side of the first maintaining supply line 8a may also be connected to the pump supply line 2a. The one side of the first maintaining supply line 8a may be connected to the automatic supply line 3a or the pump supply line 2a between the steering pump 2 and the automatic blocking valve 65. The second maintaining supply line 8b may have one side connected to the discharge line 4b and the other side connected to the inlet side of the automatic maintaining valve 81. The maintaining discharge line 8c may have one side connected to the other side of the automatic blocking valve 65 and the other side connected to an outlet side of the automatic maintaining valve 81.

Accordingly, when the automatic maintaining valve 81 moves between the automatic maintaining position and the manual priority position, the automatic blocking valve 65 may move as follows.

First, as illustrated in FIGS. 36 and 37, when the automatic maintaining valve 81 moves to the automatic maintaining position according to control by the controller 130, the automatic maintaining valve 81 may connect the first maintaining supply line 8a and the maintaining discharge line 8c. Accordingly, the automatic maintaining valve 81 may control the automatic blocking unit 6 using the working fluid for the automatic steering. In this case, a portion of the working fluid supplied from the steering pump 2 may, after being branched from the automatic supply line 3a to the first maintaining supply line 8a, pass through the automatic maintaining valve 81 and be supplied to the maintaining discharge line 8c. Therefore, the hydraulic pressure of the working fluid flowing along the manual control line 6a acts as a pressing force on the one side of the automatic blocking valve 65, and a pressing force, which is the sum of a hydraulic pressure of a working fluid flowing along the maintaining discharge line 8c and the elastic force of the automatic changing elastic member 66, acts on the other side of the automatic blocking valve 65. In this case, the automatic blocking valve 65 may move between the automatic changing position and the automatic blocking position according to a magnitude of the pressing force acting on the one side that is due to the hydraulic pressure of the working fluid flowing along the manual branch line 65a and a magnitude of the pressing force acting on the other side that is the sum of the hydraulic pressure of the working fluid flowing along the maintaining discharge line 8c and the elastic force of the automatic changing elastic member 66. The working fluid flowing along the manual branch line 65a is discharged from the steering cylinder 120 and supplied to the manual steering unit 4, and the working fluid flowing along the maintaining discharge line 8c is supplied from the steering pump 2. Accordingly, the hydraulic pressure of the working fluid flowing along the maintaining discharge line 8c is always higher than the hydraulic pressure of the working fluid flowing along the manual branch line 65a. Therefore, the magnitude of the pressing force acting on the other side of the automatic blocking valve 65, which is the sum of the hydraulic pressure of the working fluid flowing along the maintaining discharge line 8c and the elastic force of the automatic changing elastic member 66, is always larger than the magnitude of the pressing force acting on the one side of the automatic blocking valve 65, which is due to the hydraulic pressure of the working fluid flowing along the manual branch line 65a, and thus, the automatic blocking valve 65 may maintain a state of being disposed at the automatic changing position even when the manual steering is performed.

Next, as illustrated in FIGS. 34 and 35, when the automatic maintaining valve 81 moves to the manual priority position according to control by the controller 130, the automatic maintaining valve 81 may connect the second maintaining supply line 8b and the maintaining discharge line 8c. Accordingly, the automatic maintaining valve 81 may control the automatic blocking unit 6 using the working fluid flowing along the discharge line 4b. In this case, a portion of the working fluid discharged to the external device 140 may, after being branched from the discharge line 4b to the second maintaining supply line 8b, pass through the automatic maintaining valve 81 and be supplied to the maintaining discharge line 8c. Therefore, the hydraulic pressure of the working fluid flowing along the manual control line 6a acts as a pressing force on the one side of the automatic blocking valve 65, and a pressing force, which is the sum of the hydraulic pressure of the working fluid flowing along the maintaining discharge line 8c and the elastic force of the automatic changing elastic member 66, acts on the other side of the automatic blocking valve 65. The hydraulic pressure of the working fluid flowing along the manual control line 6a may vary according to whether the manual steering and the automatic steering are performed. When the manual steering is performed, as illustrated in FIG. 35, the hydraulic pressure of the working fluid flowing along the manual control line 6a is implemented to be greater than the pressing force which is the sum of the hydraulic pressure of the working fluid flowing along the maintaining discharge line 8c and the elastic force of the automatic changing elastic member 66. Accordingly, the automatic blocking valve 65 may move to the automatic blocking position. When the automatic steering is performed in the state in which the manual steering is not performed, as illustrated in FIG. 34, the hydraulic pressure of the working fluid flowing along the manual control line 6*a* is implemented to be less than the pressing force which is the sum of the hydraulic pressure of the working fluid flowing along the maintaining discharge line 8*c* and the elastic force of the automatic changing elastic member 66. Accordingly, the automatic blocking valve 65 may move to the automatic changing position. Although not illustrated, when the automatic steering is not performed in the state in which the manual steering is not performed, the hydraulic pressure of the working fluid flowing along the manual control line 6*a* is implemented to be less than the pressing force which is the sum of the hydraulic pressure of the working fluid flowing along the maintaining discharge line 8*c* and the elastic force of the automatic changing elastic member 66. Accordingly, the automatic blocking valve 65 may move to the automatic changing position.

As illustrated in FIGS. 34 and 35, when the automatic maintaining valve 81 moves to the manual priority position according to control by the controller 130, a hydraulic pressure flow is the same as the hydraulic pressure flow of the automatic blocking unit 6 according to the fourth embodiment that is illustrated in FIG. 21.

The automatic maintaining valve 81 may include a manual priority mechanism 811 configured to connect the second maintaining supply line 8*b* and the maintaining discharge line 8*c* and an automatic maintaining mechanism 812 configured to connect the first maintaining supply line 8*a* and the maintaining discharge line 8*c*. When the automatic maintaining valve 81 moves to the manual priority position, as illustrated in FIGS. 34 and 35, the manual priority mechanism 811 may connect the second maintaining supply line 8*b* and the maintaining discharge line 8*c*. When the automatic maintaining valve 81 moves to the automatic maintaining position, as illustrated in FIGS. 36 and 37, the automatic maintaining mechanism 812 may connect the first maintaining supply line 8*a* and the maintaining discharge line 8*c*.

In this way, the hydraulic steering device 1 for an agricultural vehicle according to the modified embodiment of the present disclosure may be implemented so that, in the case in which the automatic maintaining valve 81 moves to the automatic maintaining position according to control by the controller 130, the automatic blocking unit 6 is maintained in a state allowing passage of a working fluid even when the manual steering is performed. In this case, the automatic steering unit 3 and the manual steering unit 4 may operate as follows.

The automatic steering unit 3 may supply the working fluid, which is supplied from the steering pump 2 via the automatic blocking unit 6, to the steering cylinder 120. The manual steering unit 4 may supply the working fluid, which is discharged from the steering cylinder 120 and supplied to the manual steering unit 4 via the manual supply line 4*a*, to the steering cylinder 120. In this case, a portion of the working fluid discharged from the steering cylinder 120 may pass through the automatic steering unit 3, the automatic blocking unit 6, and the manual steering unit 4 and then be resupplied to the steering cylinder 120. A portion of the working fluid discharged from the steering cylinder 120 may, after passing through the manual steering unit 4, flow along the discharge line 4*b* and then be discharged to the external device 140. The automatic maintaining unit 8 may include a manual priority elastic member 82.

The manual priority elastic member 82 may be coupled to one side of the automatic maintaining valve 81. The manual priority elastic member 82 may press the one side of the automatic maintaining valve 81 in a direction in which the automatic maintaining valve 81 moves from the automatic maintaining position to the manual priority position. Accordingly, when the controller 130 does not control the automatic maintaining unit 8, the automatic maintaining valve 81 may be disposed at the manual priority position.

Figure 38:
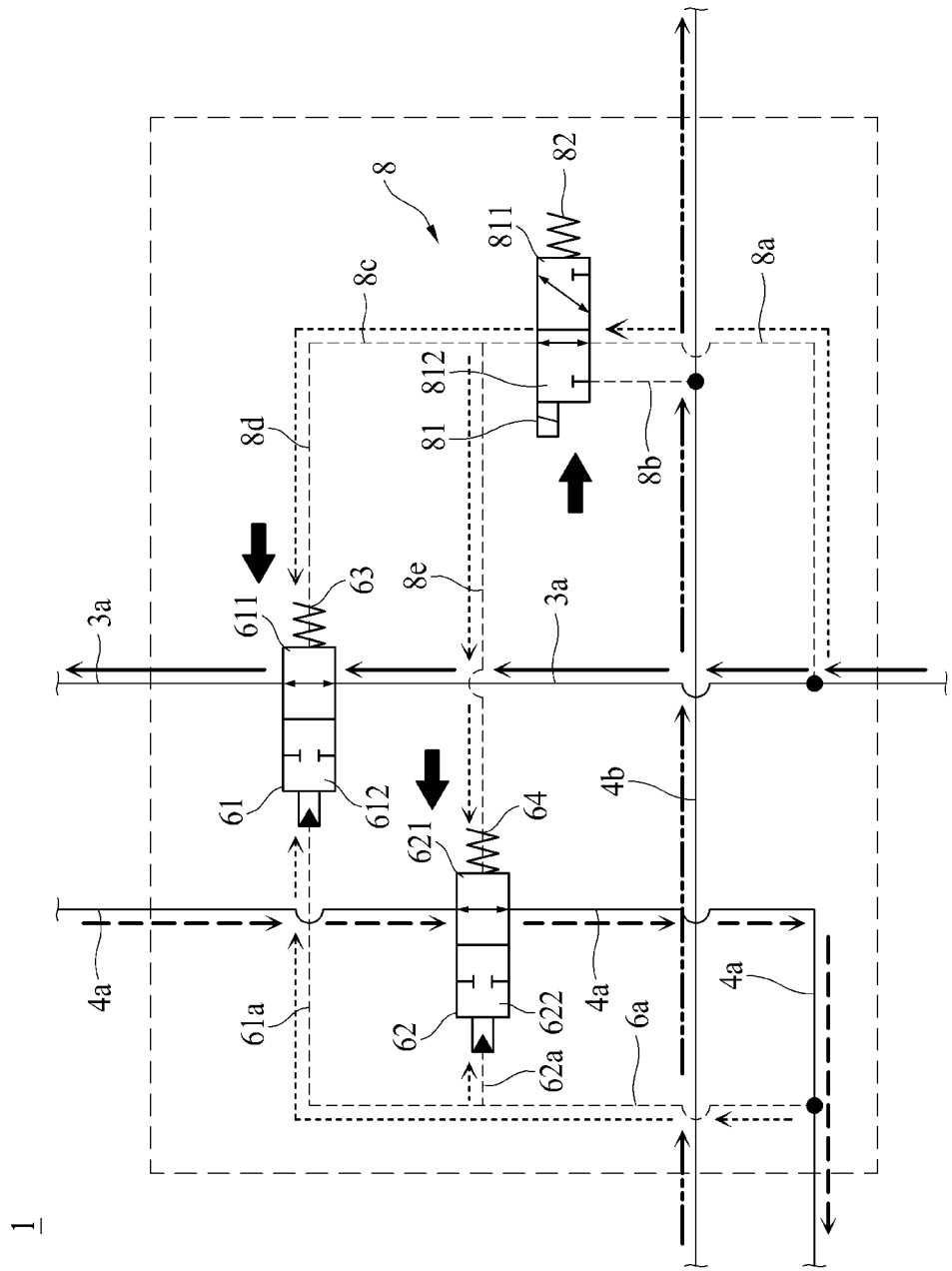
Figure 39:
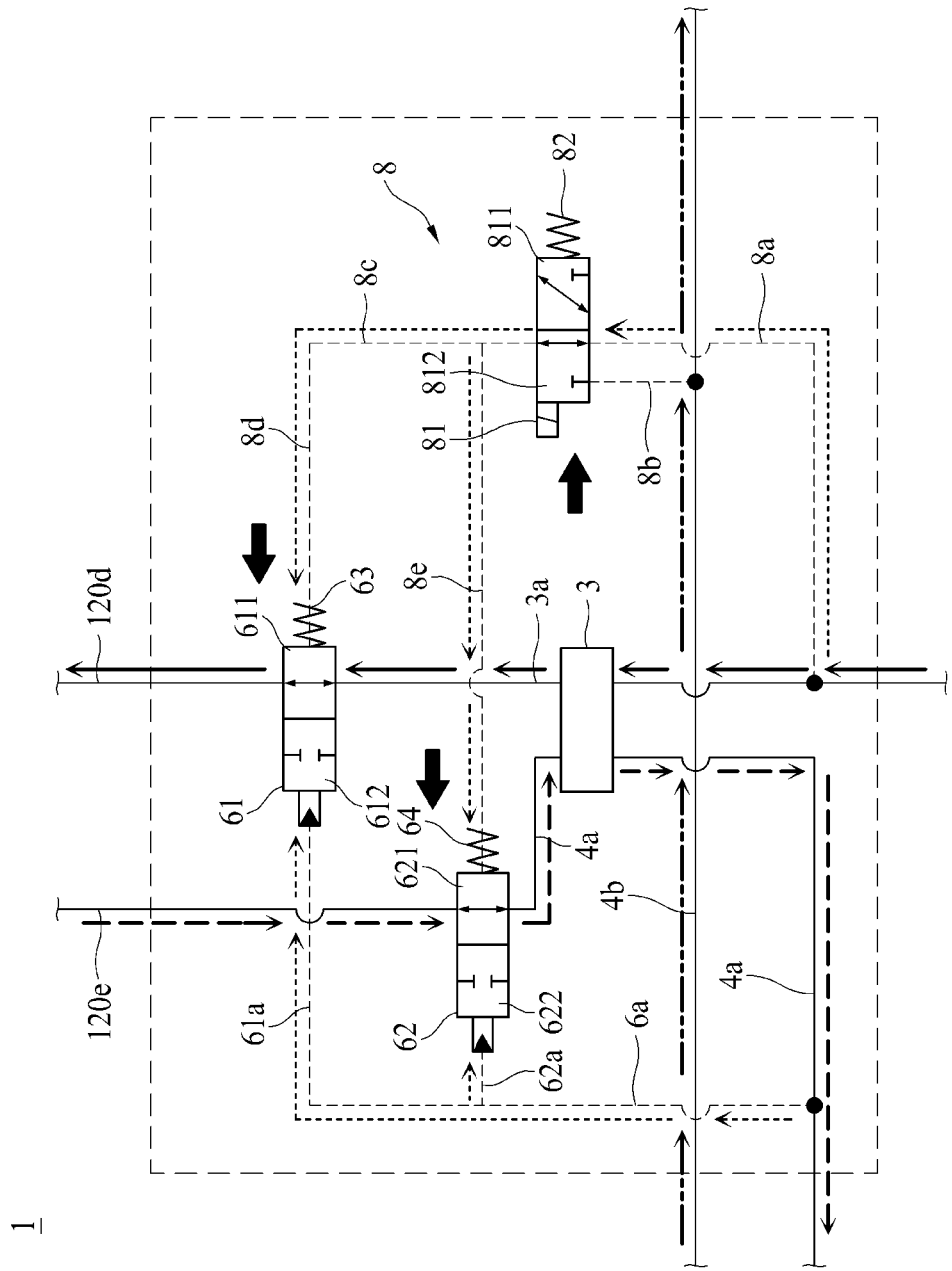

Referring to FIGS. 38 and 39, the automatic maintaining unit 8 may include a first maintaining branch line 8*d* and a second maintaining branch line 8*e*. FIG. 38 illustrates, among the front end arrangement embodiments, an embodiment in which the automatic maintaining unit 8 is applied to the automatic blocking unit 6 implemented to include the first automatic blocking valve 61 and the second automatic blocking valve 62 as in the first embodiment and second embodiment. FIG. 39 illustrates, among the rear end arrangement embodiments, an embodiment in which the automatic maintaining unit 8 is applied to the automatic blocking unit 6 implemented to include the first automatic blocking valve 61 and the second automatic blocking valve 62 as in the fifth embodiment and sixth embodiment.

The first maintaining branch line 8*d* may have one side connected to the other side of the first automatic blocking valve 61 and the other side connected to the maintaining discharge line 8*c*. The other side of the first maintaining branch line 8*d* may be connected to the outlet side of the automatic maintaining valve 81 through the maintaining discharge line 8*c*.

The second maintaining branch line 8*e* may have one side connected to the other side of the second automatic blocking valve 62 and the other side connected to the maintaining discharge line 8*c*. The other side of the second maintaining branch line 8*e* may be connected to the outlet side of the automatic maintaining valve 81 through the maintaining discharge line 8*c*.

Accordingly, when the automatic maintaining valve 81 moves between the automatic maintaining position and the manual priority position, the first automatic blocking valve 61 and the second automatic blocking valve 62 may move as follows.

First, when the automatic maintaining valve 81 moves to the automatic maintaining position according to control by the controller 130, the automatic maintaining valve 81 may connect the first maintaining supply line 8*a* and the maintaining discharge line 8*c*, thus being connected to the first maintaining branch line 8*d* and the second maintaining branch line 8*e* through the maintaining discharge line 8*c*. Accordingly, a portion of the working fluid supplied from the steering pump 2 may, after being branched from the automatic supply line 3*a* to the first maintaining supply line 8*a*, pass through the automatic maintaining valve 81 and be supplied to the first maintaining branch line 8*d* and the second maintaining branch line 8*e* through the maintaining discharge line 8*c*.

In this case, the hydraulic pressure of the working fluid flowing along the first manual branch line 61*a* acts as a pressing force on the one side of the first automatic blocking valve 61, and a pressing force, which is the sum of a hydraulic pressure of a working fluid flowing along the first maintaining branch line 8*d* and the elastic force of the first automatic changing elastic member 63, acts on the other side of the first automatic blocking valve 61. In this case, the first automatic blocking valve 61 may move between the first automatic changing position and the first automatic blocking position according to a magnitude of the pressing force acting on the one side that is due to the hydraulic pressure of the working fluid flowing along the first manual branch line 61*a* and a magnitude of the pressing force acting on the other side that is the sum of the hydraulic pressure of the working fluid flowing along the first maintaining branch line 8*d* and the elastic force of the first automatic changing elastic member 63. The magnitude of the pressing force acting on the other side of the first automatic blocking valve 61, which is the sum of the hydraulic pressure of the working fluid flowing along the first maintaining branch line 8*d* and the elastic force of the first automatic changing elastic member 63, is always larger than the magnitude of the pressing force acting on the one side of the first automatic blocking valve 61, which is due to the hydraulic pressure of the working fluid flowing along the first manual branch line 61*a*, and thus, the first automatic blocking valve 61 may maintain a state of being disposed at the first automatic changing position even when the manual steering is performed.

In this case, the hydraulic pressure of the working fluid flowing along the second manual branch line 62*a* acts as a pressing force on the one side of the second automatic blocking valve 62, and a pressing force, which is the sum of a hydraulic pressure of a working fluid flowing along the second maintaining branch line 8*e* and the elastic force of the second automatic changing elastic member 64, acts on the other side of the second automatic blocking valve 62. In this case, the second automatic blocking valve 62 may move between the second automatic changing position and the second automatic blocking position according to a magnitude of the pressing force acting on the one side that is due to the hydraulic pressure of the working fluid flowing along the second manual branch line 62*a* and a magnitude of the pressing force acting on the other side that is the sum of the hydraulic pressure of the working fluid flowing along the second maintaining branch line 8*e* and the elastic force of the second automatic changing elastic member 64. The magnitude of the pressing force acting on the other side of the second automatic blocking valve 62, which is the sum of the hydraulic pressure of the working fluid flowing along the second maintaining branch line 8*e* and the elastic force of the second automatic changing elastic member 64, is always larger than the magnitude of the pressing force acting on the one side of the second automatic blocking valve 62, which is due to the hydraulic pressure of the working fluid flowing along the second manual branch line 62*a*, and thus, the second automatic blocking valve 62 may maintain a state of being disposed at the second automatic changing position even when the manual steering is performed.

Next, when the automatic maintaining valve 81 moves to the manual priority position according to control by the controller 130, the automatic maintaining valve 81 may connect the second maintaining supply line 8*b* and the maintaining discharge line 8*c*, thus being connected to the first maintaining branch line 8*d* and the second maintaining branch line 8*e* through the maintaining discharge line 8*c*. Accordingly, a portion of the working fluid discharged to the external device 140 may, after being branched from the discharge line 4*b* to the second maintaining supply line 8*b*, pass through the automatic maintaining valve 81 and be supplied to the first maintaining branch line 8*d* and the second maintaining branch line 8*e* through the maintaining discharge line 8*c*.

In this case, the hydraulic pressure of the working fluid flowing along the first manual branch line 61*a* acts as a pressing force on the one side of the first automatic blocking valve 61, and the pressing force, which is the sum of the hydraulic pressure of the working fluid flowing along the first maintaining branch line 8*d* and the elastic force of the first automatic changing elastic member 63, acts on the other side of the first automatic blocking valve 61. The hydraulic pressure of the working fluid flowing along the first manual branch line 61*a* may vary according to whether the manual steering and the automatic steering are performed. When the manual steering is performed, the hydraulic pressure of the working fluid flowing along the first manual branch line 61*a* is implemented to be greater than the pressing force which is the sum of the hydraulic pressure of the working fluid flowing along the first maintaining branch line 8*d* and the elastic force of the first automatic changing elastic member 63. Accordingly, the first automatic blocking valve 61 may move to the first automatic blocking position. When the automatic steering is performed in the state in which the manual steering is not performed, the hydraulic pressure of the working fluid flowing along the first manual branch line 61*a* is implemented to be less than the pressing force which is the sum of the hydraulic pressure of the working fluid flowing along the first maintaining branch line 8*d* and the elastic force of the first automatic changing elastic member 63. Accordingly, the first automatic blocking valve 61 may move to the first automatic changing position. When the automatic steering is not performed in the state in which the manual steering is not performed, the hydraulic pressure of the working fluid flowing along the first manual branch line 61*a* is implemented to be less than the pressing force which is the sum of the hydraulic pressure of the working fluid flowing along the first maintaining branch line 8*d* and the elastic force of the first automatic changing elastic member 63. Accordingly, the first automatic blocking valve 61 may move to the first automatic changing position.

In this case, the hydraulic pressure of the working fluid flowing along the second manual branch line 62*a* acts as a pressing force on the one side of the second automatic blocking valve 62, and the pressing force, which is the sum of the hydraulic pressure of the working fluid flowing along the second maintaining branch line 8*e* and the elastic force of the second automatic changing elastic member 64, acts on the other side of the second automatic blocking valve 62. The hydraulic pressure of the working fluid flowing along the second manual branch line 62*a* may vary according to whether the manual steering and the automatic steering are performed. When the manual steering is performed, the hydraulic pressure of the working fluid flowing along the second manual branch line 62*a* is implemented to be greater than the pressing force which is the sum of the hydraulic pressure of the working fluid flowing along the second maintaining branch line 8*e* and the elastic force of the second automatic changing elastic member 64. Accordingly, the second automatic blocking valve 62 may move to the second automatic blocking position. When the automatic steering is performed in the state in which the manual steering is not performed, the hydraulic pressure of the working fluid flowing along the second manual branch line 62*a* is implemented to be less than the pressing force which is the sum of the hydraulic pressure of the working fluid flowing along the second maintaining branch line 8*e* and the elastic force of the second automatic changing elastic member 64. Accordingly, the second automatic blocking valve 62 may move to the second automatic changing position. When the automatic steering is not performed in the state in which the manual steering is not performed, the hydraulic pressure of the working fluid flowing along the second manual branch line 62*a* is implemented to be less than the pressing force which is the sum of the hydraulic pressure of the working fluid flowing along the second maintaining branch line 8*e* and the elastic force of the second automatic changing elastic member 64. Accordingly, the second automatic blocking valve 62 may move to the second automatic changing position.

The present disclosure which has been described above is not limited by the above embodiments and the accompanying drawings, and it should be apparent to those of ordinary skill in the art to which the present disclosure pertains that various substitutions, modifications, and changes are possible within the scope not departing from the technical spirit of the present disclosure.

The invention claimed is:

1. A hydraulic steering device for an agricultural vehicle, the hydraulic steering device comprising:
a steering pump configured to supply a working fluid;
an automatic steering unit connected to the steering pump and configured to, as automatic steering is performed by a controller, use the working fluid supplied from the steering pump to change a traveling direction of the agricultural vehicle;
a manual steering unit connected to each of the steering pump and the automatic steering unit and configured to, as manual steering is performed by manipulation of a steering wheel, change the traveling direction of the agricultural vehicle; and
a manual changing unit connected to each of the steering pump and the manual steering unit,
wherein the manual steering unit is connected to the steering pump through the manual changing unit,
the manual changing unit blocks passage of the working fluid supplied from the steering pump when the automatic steering is performed in a state in which the manual steering is not performed and causes the working fluid supplied from the steering pump to pass when the automatic steering is not performed in the state in which the manual steering is not performed or when the manual steering is performed, and
the manual steering unit changes, through the manual changing unit, the traveling direction of the agricultural vehicle using the working fluid supplied from the steering pump when the manual steering is performed,
wherein the manual changing unit includes:
a changing supply line connected to the steering pump;
a changing discharge line connected to the manual steering unit; and
a manual changing valve configured to, according to a hydraulic pressure of a working fluid flowing along the changing supply line, move between a manual changing position at which the manual changing valve allows supply of the working fluid from the changing supply line to the changing discharge line and a manual blocking position at which the manual changing valve blocks supply of the working fluid from the changing supply line to the changing discharge line.

2. The hydraulic steering device of claim 1, wherein the manual changing unit includes:
a first changing control line connected to each of the changing supply line and one side of the manual changing valve so that a portion of the working fluid flowing along the changing supply line presses the one side of the manual changing valve in a direction in which the manual changing valve moves from the manual blocking position to the manual changing position; and
a manual blocking elastic member coupled to the other side of the manual changing valve to press the other side of the manual changing valve in a direction in which the manual changing valve moves from the manual changing position to the manual blocking position,
wherein, using a difference between a hydraulic pressure of a working fluid flowing along the first changing control line and an elastic force of the manual blocking elastic member, the manual changing valve moves between the manual changing position and the manual blocking position.

3. The hydraulic steering device of claim 2, wherein:
the manual changing unit includes a second changing control line connected to the other side of the manual changing valve so that a portion of a working fluid flowing to be supplied to a steering cylinder of the agricultural vehicle presses the other side of the manual changing valve; and
when the hydraulic pressure of the working fluid flowing along the first changing control line is higher than a pressing force which is the sum of a hydraulic pressure of a working fluid flowing along the second changing control line and the elastic force of the manual blocking elastic member, the manual changing valve moves to the manual changing position.

4. The hydraulic steering device of claim 3, wherein:
the automatic steering unit includes a shuttle valve connected to each of a first steering line connected to one side of the steering cylinder and a second steering line connected to the other side of the steering cylinder; and
the second changing control line is connected to the shuttle valve so that a working fluid supplied through the shuttle valve presses the other side of the manual changing valve.

5. The hydraulic steering device of claim 3, wherein:
the automatic steering unit includes an automatic steering valve configured to selectively pass a working fluid supplied from the steering pump according to whether the automatic steering is performed; and
the second changing control line is connected to the automatic steering valve so that, when the automatic steering is performed, a portion of a working fluid flowing to pass through the automatic steering valve presses the other side of the manual changing valve.

6. The hydraulic steering device of claim 1, further comprising:
a manual supply line connected to each of the automatic steering unit and the manual steering unit so that a working fluid discharged from the automatic steering unit is supplied to the manual steering unit; and
a discharge line connected to each of the manual steering unit and an external device so that a working fluid discharged from the manual steering unit is discharged to the external device,
wherein the manual steering unit includes a manual steering valve configured to, when the automatic steering is performed, discharge a working fluid supplied from the manual supply line to the discharge line.

7. A hydraulic steering device for an agricultural vehicle, the hydraulic steering device comprising:
a steering pump configured to supply a working fluid;
an automatic steering unit connected to the steering pump and configured to, as automatic steering is performed by a controller, use the working fluid supplied from the steering pump to change a traveling direction of the agricultural vehicle;
a manual steering unit connected to each of the steering pump and the automatic steering unit and configured to, as manual steering is performed by manipulation of a steering wheel, change the traveling direction of the agricultural vehicle;
a manual changing unit connected to each of the steering pump and the manual steering unit;
an automatic blocking unit configured to selectively block a working fluid for the automatic steering from being supplied to a steering cylinder of the agricultural vehicle according to whether the manual steering is performed; and
a manual supply line connected to each of the automatic steering unit and the manual steering unit so that a working fluid discharged from the automatic steering unit is supplied to the manual steering unit,
wherein the manual steering unit is connected to the steering pump through the manual changing unit,
wherein the manual changing unit blocks passage of the working fluid supplied from the steering pump when the automatic steering is performed in a state in which the manual steering is not performed and causes the working fluid supplied from the steering pump to pass when the automatic steering is not performed in the state in which the manual steering is not performed or when the manual steering is performed,
wherein the manual steering unit changes, through the manual changing unit, the traveling direction of the agricultural vehicle using the working fluid supplied from the steering pump when the manual steering is performed, and
wherein, according to a hydraulic pressure of a working fluid flowing along the manual supply line, the automatic blocking unit selectively blocks the working fluid for the automatic steering from being supplied to the steering cylinder.

8. The hydraulic steering device of claim 7, wherein the automatic blocking unit includes:
a first automatic blocking valve configured to, according to the hydraulic pressure of the working fluid flowing along the manual supply line, move between a first automatic changing position at which the first automatic blocking valve allows the working fluid for the automatic steering to be supplied to the steering cylinder and a first automatic blocking position at which the first automatic blocking valve blocks the working fluid for the automatic steering from being supplied to the steering cylinder;
a second automatic blocking valve configured to, according to the hydraulic pressure of the working fluid flowing along the manual supply line, move between a second automatic changing position at which the second automatic blocking valve allows passage of a working fluid discharged from the steering cylinder and a second automatic blocking position at which the second automatic blocking valve blocks passage of the working fluid discharged from the steering cylinder;
a manual control line connected to the manual supply line;
a first manual branch line connected to each of the manual control line and one side of the first automatic blocking valve so that a portion of the working fluid flowing along the manual supply line presses the one side of the first automatic blocking valve in a direction in which the first automatic blocking valve moves from the first automatic changing position to the first automatic blocking position; and
a second manual branch line connected to each of the manual control line and one side of the second automatic blocking valve so that a portion of the working fluid flowing along the manual supply line presses the one side of the second automatic blocking valve in a direction in which the second automatic blocking valve moves from the second automatic changing position to the second automatic blocking position.

9. The hydraulic steering device of claim 8, wherein the automatic blocking unit further includes:
a first automatic changing elastic member coupled to the other side of the first automatic blocking valve to press the other side of the first automatic blocking valve in a direction in which the first automatic blocking valve moves from the first automatic blocking position to the first automatic changing position; and
a second automatic changing elastic member coupled to the other side of the second automatic blocking valve to press the other side of the second automatic blocking valve in a direction in which the second automatic blocking valve moves from the second automatic blocking position to the second automatic changing position,
wherein the first automatic changing elastic member is formed to have an elastic force greater than a hydraulic pressure of a working fluid flowing along the first manual branch line when the manual steering is not performed and have an elastic force less than the hydraulic pressure of the working fluid flowing along the first manual branch line when the manual steering is performed, and
wherein the second automatic changing elastic member is formed to have an elastic force greater than a hydraulic pressure of a working fluid flowing along the second manual branch line when the manual steering is not performed and have an elastic force less than the hydraulic pressure of the working fluid flowing along the second manual branch line when the manual steering is performed.

10. The hydraulic steering device of claim 8, further comprising a discharge line connected to each of the manual steering unit and an external device so that a working fluid discharged from the manual steering unit is discharged to the external device,
wherein the automatic blocking unit includes:
a first automatic changing elastic member coupled to the other side of the first automatic blocking valve to press the other side of the first automatic blocking valve in a direction in which the first automatic blocking valve moves from the first automatic blocking position to the first automatic changing position;
a second automatic changing elastic member coupled to the other side of the second automatic blocking valve to press the other side of the second automatic blocking valve in a direction in which the second automatic blocking valve moves from the second automatic blocking position to the second automatic changing position;
a first automatic control line connected to each of the discharge line and the other side of the first automatic blocking valve so that a portion of a working fluid flowing along the discharge line presses the other side of the first automatic blocking valve in a direction in which the first automatic blocking valve moves from the first automatic blocking position to the first automatic changing position; and
a second automatic control line connected to each of the discharge line and the other side of the second automatic blocking valve so that a portion of the working fluid flowing along the discharge line presses the other side of the second automatic blocking valve in a direction in which the second automatic blocking valve moves from the second automatic blocking position to the second automatic changing position, the first automatic blocking valve moves to the first automatic blocking position when the hydraulic pressure of the working fluid flowing along the first manual branch line is greater than a pressing force which is the sum of a hydraulic pressure of a working fluid flowing along the first automatic control line and an elastic force of the first automatic changing elastic member, and the second automatic blocking valve moves to the second automatic blocking position when the hydraulic pressure of the working fluid flowing along the second manual branch line is greater than a pressing force which is the sum of a hydraulic pressure of a working fluid flowing along the second automatic control line and an elastic force of the second automatic changing elastic member.

11. The hydraulic steering device of claim 7, wherein the automatic blocking unit includes:

an automatic blocking valve configured to, according to the hydraulic pressure of the working fluid flowing along the manual supply line, move between an automatic changing position, at which the automatic blocking valve allows the working fluid for the automatic steering to be supplied to the steering cylinder and allows passage of the working fluid discharged from the steering cylinder, and an automatic blocking position, at which the automatic blocking valve blocks the working fluid for the automatic steering from being supplied to the steering cylinder and blocks passage of the working fluid discharged from the steering cylinder; and a manual control line connected to each of the manual supply line and one side of the automatic blocking valve so that a portion of the working fluid flowing along the manual supply line presses the one side of the automatic blocking valve in a direction in which the automatic blocking valve moves from the automatic changing position to the automatic blocking position.

12. The hydraulic steering device of claim 11, wherein:

the automatic blocking unit further includes an automatic changing elastic member coupled to the other side of the automatic blocking valve to press the other side of the automatic blocking valve in a direction in which the automatic blocking valve moves from the automatic blocking position to the automatic changing position; and the automatic changing elastic member is formed to have an elastic force greater than a hydraulic pressure of a working fluid flowing along the manual control line when the manual steering is not performed and have an elastic force less than the hydraulic pressure of the working fluid flowing along the manual control line when the manual steering is performed.

13. The hydraulic steering device of claim 11, further comprising a discharge line connected to each of the manual steering unit and an external device so that a working fluid discharged from the manual steering unit is discharged to the external device, wherein the automatic blocking unit includes:

an automatic changing elastic member coupled to the other side of the automatic blocking valve to press the other side of the automatic blocking valve in a direction in which the automatic blocking valve moves from the automatic blocking position to the automatic changing position; and an automatic control line connected to each of the discharge line and the other side of the automatic blocking valve so that a portion of a working fluid flowing along the discharge line presses the other side of the automatic blocking valve in a direction in which the automatic blocking valve moves from the automatic blocking position to the automatic changing position, and the automatic blocking valve moves to the automatic blocking position when the hydraulic pressure of the working fluid flowing along the manual control line is greater than a pressing force which is the sum of a hydraulic pressure of a working fluid flowing along the automatic control line and an elastic force of the automatic changing elastic member.

14. The hydraulic steering device of claim 7, wherein the automatic blocking unit is disposed between the steering pump and the automatic steering unit.

15. The hydraulic steering device of claim 7, wherein the automatic blocking unit is disposed between the automatic steering unit and the steering cylinder.

16. A hydraulic steering device for an agricultural vehicle, the hydraulic steering device comprising:

a steering pump configured to supply a working fluid;

an automatic steering unit connected to the steering pump and configured to, as automatic steering is performed by a controller, use the working fluid supplied from the steering pump to change a traveling direction of the agricultural vehicle;

a manual steering unit connected to each of the steering pump and the automatic steering unit and configured to, as manual steering is performed by manipulation of a steering wheel, change the traveling direction of the agricultural vehicle;

a selection unit configured to selectively supply the working fluid supplied from the steering pump toward any one of the manual steering unit and the automatic steering unit; and a manual changing unit connected to each of the steering pump and the manual steering unit;

wherein:

the manual steering unit is connected to the steering pump through the manual changing unit, the manual changing unit blocks passage of the working fluid supplied from the steering pump when the automatic steering is performed in a state in which the manual steering is not performed and causes the working fluid supplied from the steering pump to pass when the automatic steering is not performed in the state in which the manual steering is not performed or when the manual steering is performed, the manual steering unit changes, through the manual changing unit, the traveling direction of the agricultural vehicle using the working fluid supplied from the steering pump when the manual steering is performed, the selection unit includes a selection valve configured to move between a manual selection position at which the selection valve supplies the working fluid supplied from the steering pump toward the manual steering unit and a steering selection position at which the selection valve supplies the working fluid supplied from the steering pump toward the automatic steering unit;

when the selection valve is disposed at the manual selection position, a working fluid is supplied from the selection unit to the manual steering unit without passing through the manual changing unit; and when the selection valve is disposed at the steering selection position, a working fluid is supplied to the manual steering unit via the manual changing unit when the automatic steering is not performed in a state in which the manual steering is not performed or when the manual steering is performed.

17. A hydraulic steering device for an agricultural vehicle, the hydraulic steering device comprising:

a steering pump configured to supply a working fluid;

an automatic steering unit connected to the steering pump and configured to, as automatic steering is performed by a controller, use the working fluid supplied from the steering pump to change a traveling direction of the agricultural vehicle;

a manual steering unit connected to each of the steering pump and the automatic steering unit and configured to, as manual steering is performed by manipulation of a steering wheel, change the traveling direction of the agricultural vehicle;

an automatic blocking unit configured to, according to whether the manual steering is performed, selectively block the working fluid for the automatic steering from being supplied to a steering cylinder of the agricultural vehicle, a selection unit configured to selectively supply the working fluid supplied from the steering pump toward any one of the manual steering unit and the automatic steering unit, wherein the selection unit includes:

a selection valve configured to move between a manual selection position at which the selection valve supplies the working fluid supplied from the steering pump toward the manual steering unit and a steering selection position at which the selection valve supplies the working fluid supplied from the steering pump toward the automatic steering unit;

a selection supply line having one side connected to a pump supply line connected to the steering pump and the other side connected to an inlet side of the selection valve; and a selection discharge line having one side connected to a manual supply line connected to the manual steering unit and the other side connected to an outlet side of the selection valve, and a manual changing unit connected to each of the steering pump and the manual steering unit;

wherein:

the manual steering unit is connected to the steering pump through the manual changing unit, the manual changing unit blocks passage of the working fluid supplied from the steering pump when the automatic steering is performed in a state in which the manual steering is not performed and causes the working fluid supplied from the steering pump to pass when the automatic steering is not performed in the state in which the manual steering is not performed or when the manual steering is performed, the manual steering unit changes, through the manual changing unit, the traveling direction of the agricultural vehicle using the working fluid supplied from the steering pump when the manual steering is performed, an automatic supply line connected to the automatic steering unit or the automatic blocking unit is connected to the outlet side of the selection valve, and the selection valve connects the selection supply line and the selection discharge line when disposed at the manual selection position and connects the selection supply line and the automatic supply line when disposed at the steering selection position.

* * * * *